US012594597B2

(12) United States Patent
Grassi et al.

(10) Patent No.: US 12,594,597 B2
(45) Date of Patent: Apr. 7, 2026

(54) MULTI INDIRECT INJECTION SOLIDIFICATION TECHNOLOGY

(71) Applicant: Alotech Limited R & D, LLC, Brooklyn, OH (US)

(72) Inventors: John Grassi, Brooklyn, OH (US);
Matthew Burdick, Hartland, WI (US);
Eric Ehrhardt, Brookfield, WI (US);
Gary Kuehnel, New Berlin, WI (US)

(73) Assignee: Alotech Limited R & D, LLC, Brooklyn, NY (US)

( * ) Notice: Subject to any disclaimer, the term of this patent is extended or adjusted under 35 U.S.C. 154(b) by 12 days.

(21) Appl. No.: 19/025,859

(22) Filed: Jan. 16, 2025

(65) Prior Publication Data

US 2025/0229326 A1     Jul. 17, 2025

Related U.S. Application Data

(60) Provisional application No. 63/733,766, filed on Dec. 13, 2024, provisional application No. 63/733,931, (Continued)

(51) Int. Cl.
*B22D 27/04* (2006.01)
*B22C 9/02* (2006.01)
(Continued)

(52) U.S. Cl.
CPC .............. *B22D 27/04* (2013.01); *B22C 9/02* (2013.01); *B22C 9/10* (2013.01); *B22C 9/24* (2013.01);
(Continued)

(58) Field of Classification Search
CPC ........ B22D 27/04; B22D 30/00; B22D 45/00; B22C 9/00; B22C 9/02; B22C 9/06;
(Continued)

(56) References Cited

U.S. PATENT DOCUMENTS 4,971,134 A     11/1990  Kawaguchi et al.
2017/0355015 A1   12/2017  Puy
(Continued)

OTHER PUBLICATIONS

International Search Report and Written Opinion in International Patent Application No. PCT/US2025/011930 mailed Apr. 17, 2025, 13 pp.

*Primary Examiner* — Kevin P Kerns
*Assistant Examiner* — Steven S Ha
(74) *Attorney, Agent, or Firm* — Ilya S. Mirov; Nixon Peabody LLP

(57) ABSTRACT

A method for manufacturing an alloy component includes forming a mold including a first mold portion and a second mold portion defining a mold cavity therebetween. At least one of the first and second mold portions comprise one or more inserts disposed through an outside surface of a respective mold portion and extending through the respective mold portion proximate to the mold cavity. The method can include delivering a molten alloy into the mold cavity and supporting by the one or more inserts, the molten metal as the molten metal cools to form a part. The one or more inserts can comprise a plurality of hollow tubes extending therethrough, and can enable cooling and/or heating of the molten alloy and/or alloy part through the plurality of hollow tubes.

14 Claims, 40 Drawing Sheets

Related U.S. Application Data filed on Dec. 13, 2024, provisional application No. 63/623,684, filed on Jan. 22, 2024, provisional application No. 63/621,514, filed on Jan. 16, 2024.

(51) Int. Cl.
| | |
|---|---|
| *B22C 9/10* | (2006.01) |
| *B22C 9/24* | (2006.01) |
| *B22D 30/00* | (2006.01) |
| *B25J 11/00* | (2006.01) |
| *B25J 15/00* | (2006.01) |

(52) U.S. Cl.
CPC ............. *B22D 30/00* (2013.01); *B25J 11/005* (2013.01); *B25J 15/0019* (2013.01)

(58) Field of Classification Search
CPC .......... B22C 9/061; B22C 9/065; B22C 9/12; B22C 9/123; B22C 9/126
See application file for complete search history.

(56) References Cited

U.S. PATENT DOCUMENTS

| | | | |
|---|---|---|---|
| 2018/0221942 A1* | 8/2018 | Boyle .................... | B33Y 80/00 |
| 2022/0048104 A1 | 2/2022 | Han | |
| 2023/0211406 A1 | 7/2023 | Burkholder et al. | |

* cited by examiner

1030

1036

1200

1300

1302

1080, 1090

1092

1036

1030

1480

1094

1404

1038

1036

1044

1040

1042

1300

1310

Brinell hardness values of the samples are shown below:

MID 817

MID 817

MID-0454

A 5X magnification, scale bar 100μm, 1hr solution treated and 2hr aged MID 817

A 5X magnification, scale bar 100μm, 1hr solution treated and 2hr aged MID 817

1A 10X magnification, scale bar 100µm, 1hr solution treated and 2hr aged MID 817

1A 10X magnification, scale bar 100µm, 1hr solution treated and 2hr aged MID 817

1A 20X magnification, scale bar 100μm, 1hr solution treated and 2hr aged MID 817

1A 20X magnification, scale bar 100μm, 1hr solution treated and 2hr aged MID 817

1A 50X magnification, scale bar 10µm, 1hr solution treated and 2hr aged MID 817

1A 50X magnification, scale bar 10µm, 1hr solution treated and 2hr aged MID 817

1A 100X magnification, scale bar 10µm, 1hr solution treated and 2hr aged MID 817

1A 100X magnification, scale bar 10µm, 1hr solution treated and 2hr aged MID 817

5X magnification, scale bar 100μm, 5hr solution treated and 2hr aged MID 821, bright field 5X magnification, scale bar 100μm, 5hr solution treated and 2hr aged MID 821, dark field 10X magnification, scale bar 100µm, 5hr solution treated and 2hr aged MID 821, bright field 10X magnification, scale bar 100µm, 5hr solution treated and 2hr aged MID 821, dark field 20X magnification, scale bar 100µm, 5hr solution treated and 2hr aged MID 821, bright field 20X magnification, scale bar 100µm, 5hr solution treated and 2hr aged MID 821, dark field 50X magnification, scale bar 10µm, 5hr solution treated and 2hr aged MID 821, bright field 50X magnification, scale bar 10µm, 5hr solution treated and 2hr aged MID 821, dark field 100X magnification, scale bar 10μm, 5hr solution treated and 2hr aged MID 821, bright field 100X magnification, scale bar 10μm, 5hr solution treated and 2hr aged MID 821, dark field 5X magnification, scale bar 100µm, 6061 Forging, bright field 5X magnification, scale bar 100µm, 6061 Forging, dark field 10X magnification, scale bar 100μm, 6061 Forging, bright field 10X magnification, scale bar 100μm, 6061 Forging, dark field 20X magnification, scale bar 100µm, 6061 Forging, bright field 100µm 20X magnification, scale bar 100µm, 6061 Forging, dark field 100µm 50X magnification, scale bar 10µm, 6061 Forging, bright field 50X magnification, scale bar 10µm, 6061 Forging, dark field 100X magnification, scale bar 10µm, 6061 Forging, bright field 100X magnification, scale bar 10µm, 6061 Forging, dark field

MULTI INDIRECT INJECTION SOLIDIFICATION TECHNOLOGY

CROSS-REFERENCE TO RELATED APPLICATIONS

This application is related to U.S. Pat. No. 7,165,600, which is incorporated by reference herein in its entirety. This application is related to U.S. Pat. No. 7,216,691, which is incorporated by reference herein in its entirety. This application is related to, and claims the benefit of co-pending U.S. Provisional Patent Application No. 63/733,766 entitled "Configurable End-Effector Used with a Casting Process," filed on Dec. 13, 2024 and having an Applicant of Alotech Limited R&D, LLC, which application is incorporated by reference herein in its entirety. This application is related to co-pending U.S. patent application entitled "Configurable End-Effector Used with a Casting Process," filed under U.S. Pat. No. 63/733,766 on Jan. 16, 2024 and having an Applicant of Alotech Limited R&D, LLC, which application is incorporated by reference herein in its entirety. This application claims the benefit of U.S. Provisional Patent Application No. 63/621,514, filed Jan. 16, 2024, which is incorporated by reference herein in its entirety. This application claims the benefit of U.S. Provisional Patent Application No. 63/623,684, filed Jan. 22, 2024, which is incorporated by reference herein in its entirety. This application claims the benefit of U.S. Provisional Patent Application No. 63/733,931, filed Dec. 13, 2024, which is incorporated by reference herein in its entirety.

FIELD

This application pertains to a devices, systems and methods for manufacturing a metal component, and more particularly, to a mold construction including one or more inserts having a plurality of hollow tubes and methods of use thereof.

BACKGROUND

Various ways of manufacturing metal components, parts or products are known to the art. One of these is via the use of sand molds. There are several types of such sand molds. Green sand molds are composed of an aggregate and sand and are held together with a binder, such as a mixture of clay and water. Other sand molds use organic binders such as resin based chemical binders that possess high dimensional accuracy and high hardness. Still other sand molds comprise an aggregate, such as silica sand and employ an inorganic binder. One type of such a mold is discussed in U.S. Pat. No. 7,216,691 which issued on May 15, 2007. The subject matter of that patent is incorporated hereinto by reference in its entirety.

The sand that is used as an aggregate in sand molding is most commonly silica. However, other minerals have been used to avoid the undesirable transition in silica sand from alpha quartz to beta quartz at about 570° C. (1058° F.). Such other minerals include olivine, chromite and zircon. These minerals, however, possess certain disadvantages. Olivine is often variable in its chemistry leading to problems of uniform control with chemical binders. Chromite is typically crushed creating angular grains which lead to a poor surface finish on the casting and rapid wear of tooling. Zircon is heavy, thereby increasing demands on equipment that is used to form and handle a mold and causing rapid tool wear. Another type of aggregate material which is sometimes used in molds is a particulate material which has minimal thermal capacity and minimal thermal conductivity (i.e., minimal heat diffusivity) to reduce the heat which is extracted from the molten metal by the mold itself. Such particulate materials include crushed pumice particles, cenospheres, ceramic glass or refractory material, micro bubbles and mixtures of the above. A mold manufactured from such materials is disclosed in U.S. Pat. No. 7,165,600, the subject matter of which is incorporated hereinto by reference in its entirety.

As mentioned, disposable foundry shapes such as molds and cores can be fabricated with a mixture of a particulate, such as sand, and an inorganic or organic binder. This is sometimes referred to as a foundry mix. Molds and cores are subsequently produced by chemical or heat hardening of the mixture of sand and a binder onto a pattern or core box. Sometimes, a catalyst is used to cure the foundry mix more rapidly. In a method known as the cold box method, a volatile curing catalyst, such as a gaseous reagent, is passed through a shaped mixture of the foundry mix to harden the mold, usually in a core box. It is expected that the cure rate is very rapid once the foundry mix is exposed to the catalyst.

In addition, the disadvantages created by the unique aspects of silica and the alternative minerals mentioned above, sand molds generally do not allow a rapid cooling of the molten metal held within the mold due to their relatively low thermal conductivity. In other words, aggregate molds or sand molds are relatively thermally insulating. Therefore, the casting process is slow, which significantly reduces the mechanical properties of the part being manufactured. While the heat transfer rate can be increased by local metal chill blocks placed in the mold, this is expensive and inconvenient on many molding lines.

It is known in the art that rapid cooling of the molten metal is often desirable because the mechanical properties of the metal product produced are improved. In addition, rapid cooling allows the retention of more of the alloying elements in solution thereby introducing the possibility of eliminating subsequent solution treatment which saves time and expense. The elimination of solution treatment may also prevent the need for a subsequent quench step that is typically used for alloy parts, thereby removing the problems of distortion and residual stress in the alloy part which can be caused by the quench. This is particularly true in the dislocation hardening 5000 series of aluminum alloys which also can be associated to a cross over alloy between a 5000 and 6000 alloy series combination.

As an alternative to sand molds, metal tools, including ones with chills are sometimes used. Unlike sand molds which are only used once, metal tools are often referred to as permanent in the sense that they are used many times. Metal tools are particularly advantageous because their relatively high thermal conductivity allows the molten metal held in the tool to cool and solidify relatively quickly, leading to advantageous mechanical properties in the alloy part produced. This type of cooling in a mold, as with a tool that allows the latent heat of solidification to be taken up by the mold itself is known as primary cooling. Normal castings that are solidified in a mold, for example to make an automotive control arm, utilizes only primary cooling. Secondary cooling can be understood as a process in which latent heat of solidification is taken up by a coolant that is delivered into the mold and impinges upon the alloy being cooled. Upon impingement, heat is transferred from the alloy to the coolant material, in some cases causing a phase change in the coolant. Direct chill casting processes used to produce ingots use a metal tool that first enables primary cooling followed by secondary cooling. Another reference, U.S. Pat. No. 7,216,691, also is distinguished, known in the art as ablation casting, which incorporates a primary cooling followed by a secondary cooling operation after the mold is removed by the dissolution of the mold through an ablate spray. Notably, primary cooling does not continue after dissolution of the mold in the locality of the ablate media, and therefore primary and secondary cooling cannot be applied simultaneously using the techniques described in this reference. However, due to the heat transfer properties of the metal tool vs an aggregate or sand mold, the molten metal alloy held in a metal cavity defined by the segments of the tool, and sometimes termed a mold cavity of the tool, will solidify much more rapidly than in an aggregate mold cavity. This can result in a smaller grain structure (cell size or dendrite arm spacing (DAS) or secondary dendrite arm spacing (SDAS)) and likely produce superior mechanical properties in a metal tool. In addition, more uniform properties may be observed throughout the material when employing a metal tool. Closer dimensional accuracy, as well as an excellent surface finish of the part, are other advantages of metal tools. However, there are limitations on the size of the parts which can be manufactured by this process. In addition, initial set up costs are high, making metal tools unsuitable for small production runs. Rather, such tools are considered useful for high volume runs because, when set up, the process can be economical with a high rate of production.

However, the rate of heat extraction from both metal tools and sand molds is limited by the presence of the so-called "air gap." This is the space that opens up between the cooling and contracting alloy part held in the mold cavity and the heating and expanding mold or tool. The rate of transfer of heat from the molten metal is powerfully limited by an insulating layer of air that forms between the contracting part and the expanding mold or tool. The process known as pressure die casting utilizes metal tools and pressurizes the molten metal in an effort to decrease the size of the air gap. It is known to have a rapid solidification rate. Such a rapid rate of solidification is indicated by the presence of fine dendrite arm spacing (DAS) in the casting. As is known in the art, the faster the solidification rate, the smaller the DAS.

Die casting into metal dies is employed for the production of many mass-produced alloy parts or components. In die casting, a molten metal is forced at a high pressure of approximately 10 MPa to 120 MPa at a relatively high mold filling speed into a mold cavity of a metal die. The alloy parts produced are removed from the casting machine in a hot state and subsequently subjected to coarse deburring in a press within a casting cell. Fine deburring is performed at a much later point in time when the alloy part has cooled to room temperature. The alloy parts that are produced by die casting often need to be manually straightened in their cold state in order to meet the required component tolerances. This is time consuming and expensive. In addition, pressure die casting often allows the formation of defects in an alloy part produced with such apparatus because extreme surface turbulence occurs in the molten metal during the pressurized filling of the mold. Another casting process employed in an effort to limit the presence of an air gap is a squeeze casting process employing a semi solid material which contains a high solid fraction of input material. The already high solid fraction created via preprocessing the alloy into the tool limits the contraction percentage of the alloy which remains from converting from liquid to solid which then limits the overall contraction of the alloy part formed and the air gap which develops.

An approach to address some of the above problems called the ablation solidification process is described in U.S. Pat. No. 7,216,691 which is incorporated hereinto by reference in its entirety. In this process, the aggregate in an aggregate mold is eroded or dissolved away by the application of an ablating medium, such as a fluid. This causes the aggregate to disintegrate to grain size and the grains to be flushed away in the flow of the fluid. In this way, the surface of the solidifying metal component, primary cooled, can be revealed allowing direct contact, secondary cooling, between the ablating medium and the metal of the solidifying component or part without the formation of an air gap. The direct contact, secondary cooling, maximizes heat flow from the metal thereby greatly increasing the rate of solidification and at the same time cleaning of the metal. Notably, in the above-described process, primary and secondary cooling cannot be applied simultaneously because the application of the ablate removes the aggregate medium that, by contact with the cooling alloy part, provides primary cooling during solidification.

While the ablation process is a significant improvement over the known or conventional alloy part manufacturing methods, it would be desirable to develop improved molten metal solidification processes and systems in order to provide higher productivity for a variety of types of metal products while enhancing the material properties of such products.

For example, it would be desirable to manufacture a piston having a near net shape and without the need to resort to significant post-manufacture machining or finishing. More particularly, it would be desirable to produce a piston having an undercut combustion bowl and internal cooling passages, one or more ring grooves and other features now required in pistons. Doing so would reduce machining costs and produce an as-cast microstructure which has improved mechanical properties and a near net shape.

As a result, it is desirable to develop an alloy part manufacturing process which has the advantage of rapid solidification of the metal component into a near-net shape with a good surface finish, while also providing lower costs for the manufacture of the metal component and high productivity. The disclosed embodiments are directed to these and other considerations.

BRIEF DESCRIPTION OF THE DRAWINGS

The disclosure may take physical form in certain parts and arrangements of parts, several embodiments of which will be described in detail in this specification and illustrated in the accompanying drawings which form a part hereof and wherein.

DETAILED DESCRIPTION

Figure 1:
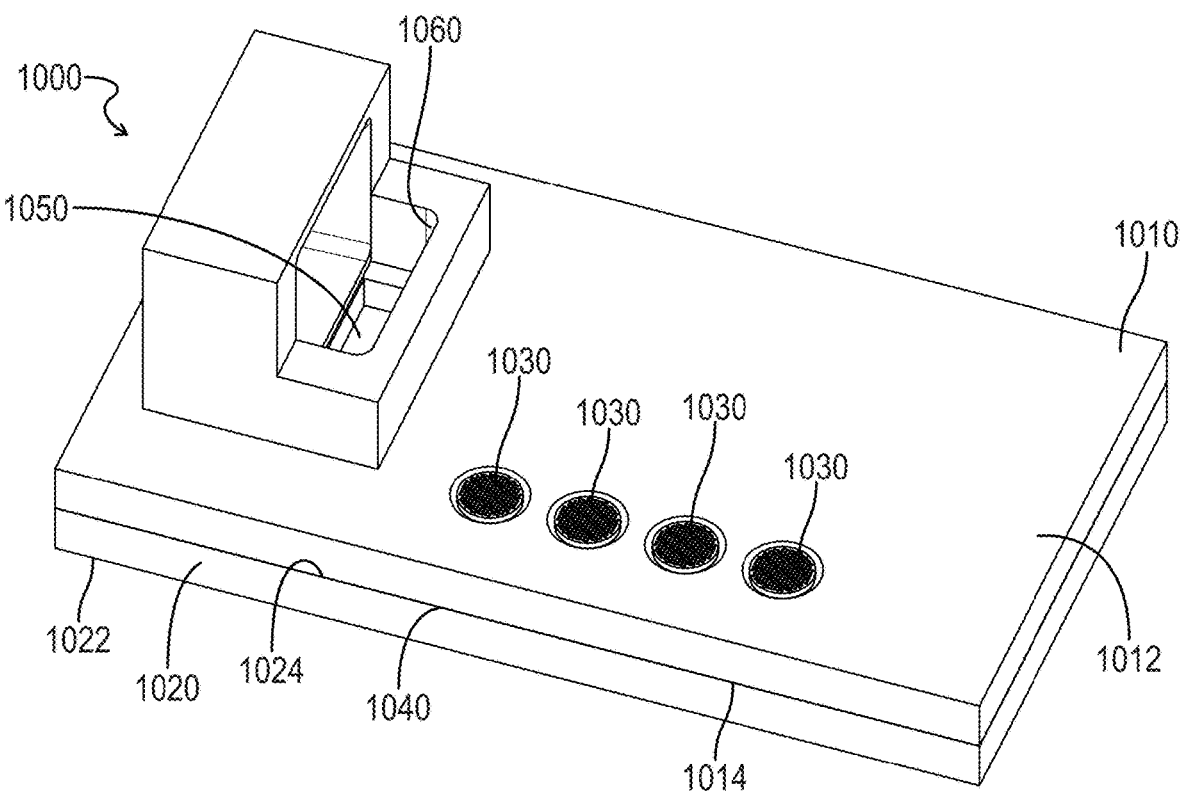
FIG. 1 shows a perspective view of an embodiment of a mold construction including one or more inserts, according to aspects of the present disclosure.

The present disclosure relates to devices, systems, and methods for forming any material alloy or metal alloy parts within a mold. As used herein a "mold" includes any construction or apparatus for forming a cast alloy part. As used herein, a mold specifically can include an all metal tool construction, a mold constructed of aggregate, and combinations thereof. In this regard, the present disclosure relates to a mold construction that can include one or more inserts. Each of the inserts include a plurality of hollow tubes that solve a variety of shortcomings in traditional casting technology. It should be noted that although referred to herein as "inserts," according to various embodiments, the disclosed inserts may be constructed integrally with the disclosed mold construction rather than being inserted into a mold after a mold is constructed. For example, in some embodiments, the mold and the inserts may be of unitary construction and can be manufactured according to an additive manufacturing method (e.g., 3D printing). In some embodiments, the mold package and the inserts may be constructed separately and later combined. In some embodiments, the mold package can include an internal core supported by one or more supports. The internal core can allow the mold package to be used for the formation of hollow alloy parts. In some embodiments, the internal core itself may also be hollow and not necessary completely solid.

According to aspects of the present disclosure, the mold construction and methods of use thereof enable the production of solid and hollow shaped alloy parts (including metal alloys) that have significantly improved properties. In this regard, the alloy parts formed using the disclosed mold construction and methods of use thereof enable significantly faster cooling times of the alloy part, implying significantly faster production times. The formed alloy parts can exhibit a smaller grain size and eutectic boundary finer microstructure, more homogenous microstructure, and less porosity, implying improved ductility and tensile strength. In this regard, the physical characteristics of such cast alloy parts are comparable to those of forged alloy parts but are associated with significantly lower production costs. In addition, the disclosed methods of forming alloy components address the problem of using conventional aggregate molds for casting alloy parts by preventing the "pull in" of aggregate materials into the surface of the alloy part during the cooling process, disrupting a smooth finish. In contrast, the inserts disclosed herein prevent the pull in of aggregate materials into the surface of the alloy part when used in combination with a mold consistent with the disclosed embodiments. The disclosed mold construction and methods of use also can provide for a unique finish surface that is distinguishable from conventional casting processes. The unique finish surface is attributable to the plurality of hollow tubes disposed through the one or more inserts, which impart a shaped "dimple-like" surface finish on the formed alloy part. The surface finish can provide advantages over conventional alloy part finishes. For example, the surface finish can improve the coefficient of friction of the surface without further post-processing of the formed alloy part. Additionally, the disclosed mold formation and methods of use thereof improve the ability to form complex shaped alloy parts (e.g., parts with long thin sections) while preventing issues associated with premature solidification of the molten alloy during the casting process because the alloy has much less contact with the mold wall. In the case of an internal core, to produce a hollow shaped component, the solidifying alloy may have greater contact with the internal core. Finally, the disclosed methods and mold constructions facilitate the prevention of undesirable stresses from the mold construction during contraction of the alloy part during the cooling process. The disclosed embodiments are directed to the use of making a solid or hollow part and using an ablate substance to prevent and or reduce the internal solidification stresses of an alloy cast component and other improvements.

According to some embodiments, the disclosed inserts can be constructed of various metal alloys, ceramic materials, carbon and many carbon structures, and even certain polymers, such as common plastics. In some embodiments, the disclosed inserts can include a plurality of hollow tubes, which can number between approximately 400 to approximately 1500 hollow tubes within a 25 mm given area of insert (e.g., between approximately 1600 tubes and approximately 6000 tubes per square cm). In some embodiments, the hollow tubes can have diameters between approximately 50 microns to approximately 1000 microns. In some embodiments, the ratio between the length of a respective hollow tube and the diameter of the respective hollow tube within the insert can be approximately 25:1, although other ratios between the insert length and hollow tube diameter are not precluded. According to various embodiments, the hollow tubes through the inserts can be provided in various configurations and geometric hollow shapes. In this regard, the inserts can be provided in a linear configuration, while in other embodiments, the geometric hollow tubes can be provided in other shapes, such as an angled structure.

According to some embodiments, the inserts can be configured to enable cooling of the forming alloy part through direct impingement by providing a direct opening to the surface of the forming alloy part. Direct cooling of the alloy part can be accomplished, for example, by a cooling, heating, or ablate material in solid, liquid, or gas through the hollow tubes of the insert during the solidification or casting process. It is also possible to enable cooling in the forming alloy part by indirect impingement through the supports that hold an internal core within the mold cavity for forming a hollow or semi-hollow alloy part.

According to some embodiments, the inserts can be configured to enable heating of the liquid alloy metal poured into the mold or the alloy part through direct impingement by providing a direct opening to the surface of the forming alloy part. Direct heating of the alloy part can be accomplished for example, by providing infrared radiation through the hollow tubes of the insert prior, during, and subsequent to the casting process. Other methods of heating the alloy part are contemplated. For example, heating can be accomplished via electromagnetic energy supplied through a heat lamp, a diode, a laser, or other suitable means.

According to some embodiments, the disclosed mold formation and methods of use thereof enable the alloy part being formed to be insulated during the solidification or cooling process. In this regard, the molten metal can be insulated via the introduction of an appropriate insulating gas through at least a portion of the plurality of hollow tubes of the inserts. During the alloy molten part being formed a desired air gap can be created or formed to insulate the molten alloy from the walls of the mold.

The disclosed mold and inserts can be made of various appropriate materials. In some embodiments, the mold can be made of various metal alloys, an aggregate material, such as a silica sand. In some embodiments, the mold construction can be made of a combination of aggregate and metal alloy in various combinations.

According to some embodiments the inserts can be configured to provide support to a cooling alloy part while an aggregate mold or the aggregate mold and internal core is ablated away during the casting process.

According to some embodiments the supports can be configured to provide insulating or heating channels while filling the liquid alloy being cast.

According to some embodiments, the mold construction can include an aggregate layer disposed between the one or more inserts (e.g., between the plurality of hollow tubes) and the mold cavity. In some embodiments, the mold construction can include an aggregate solid or hollow internal core, to make a hollow component, and supported between the one or more inserts (e.g., between the plurality of hollow tubes) and the mold cavity. The aggregate layer can form an aggregate "shell" that can be formed to allow the formation of complex shaped solid or hollow alloy parts during the casting process while using standard sized inserts. In this way, the disclosed embodiments enable the formation of solid or hollow complex shaped metal components during the casting process while utilizing standard sized inserts. In some embodiments, the inserts are configured to allow for the curing of an aggregate layer within the mold cavity through the plurality of hollow tubes of the inserts.

In some embodiments, the mold construction can allow simultaneous heating and cooling through plurality of hollow tubes of the insert(s). For example, depending on the geometry of the alloy part to be formed, certain portions of the metal component may be cooled through the plurality of hollow tubes of in a first location to facilitate rapid cooling and a fine microstructure, while in a second location (e.g., a thin section of the alloy part) energy is introduced by various methods to the alloy filling the cavity, prior, during, subsequent to fill to prevent premature solidification via latent heat of solidification removal of the molten alloy while the mold cavity is being filled.

According to some embodiments, the mold construction can include a metal layer between the plurality of hollow tubes and the mold cavity. The metal layer can be configured to prevent metal flow from the molten metal within the mold cavity into the hollow tubes of the inserts.

According to some embodiments, the hollow tubes of one or more inserts can be filled with some aggregate. The aggregate within the hollow tubes can serve to modify the heat capacity of a respective insert, thereby modifying the cooling rate of the molten metal through the respective insert. In this way, the cooling rate of the molten metal can be customized in different portions of the mold cavity by selectively filling the hollow tubes of certain inserts with a layer of aggregate. The aggregate might also be a material substance that generates an exothermic reaction, and as an exothermic reaction at different rates of energy and different rates of a given energy over time. According to some embodiments, the internal core to make a hollow or partially hollow component may also serve to be customized by its aggregate to modify the cooling rate of the molten alloy and to work in conjunction with the hollow tubes filled with aggregate or exothermic material.

The disclosed mold embodiments can be used for casting a semi-solid alloy. In this regard, the disclosed mold package can be used to heat the semi solid during the filling process of the mold so that limited eutectic remains liquid to prevent cold shuts and/or confluent welds. According to various embodiments, the disclosed mold can aid in providing a high rate of cooling to the cooling alloy part because of the high solid fraction of alpha solid alloy. The reduced cooling time for the remaining eutectic may also reduce the growth of alpha iron and beta iron in the cooling alloy part. According to some embodiments, rotation or other mechanical methods could be used to impart energy into the mold to shear the alpha solid. The sheared alpha solid may be used to form a semi solid slug material that can be used for post semi solid secondary operations to be formed by casting the semi solid into a geometric component.

According to some embodiments, the disclosed mold construction can be used with an end-effector and robotic system. Additional information regarding end-effectors and robotic systems used with casting processes can be found in a co-pending U.S. Provisional Patent Application No. 63/733,766 entitled "Configurable End-Effector Used with a Casting Process," filed on Dec. 13, 2024 and having an Applicant of Alotech Limited R&D, LLC, which application is incorporated by reference herein in its entirety, and in co-pending U.S. patent application entitled "Configurable End-Effector Used with a Casting Process," filed under U.S. Pat. No. 63/733,766 on Jan. 16, 2024 and having an Applicant of Alotech Limited R&D, LLC, which application is incorporated by reference herein in its entirety.

Referring now to the drawings, wherein the showings are for purposes of illustrating several embodiments of the present disclosure and not for purposes of limiting same, FIG. 1 shows a perspective view of an embodiment of a mold construction 1000 including one or more inserts 1030. It should be noted that the mold construction 1000 shown in FIG. 1 shows one or more inserts 1030 that may have been manufactured separately from the mold construction 1000 and subsequently inserted into the mold construction 1000. However, in other embodiments, the mold construction 1000 may be of unitary construction with the one or more inserts 1030. In other words, according to some embodiments, the one or more inserts 1030 may be of unitary construction with the mold construction 1000. In some embodiments, the mold construction and the one or more inserts 1030 may be constructed using additive construction methods, such as via 3D printing additive manufacturing process. Various materials may be used in the formation of both the one or more inserts 1030 and the tool or mold construction 1000. In some examples, the tool or mold construction 1000 may be comprised of an alloy material including metals, ceramics, plastics, etc. In some embodiments, the tool or mold construction may be partly or wholly constructed of an aggregate material. It should be understood that in some embodiments, the mold and the inserts may be of unitary construction. In other words, each of a cope 1010, a drag 1020, and/or both of mold 1000 can be constructed of a unitary insert 1930 (as discussed below with respect to FIG. 19A) in place of an aggregate mold construction that includes one or more inserts 1030, as shown and discussed with respect to FIG. 1.

As shown, mold 1000 can include a cope 1010 and a drag 1020. The cope 1010 can have an outer surface 1012 and an inner surface 1014 that faces towards a mold cavity 1040. The drag 1020 similarly includes an outside surface 1022 and an inside surface 1024 that faces towards the mold cavity 1040. The mold cavity 1040 is defined as the space between the inside surface 1012 of the cope 1010 and the inside surface 1022 of the drag 1020. The mold 1000 also includes a sprue 1050 for filling the mold cavity 1040 with molten metal for the creation of a desired alloy part. Additionally, mold 1000 can include a riser 1060 for providing a reservoir of molten metal into the mold cavity 1040 during the casting process. It should be understood that the dimensions and construction of mold 1000 are representative only and non-limiting. The mold cavity 1040 can be sized and shaped to form differently sized and shaped solid and hollow metal components, as desired. Construction of mold 1000 can be accomplished from a variety of materials. In some examples, the mold 1000 can be constructed of a variety of metal alloys such alloys of iron, nickel, copper, aluminum, magnesium, titanium, etc. In some embodiments, the mold 1000 can be constructed of an aggregate material, which can include one or more materials such as silica sand, olivine, chromite, zircon, cenospheres, or mixtures thereof. In yet other embodiments, the mold 1000 can be a hybrid of both alloy portions and aggregate portions as desired including plastic, glass, and other materials that have a melting point above the melting point of the alloy. In yet other embodiments, the mold 1000 can be a hybrid of both alloy portions and aggregate portions as desired including plastic, glass, and other materials that have a melting point below the melting point of the alloy. It is possible to use materials that have melting points below that of the alloy for the mold because of the ability to provide continuous cooling through the mold 1000 with an ablate mixture. By providing cooling of the mold 1000, it is possible to keep the mold from melting even when the cast item experiences temperatures above the melting point of the mold 1000. It is further possible to use with any of the disclosed mold embodiments, a core 1040B, as shown in FIG. 15B, that may be constructed of a material below the melting point of the alloy and enable the core to soften or to ablate itself after the cavity is filled. It should be understood that the core 1040B does not necessarily need to have a melting point below the melting point of the alloy. In some embodiments, the core 1040B may remain in the formed alloy part to form a semi-hollow alloy part, while in other embodiments, the core 1040B may be ablated away or may melt away prior to or concurrent with the formation of the hollow alloy part.

As shown in FIG. 1, the mold 1000 includes four inserts 1030, but it should be understood that the number of inserts disposed within mold 1000 can be varied as desired. Additionally, the dimensions of the inserts 1030 can be varied as desired depending on the configuration of the alloy part being formed within mold cavity 1040. As shown in FIG. 1, the inserts 1030 are disposed within cope 1010 and extend from the outside surface 1012 of the cope 1010 through the inside surface 1014 of the cope 1010 approximate the mold cavity 1040. Although not shown, it should be understood that inserts 1030 can be disposed within the drag 1020 in a similar manner. In other words, inserts 1030 can be disposed within drag 1020 and extend from the outside surface 1022 of the cope 1020 through the inside surface 1024 of the drag 1020 approximate the mold cavity 1040. Inserts 1030 can be configured to support the solidifying molten metal of the alloy part during the solidification process. For example, in embodiments in which the mold 1000 is constructed of an aggregate which can be ablated away during the casting process, one or more inserts 1030 can support the cooling metal during solidification even after the aggregate material is removed from mold 1000 via ablation. According to some embodiments, each of the cope 1010, the drag 1020, and/or both of mold 1000 may be constructed entirely of an insert 1030, as shown and discussed in more detail with respect to FIG. 19A.

Figure 2:
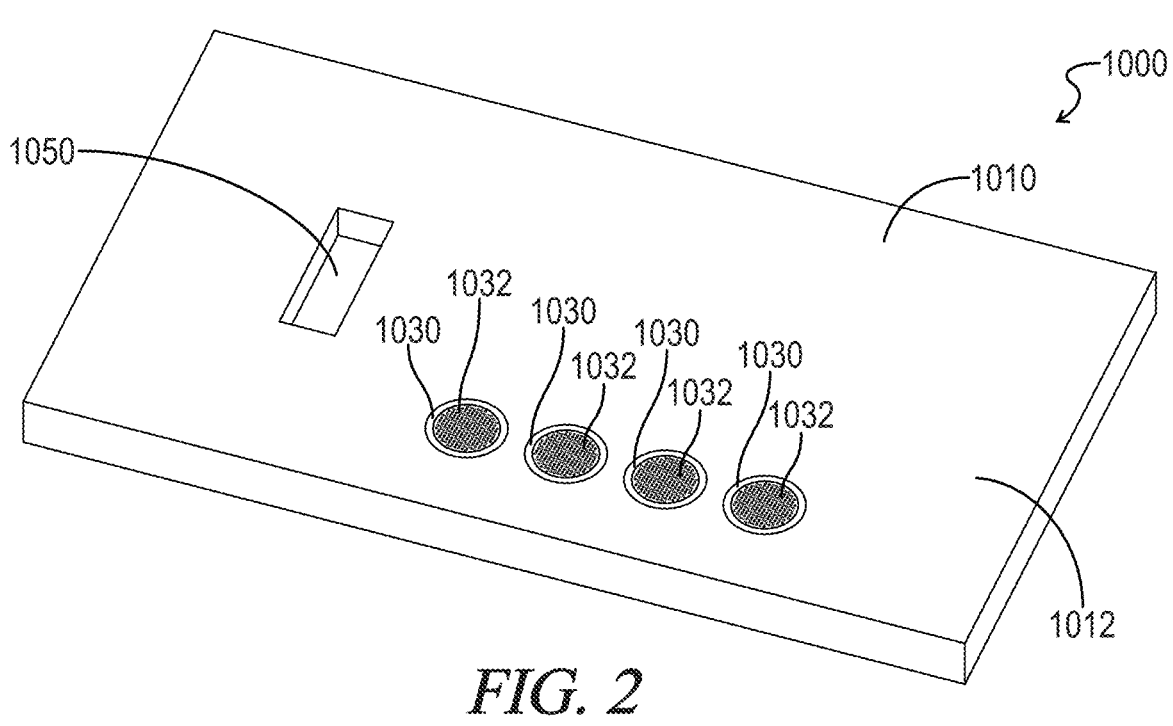
FIG. 2 shows a plan view of the outside surface of a cope of the mold construction of FIG. 1, according to aspects of the present disclosure.

FIG. 2 shows a plan view of the outside surface 1012 of a cope 1010 of mold 1000. Four inserts 1030 are shown disposed within the cope 1010 with an outside surface 1032 that is aligned with the outside surface 1012 of cope 1010. Although shown with respect to the cope 1010, it should be understood that the inserts 1030 shown in this configuration support the molten alloy against hydrostatic pressure and gravity and can be disposed in the drag 1020 in a similar manner as described with respect to the cope 1010. As will be shown in more detail and discussed with respect to FIG. 5, according to some embodiments, the inserts 1030 can include a plurality of hollow tubes 1036 that extend through the insert 1030. These plurality of hollow tubes can connect the outside surface of a respective portion (e.g., the cope 1010 or the drag 1020) of mold 1000 to the mold cavity 1040.

Figure 3:
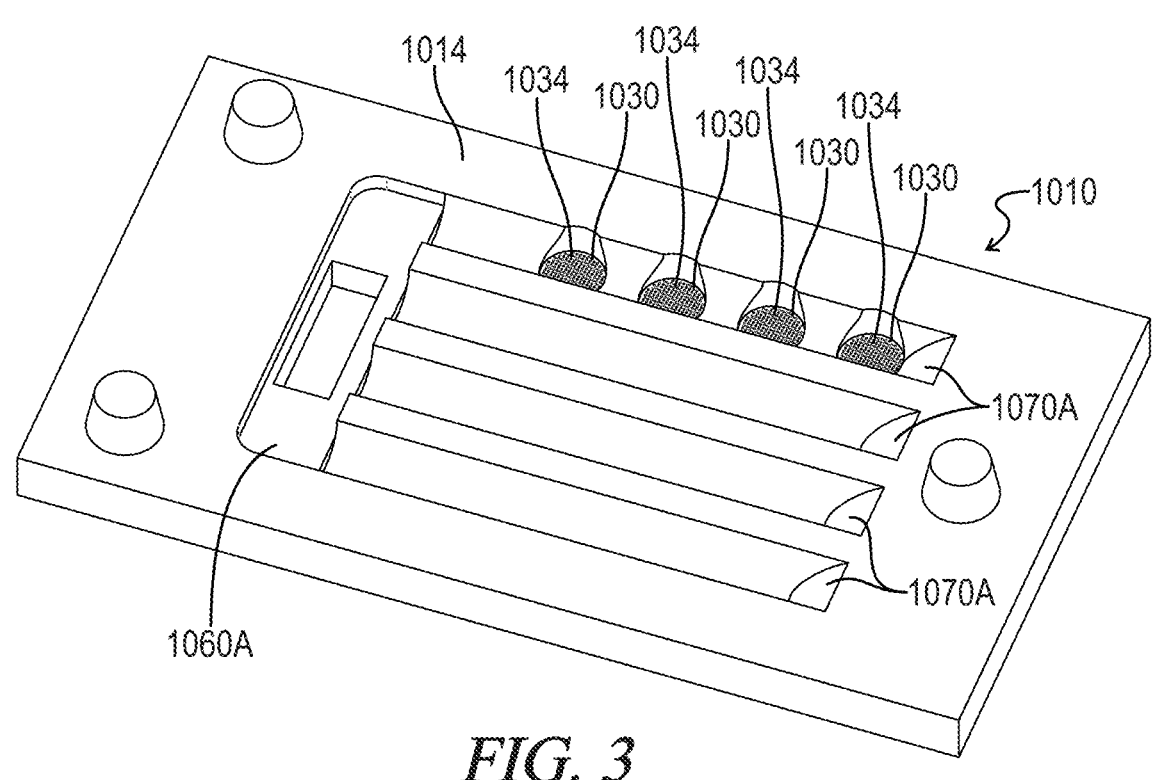
FIG. 3 shows the inside surface of the cope of FIG. 2, according to aspects of the present disclosure.
Figure 4:
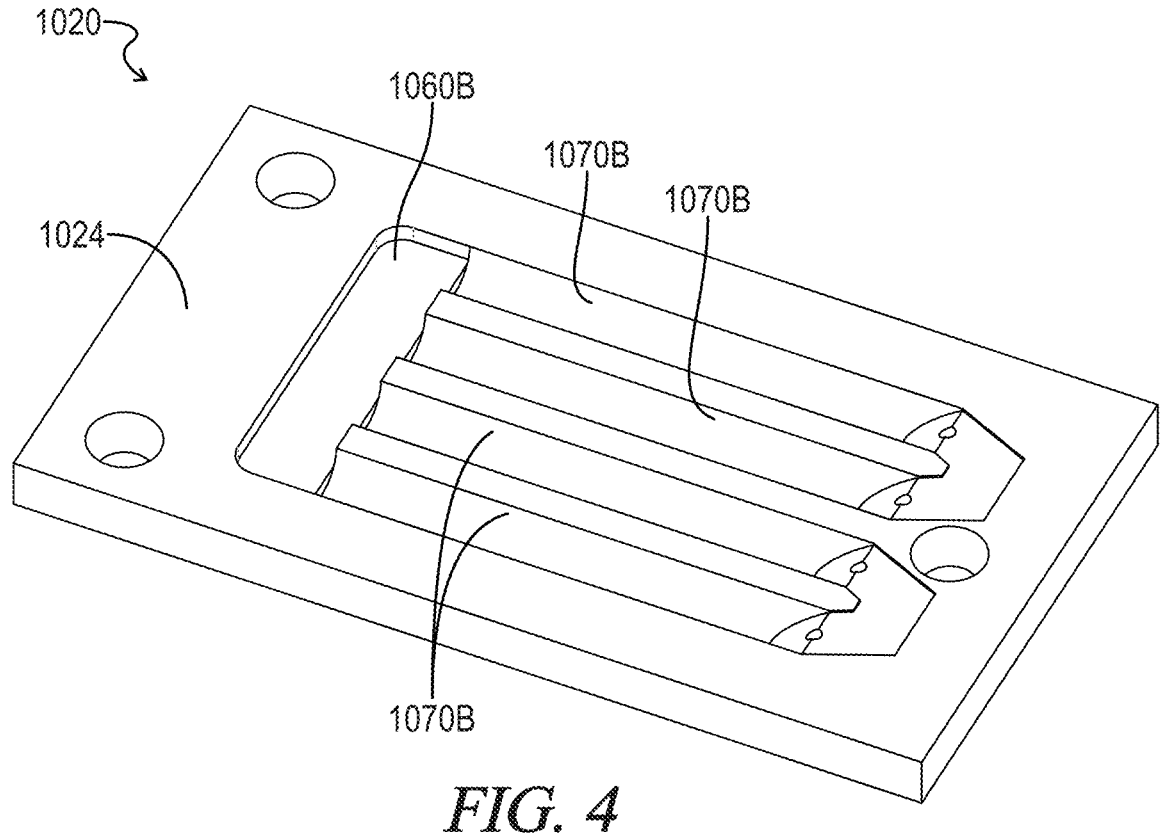
FIG. 4 shows a plan view of the inside surface of a drag of the mold construction of FIG. 1, according to aspects of the present disclosure.

FIG. 3 shows the inside surface 1014 of cope 1010. The four inserts 1030 are shown here with an inside surface 1034. It should be noted that FIG. 3 is depicted absent of an internal core 1040B and a supports 1502 and 1504, as shown in FIG. 15B. However, a person of the requisite skill in the pertinent field would understand that the embodiment of FIG. 3 can be combined with an internal core and one or more supports for producing a hollow part. Returning to FIG. 3, the inside surface 1034 is aligned with inside surface 1014 of cope 1010. Although shown with respect to the cope 1010, it should be understood that the inserts 1030 can be disposed in the drag 1020 in a similar manner as described with respect to the cope 1010. Additionally, in the embodiment of mold 1000 shown in FIG. 3, four cavity portions 1070A are shown within the inside surface 1014 of cope 1010 that, in combination with corresponding cavity portions 1070B of the inside surface 1024 of drag 1020 correspond to four solid test bars that mold 1000 is configured to form during the casting process. Also shown is riser portion 1060A that in combination with a corresponding riser portion 1060B within the inner surface 1024 of the drag 1020 form the riser 1060. It should be understood that the embodiment shown is just one configuration of mold 1000 and other configurations are envisioned for forming solid or hollow alloy parts of different configurations. FIG. 4 shows a plan view of the inside portion 1024 of drag 1020. Inside portion 1024 shows complementary riser portion 1060B and complementary cavity portions 1070B.

Figure 5:
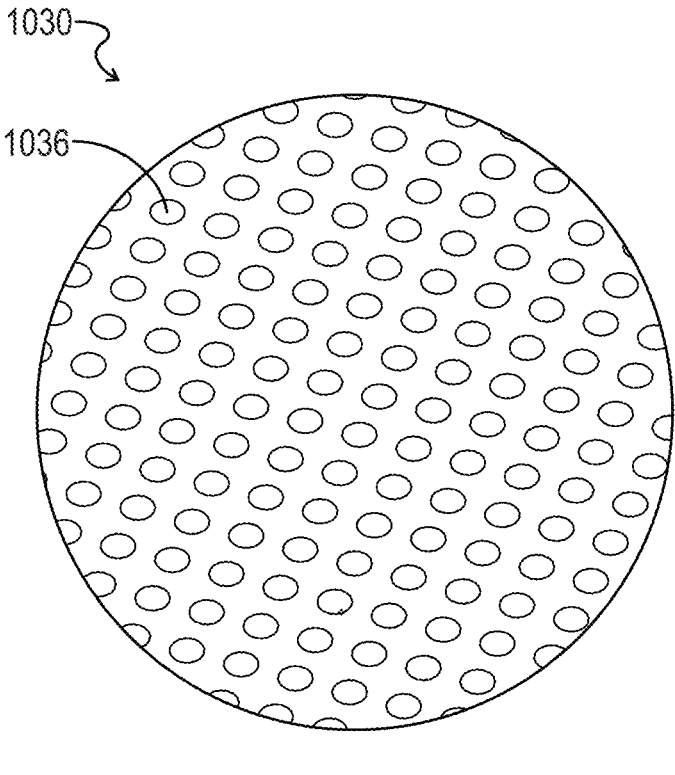
FIG. 5 shows a surface view of an exemplary insert, according to aspects of the present disclosure.

FIG. 5 is an enlarged view of an exemplary insert 1030. As shown, each insert 1030 can include a plurality of hollow tubes 1036 running between the outside surface 1032 of insert 1030 and the inside surface 1036 of insert 1030, thereby connecting the outside surface of mold 1000 to the mold cavity 1040. This construction allows for a number of advantages over a traditional mold for metal casting. For example, it is possible for the progression of molten metal to be visually observed through the plurality of hollow tubes 1036 during the casting process utilizing one or more imaging methods, such as an infrared camera. Another advantage provided by the plurality of hollow tubes 1036 is the ability to cool the molten metal during the casting process via direct impingement with a cooling liquid, such as water or another suitable cooling fluid. According to various embodiments, the cooling fluid may be configured to undergo a state change in response to impingement against the molten metal to be cooled. In some embodiments, the cooling fluid is configured to ablate a portion of the mold construction 1000, for example, when at least a portion of the mold construction 1000 comprises an aggregate material configured to be ablated away. The hollow tubes 1036 can also allow for direct heating of portions of the molten metal during the casting process. For example, infrared radiation or a superheated gas can be introduced through the hollow tubes 1036 to heat certain portions of the molten metal during the casting process. This may be advantageous for preventing premature solidification of portions of the metal casting, such as long thin sections, before the molten metal is able to fully fill the mold cavity. Further, certain portions of the alloy part can be insulated with a gas layer by providing an appropriate gas, such as carbon dioxide, argon, nitrogen, cyclopentane, sulfur hexafluoride, propyne, and/or various freons through the hollow tubes 1036 into the mold cavity 1040.

According to some embodiments, providing an appropriate gas into an exemplary mold during a solidification process of an alloy part facilitates a safe solidification environment by virtue of insulating the molten alloy from the surface of the mold, thereby reducing or eliminating the formation of an alloy oxide layer. Other advantages of providing an insulating layer of an appropriate inert gas includes facilitating the solidification of challenging metal alloys that include Magnesium, such as but not limited to, AZ91D, AZ81, AM60B, AM50A, AM20, AS41B, AE42. Appropriate gasses for such purposes may include, without limitation, sulfur hexafluoride, sulfur dioxide, Argon, and other inert gasses known in the art. Metal alloys containing Magnesium tend to create large metal oxide layers that expand during solidification, thereby causing the fracturing of the oxide layer, which alloys the cooling Magnesium alloy to come into contact with oxygen and rapidly catch fire. The disclosed systems and methods avoid the above-referenced problem by virtue of creating an inert environment through an appropriate gas that can be provided into the mold cavity via the one or more inserts.

Carbon dioxide has been identified as a potential medium for insulation materials due to its high thermal resistance value. Argon is another alternative gas that can be used for filling thermal insulation cavities. Cyclopentane is also used in gas mixtures for filling cavities in thermal insulation. Sulfur hexafluoride, propyne, and different freons have been investigated for their ability to diminish radiative heat transfer and improve transparent thermal insulation of windows. These gases offer interesting possibilities for enhancing thermal insulation in various applications, however, the disclosure is not expressly limited to the preceding exemplary inert gases for providing the insulating gas layer described above.

By introducing an appropriate gas to create a gas layer, cooling of the alloy part can be slowed as well as preventing the heating and expansion of the mold 1000. After the molten metal alloy has appropriately distributed itself throughout the mold core 1040, and potentially surround internal core 1040B to make a hollow component, direct cooling via a cooling ablate spray into the tubes 1036 can be initiated, thereby reducing the likelihood of issues associated with stress generation created by the contracting molten metal alloy's contact with the mold 1000 during the metal alloy's solidification.

The insert 1030 can be constructed out of various materials, such as ceramic or an appropriate metal alloy. The plurality of hollow tubes 1036 can be manufactured in various ways. The insert 1030 can be of various diameters and shapes, but in some embodiments, the insert 1030 can be between approximately 1 mm and approximately 5 mm in diameter. Insert 1030 can include any number of tubes 1036, but in certain embodiments, insert 1030 includes between approximately 500 tubes 1036 to approximately 1500 tubes 1036. Each tube 1036 can vary in diameter as desired. According to some embodiments, the tubes 1036 can have a density within each insert 1030 of approximately 1600 to 6000 tubes per square centimeter. In some embodiments, the tube diameters can range between approximately 300 microns to approximately 500 microns. In some embodiments, the ratio between the length of the tubes 1036 and the diameter of the hollow tubes within the support can be approximately 1:25, although other ratios between the tube length and hollow tube diameter are not precluded. In the configuration shown in FIG. 5 the tubes 1036 are in a linear orientation, but other configurations of tubes 1036 are possible as will be described in greater detail with respect to FIGS. 12A-12B.

Figures 6A, 6B:
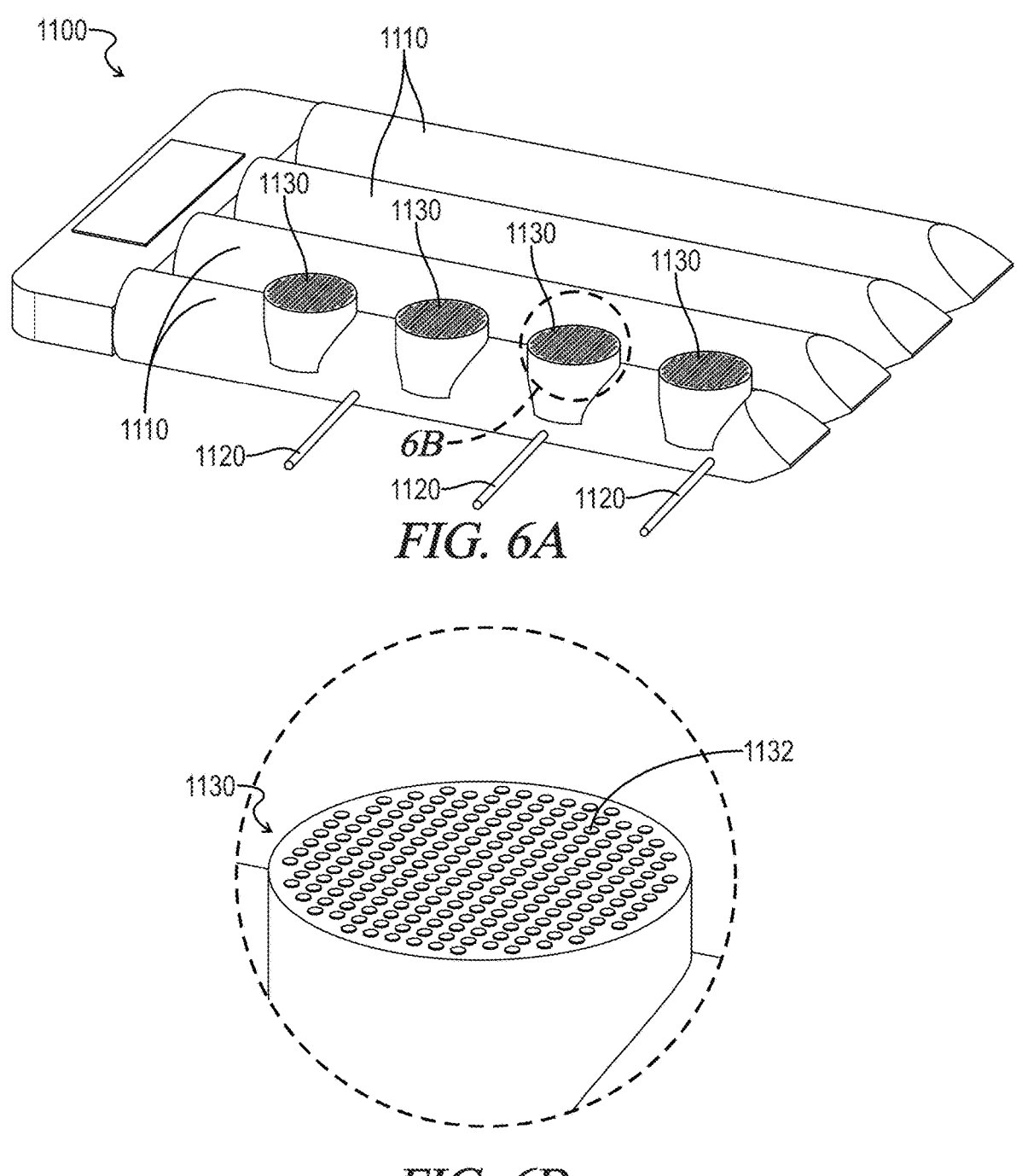
FIG. 6A depicts an exemplary alloy part formed by the mold construction of FIG. 1, according to aspects of the present disclosure. is an enlarged view of an exemplary insert, according to aspects of the present disclosure.
FIG. 6B is an enlarged view of a portion of the exemplary alloy part shown in FIG. 6A, according to aspects of the present disclosure.

FIG. 6A depicts an exemplary alloy part 1100 formed by the mold 1000. As shown, alloy part 1100 consists of four test bars 1110 that correspond to the cavities 1070 described with respect to FIGS. 3-4. Thermocouples 1120 are shown that allowed for the direct measurement of temperature of the molten metal of the alloy part 1100 during the cooling process. Additionally, portions 1130 are shown that are proximate to the inserts 1030 during the cooling process. Notably, as shown in FIG. 6B, the tubes 1036 of insert 1030 can impart a particular and unique surface finish 1132 to the alloy part 1100 during the casting process. There is a minute but visible dimpled surface that is resultant of contact between the molten metal of the cooling part and the tubes 1036 of insert 1030. Accordingly, the insert 1030 provides a similar surface appearance to a high pressure die casting but with a dimple golf ball visual appearance. Similarly, the internal structure for a metallurgical engineer examining the resultant solidification microstructures will be able to distinguish the unique structure of the alloy part 1100.

After the part is formed and solidified, it may be ejected through ejector pins as known in the art for permanent metal mold tooling. The ejector pin could be as small as 200 μm to eject the cast component during or after solidification. For all purposes, the ejector pin may be varied in size as desired. According to some embodiments, additional means of removing the solidified component from the mold 1000 can include pushing the internal core 1040B that is from the mold. For example, in situations in which the internal core 1040B is not removed (e.g., via an ablate spray) prior to solidification of the part, the internal core 1040B may harden, and become suitable for the application of force to push the solidified part out of the mold. The mold 1000 can be produced using a combination of an aggregate and an inorganic binder. In some embodiments, the aggregate can comprise silica sand and a 2.0% resin binder content by weight. The inserts 1030 can be introduced into the mold 1000 by drilling appropriately sized apertures through the mold 1000. In one example, the inserts can comprise approximately a 25 mm diameter with a 15 mm height, and an insert can contain approximately 700 to 900 tubes 1036 throughout the diameter of the support 1030. The supports can be disposed through the cope 1010, the drag 1020, or a combination of both. The alloy part 1100 was formed using the mold 1000. The alloy part was cooled by providing a cooling spray through the one or more inserts as the aggregate material of the mold 1000 was ablated by the cooling spray from the nozzle 1300.

The temperature of the alloy part 1100 can be measured according to several different methods. In some embodiments, a thermocouple (e.g., thermocouples 1120) can be inserted into the mold cavity 1040 in order to monitor the temperature of the molten metal as it cools to form alloy part 1100. In some embodiments, the temperature can be monitored using an infrared camera that can monitor the temperature within the mold cavity through tubes 1036 of the inserts 1030. Using one or both of the aforementioned approaches, it is possible to arrest the cooling process of the alloy part 1100 at the proper time. The thermal image camera can also be used to visually check the condition within the mold cavity 1040—namely, whether the mold cavity 1040 is partially or totally filled, collecting a live image of the liquidus to solidus temperature band during the cooling which can inform whether to continue cooling, retard the cooling, stabilize the cooling, or even apply heating to areas of the mold cavity 1040 for homogenization, solution, quenching, annealing, or rapid aging purposes. The ability to use infrared imaging to see through the mold cavity (e.g., via the inserts 1030) enables confirmation of how the mold cavity 1040 is filling with molten metal and thus enables the capture of a live thermal image of the alloy part 1100 during the mold cavity 1040 fill, cooling, and heating of the alloy part 1100. Non contacting sensing is made possible via the hollow tubes 1036 of the inserts 1030.

Figure 7:
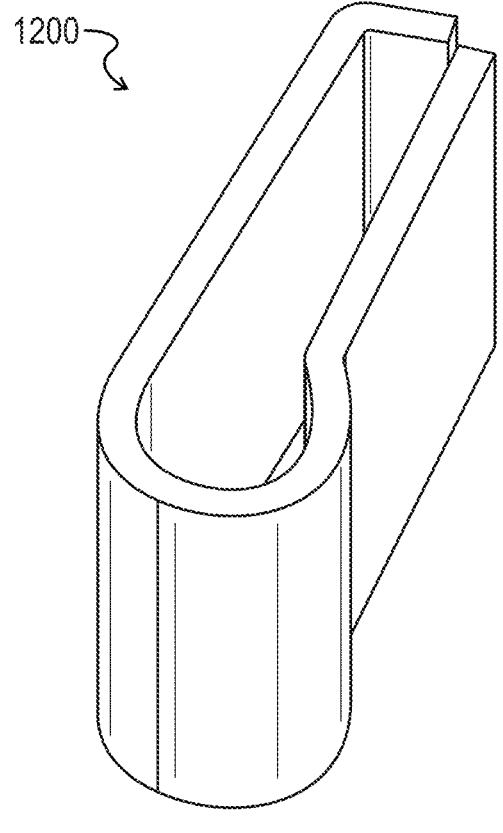
FIG. 7 depicts another exemplary alloy part formed by the mold according to aspects of the present disclosure.

FIG. 7 depicts another exemplary alloy part 1200 formed by the mold 1000. The resultant cast alloy part 1200 has superior mechanical properties as compared to traditional casting processes. For example, the ductility of alloy part 1200 is much higher than expected with a cast process, allowing alloy part 1200 to be bent in half without breaking, which is not possible with alloy parts formed using conventional casting methods. Such physical properties are resultant of the desirable dendritic microstructure, that in certain embodiments consistent with the present disclosure can be 30 microns in spacing and below.

However, it should be noted that the desired microstructure is determined by the use or application of the end-product. For example, a small grain size and fine microstructure is associated with alloy parts that have advantageous mechanical properties for parts that operate around ambient temperature. However, it may be advantageous to create a part with a large grain size under certain conditions, such as when the part is meant to operate at elevated temperatures. For example, a turbine blade is optimally constructed out of a single grain because at elevated operating temperatures, fatigue takes place between grain boundaries.

Figure 8:
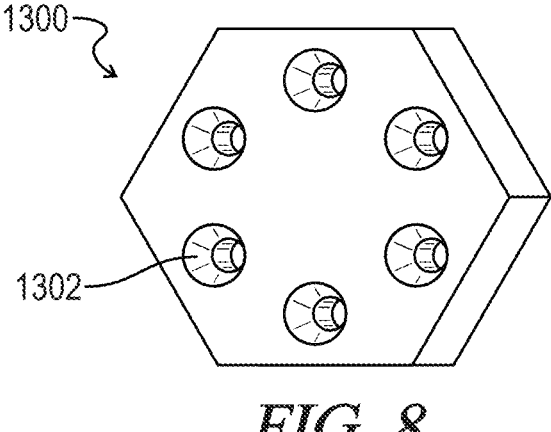
FIG. 8 depicts an exemplary spray nozzle for providing a cooling liquid through the one or more inserts, according to aspects of the present disclosure.

FIG. 8 depicts an exemplary spray nozzle 1300 for providing a cooling liquid through the one or more inserts 1030. The exemplary spray nozzle includes one or more apertures 1302 through which a cooling liquid, such as water, can be sprayed through the tubes 1036 of the inserts 1030. In some embodiments, the nozzle 1300 can have a single spray nozzle 1302. In a preferred embodiment, the nozzle 1300 includes a plurality of apertures 1302. The embodiment depicted in FIG. 8 shows exemplary nozzle 1300 having six apertures, although other configurations are possible.

Figures 9A, 9B:
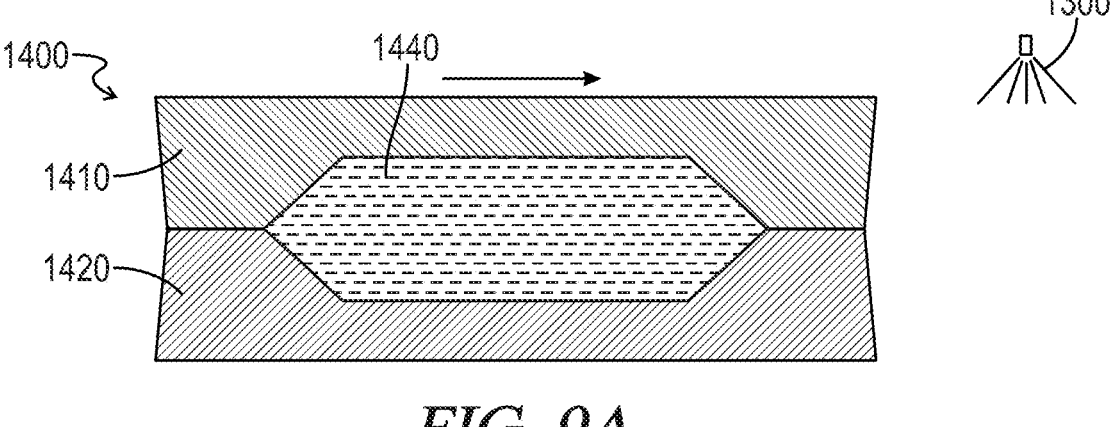
FIG. 9A is a schematic of an exemplary mold construction and ablation process for a conventional aggregate mold, according to aspects of the present disclosure.
FIG. 9B is a schematic of an exemplary mold construction and ablation process for a conventional aggregate mold, according to aspects of the present disclosure.

FIGS. 9A-9B are schematics of a conventional mold construction 1400 and ablation process for the conventional aggregate mold. As shown in FIG. 9A, a conventional aggregate mold 1400 can include a cope 1410 and drag 1420 that define a mold cavity 1440. In a conventional ablation process, after the mold cavity 1440 is filled with molten metal 1480 (e.g., gravity fed through a sprue), the aggregate can be ablated away via a nozzle 1300 that provides a high pressure water cutting jet that is capable of ablating the material of mold 1400, thereby cooling the molten metal within the mold cavity 1440 and exposing the molten metal within, as shown in FIG. 9B. As the molten metal 1480 cools it forms the alloy part 1490. However, a distinct disadvantage of the conventional ablation technique is that the alloy part 1490 is no longer supported after the aggregate of mold 1400 is ablated by nozzle 1300.

Figure 9C:
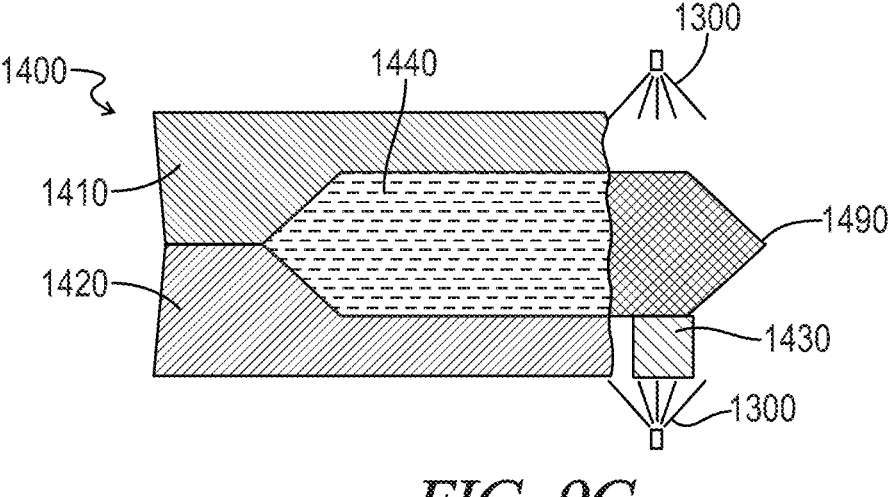
FIG. 9C is a schematic of an exemplary mold construction and ablation process for a conventional aggregate mold with a conventional solid insert, according to aspects of the present disclosure.
Figure 9D:
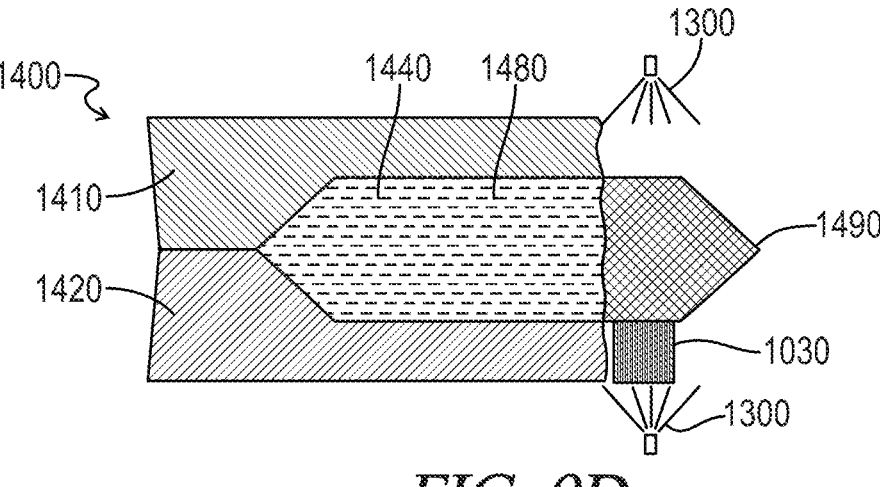
FIG. 9D is a schematic of an exemplary mold construction and ablation process for an aggregate mold with an exemplary insert with a plurality of hollow tubes, according to aspects of the present disclosure.

To address the deficiencies of the conventional ablation process shown in FIGS. 9A-9B, solid inserts 1430 have been included within an aggregate mold that provide support to the forming alloy part 1490. However, solid inserts 1430 are associated with another deficiency in the process, in that the solid inserts 1430 does not allow for direct cooling of the alloy part 1490 via direct impingement of a cooling liquid provided by nozzle 1300. Accordingly, alloy parts formed according to FIG. 9C would be associated with undesirable physical properties as a result of a slow cooling rate. The slow cooling rate is associated with a larger than desirable microstructure as well as a more porous microstructure. In contrast, as shown in FIG. 9D the proposed cast 1000 improves the performance of aggregate molds by providing inserts 1030 within the cast 1000 that simultaneously provides support to alloy part 1090 as it cools while also allowing for cooling through direct impingement with a cooling liquid via nozzle 1300. The tubes 1036 provide a direct route for the cooling spray to directly impinge on the alloy part 1090, allowing the alloy part 1090 to be rapidly cooled while being supported, which leads to a finer microstructure with less porosity.

It should be noted that although FIG. 9D shows an embodiment in which the mold 1000 comprises an aggregate construction, the mold 1000 can be constructed of mold, metal alloy, or combinations thereof as desired. The inserts 1030 can be used with any type of mold construction consistent with the present disclosure, including a fully metal mold, a fully aggregate mold, or a hybrid mold that has portions made of aggregate and portions made of metal. It should be noted that, according to some embodiments, the mold 1000 can be of unitary construction with the insert 1030. In other words, cope 1410, drag 1420, or combinations of both could be formed entirely of insert 1030, as is described in more detail with respect to FIG. 19A below.

The mold 1000 can be constructed using various different methods of manufacture. For example, the inserts 1030 can be constructed using additive manufacture (e.g., via 3D printing) in some embodiments, while in other embodiments, the supports 1030 can be produced using a conventional casting process by a tool to make an aggregate core that may be either organic or inorganic. The aggregate core can be drilled so that the inserts 1030 can be inserted, while in other embodiments, the aggregate can be manufactured to include apertures into which the inserts 1030 can be inserted. The aggregate mold can be produced from numerous materials, such as but not limited to, silica sand or ceramic generated sintered aggregate. In some embodiments, ceramic generated sintered aggregate may be preferable because such an aggregate exhibits a higher Mohs hardness which can help avoid fracture of the material during the casting process. Additionally, ceramic generated sintered aggregate may be more stable at casting temperatures thus avoiding an alpha to beta quartz transition that silica sand undergoes above 600 degrees Celsius.

The inserts 1030 can be made in ceramic, in various metal alloys, and in some embodiments, can even be produced from various polymers or plastics or combinations thereof. The selection of different materials directly affects the heat capacity of the inserts 1030 which affects the cooling rates of molten metal within the mold cavity 1040 during the casting process. A person of ordinary skill in the art would understand that the materials used for the inserts 1030 should be varied according to the desired cooling rate through the support during the casting process. When constructed of metal, the inserts 1030 can be constructed using powder metallurgy techniques, and in other embodiments can be cast and machined or produced by additive manufacturing (e.g., 3D printing). The hollow tubes 1036 can be micro drilled, although various other techniques for forming the hollow tubes 1036 are envisioned. In some examples, the hollow tubes 1036 can be created using sintering, electrical discharge machining, laser ablation, and the like. In some embodiments, the insert 1030 may be constructed using additive manufacturing (e.g., 3D printing). In such embodiments, hollow tubes 1036 may be formed as part of the additive manufacturing process of the inserts 1030.

It should be noted that a key distinguishing difference between the disclosed embodiments and conventional methods is that the disclosed mold 1000 and the inserts 1030 enable primary and secondary cooling to be simultaneously combined in the same process step. Conventional casting methods in all processes, which include also metal tooling for solidification, as with conventional "ablation" has separate primary cooling followed or sequenced by secondary solidification and cooling. In contrast, the disclosed systems and methods enables the immediate combination of primary and secondary cooling to drive a high cooling rate even prior to the alloy reaching the liquidus state. Additional unique combinations of primary and secondary cooling are made possible by the disclosed embodiments. In some embodiments, primary and secondary cooling can be applied at multiple locations through mold 1000. For example, an ablate mixture can be applied through a first insert 1030 and simultaneously a second insert 1030 disposed in a different area of mold 1000 while the molten alloy cools to form an alloy part. In some embodiments, secondary cooling can be applied prior to, or ahead of, primary cooling. For example, an ablate mixture can be applied through one or more inserts 1030 prior to the molten alloy moments before or ahead of filling the location of mold 1000 proximate to the one or more inserts. In this way, secondary cooling can be applied via the one or more inserts to mold 1000 prior to primary cooling. According to some embodiments, primary cooling may be applied to mold 1000 prior to secondary cooling of mold 1000, and upon application of secondary cooling, both primary and secondary cooling continue to cool a molten alloy to form an alloy part. Primary and secondary cooling can occur in multitude switching being applied and arrested at any frequency. According to some embodiments, a hollow or aggregate core can be provided within the mold cavity allowing for the formation of a hollow part, while still enabling above-described combinations of primary and secondary cooling. The disclosed systems and methods can use, according to some embodiments, a core 1040B as shown in FIG. 15B, while still facilitating primary and secondary to be applied in combinations described herein, even when the core 1040B is not removed prior to the alloy reaching the liquidus or the solidus state.

According to some embodiments, primary cooling, secondary cooling, and heating portions of the alloy part being formed can be combined in various combinations. In this way, embodiments of the present disclosure can enable energy to be simultaneously removed from the mold (e.g., via primary cooling and secondary in various combinations described above) in one or more first locations, while energy is simultaneously added into the mold (e.g., via heating methods including infrared heat, lasing, light application, etc.) in one or more second locations. For example, an ablate material can be provided through a first plurality of hollow tubes to provide secondary cooling to a forming alloy part in a particularly thick section, while in a thinner walled section, heat may be provided through any appropriate means to prevent the thin section from solidifying before completely filling the mold cavity. Continuing the example, primary cooling can be combined with secondary cooling in the location of the particularly thick section, and in the thin-walled section, primary cooling can be prevented by, for example, insulating the forming alloy part from the inner surface of the mold cavity with an appropriate inert gas. Additional combinations of primary cooling, secondary cooling, and heating in various portions of the mold are contemplated.

According to certain embodiments, the inserts 1030 can be between approximately 1 mm to approximately infinity (e.g., comprising the entire mold) in surface area to support multiple areas of the alloy part 1100 during the casting process. The inserts 1030 can be disposed within any part of the mold 1000 as desired. The insert 1030 includes a network of hollowed tubes 1036 that can be as small as between approximately 50 microns and approximately 1000 microns depending on the alloy and surface tension of the alloy. The inserts 1030 enables several advantages. Because of the hollow tubes 1036, the insert 1030 is see-through so that one or more imaging methods may be used to determine the progress of the mold cavity 1040 filling with molten alloy. In some embodiments, air or another suitable gas can be pushed into the mold cavity 1040 through the hollow tubes 1036 and the resistance to the gas stream can be measured, thereby determining the level of fill within a respective mold section of the mold cavity 1040. In some embodiments the fill level of the mold cavity can be measured using a laser probe.

In some embodiments, the tubes 1036 can be tightly packed within the insert 1030 such that the tubes 1036 can act as a "network bridge" to support the outer surface of the molten metal during the casting process. In most instances, the outer surface of the molten metal can form a metal oxide film on the outer surface of the mold cavity 1040 and can prevent the molten metal from passing through the tubes 1036 of the inserts 1030. It should be understood that the diameter of the tubes should be kept sufficiently small (e.g., less than approximately 1000 microns) to prevent the shearing of the metal oxide film layer, otherwise the molten metal may flow into the tubes 1036 of inserts 1030 during the casting process.

Figure 10A:
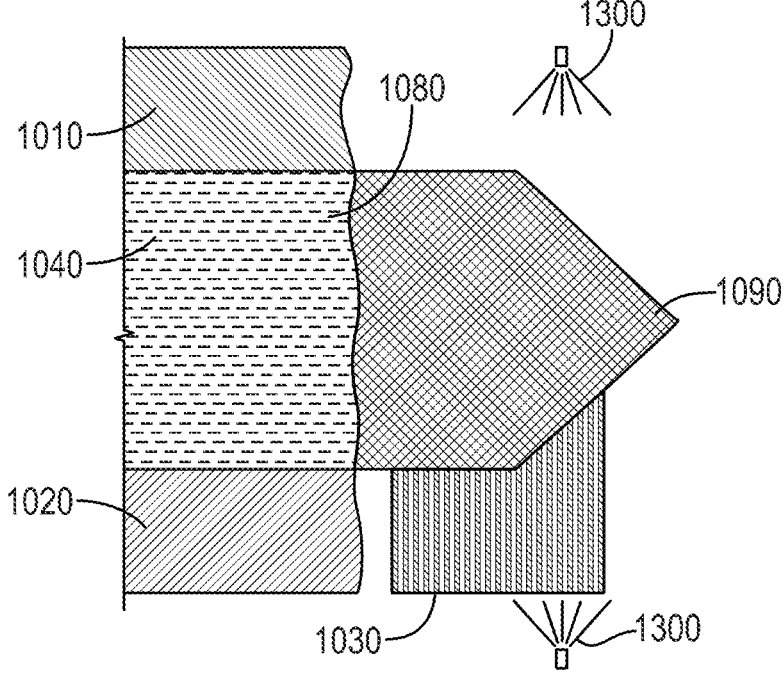
FIG. 10A is an enlarged view of the exemplary mold construction and ablation process of FIG. 9D, according to aspects of the present disclosure.

FIG. 10A is an enlarged view of the exemplary mold construction 1000 and ablation process of FIG. 9D. As can be seen, the inserts can 1030 can be constructed of various standard sizes according to the desired shape of the alloy part being formed. According to various embodiments, the plurality of tubes 1036 can act as a cooling fin if the hollow tubes 1036 have sufficient amount of solid material between each hollow tube—that is, by increasing the spacing between adjacent hollow tubes 1036. The increased width and spacing can cause an increase in surface area insert 1030 surrounding the tubes 1036 which increases the heat capacity of the insert 1030. The specific heat capacity of the insert 1030 can be adjusted to suit the needs of the specific application, as desired. The insert 1030 can be made of nearly any material that is inert within the mold and such that it does not dissolve when in contact with the molten metal of the cooling alloy part. According to some embodiments, when the diameter of the tubes 1036 is approximately between 50 microns to 1000 microns, the length of the insert 1030 can be approximately 13,000 microns (13 mm). The ratio between the width of a hollow tube 1036 and its length can be approximately 1:25 in some embodiments. For example, a ratio of approximately 1:25 may be desirable for the construction of a more insulative mold. However, when a mold is desired that is able to shed heat more quickly, larger ratios of width to length may be desirable.

Cooling through the tubes 1036 of the inserts 1030 can operate in the following way. The nozzle 1300 provides a cooling spray and droplets of coolant, heating, and/or ablate material travel through a respective hollow tube 1036. Note however, that the coolant, heating and/or ablate material can be a solid, gas, a liquid, or combinations thereof.

The droplet impinges upon the molten metal 1080 within the mold cavity 1040 and turns to steam, i.e., undergoes a phase change such as in water to steam, which may cause expansion (depending upon what ablate material is used) compared to the liquid form and generates pressure within the mold cavity. The steam is propelled out of the mold cavity 1040 through adjacent hollow tubes 1036. In limited cases a single tube 1036 can be employed for cooling when a low casting modulus is employed (e.g., a low volume to surface ratio of the alloy part to be formed), provided that there is at least one other tube for allowing steam (or other gas) to escape the mold cavity 1040. Notably, the small size of the hollow tubes 1036 allow for fine control over which portions of the mold cavity 1040 are heated and/or cooled. The heating or cooling can be performed in an area as small as 50 microns (e.g., approximately the size of a single tube 1036). In some embodiments, immediately after cooling, heat can be supplied into a portion of the mold, which can be advantageous for promoting homogenization following the solidification process, thereby minimizing the time to heat the product to address inverse segregation of the alloy part being formed. In this regard, after the alloy has solidified, the alloy can be arrested in cooling above the solvus temperature of the alloy. Certain elements (in some examples, Magnesium) of the alloy that are desired to be inside the alpha solid of the alloy at the solvus temperature may migrate back into the alloy. During cooling, elements may have been pushed out from the dendrites formed during the cooling process. Once the cooling is arrested, the elements that have migrated (e.g., Mg) can migrate back into the alpha solid which promotes homogenization. As discussed herein, "inverse segregation" refers to the entrapment of solute rich liquids flowing back into inter-dendritic regions of the alloy to compensate lack of solubility during solidification including shrinkage of the molten alloy during solidification. Ideal cooling of an alloy may result in a material with small cells, dendrites, thin eutectic and small amounts of eutectic at grain boundaries, mitigating iron phases and iron platelet thickness, and homogeneous finer precipitants such as $Mg_2Si$ and other intermetallic during solidification, and accordingly, superior mechanical properties. Examples of homogenous finer intermetallic precipitants may include, in a nonlimiting fashion, intermetallic common in the 6000 series such as $Mg_2Al$, $MgZn_2$, $CuA_2$, MgZnCu, S-phase, $Al_7Fe_2Cu(Mn)$, $Al_{15}(FeMn)_3$ $(SiCu)_2$, S phase ($Al_2CuMg$), $Mg_2Si$, $\theta$ phase ($Al_2Cu$), $Al_7Cu_2Fe$, $(Al, Cu)_6$ (Fe,Cu), $Al_3Fe$, $Al_6$ (Mn, Fe), $\alpha$-$Al_8Fe_2Si$, $\beta$-$Al_9Fe_2Si_2$, and $Al_3FeSi_2$.

According to some embodiments, $(Al,Cu)_6$ (Fe,Cu), $Al_7Cu_2Fe$ intermetallic in Fe-phases, including the harmful Fe-phase, $\beta$-$Al_5SiFe$, can occur during different thermal solidification paths and can be limited by processes disclosed herein using mold 1000, as intermetallic precipitants can be controlled by thermal processing solidification and can additionally or alternatively, be in situ altered $Al_6(Mn, Fe)$, $\alpha$-$Al_8Fe_2Si$, and $\beta$-$Al_9Fe_2Si_2$.

Inverse segregation occurs when solutes come out of the alpha liquidus during cooling. Solutes dropping out of the alpha liquid can end up between the dendrite arms of the cooling alloy. The alpha liquid can be pushed away by these solutes and thus cause porosity between the dendritic arms.

According to some embodiments, to address the issues identified above, a mold 1000 may initially be rapidly cooled (e.g., via cooling through tubes 1036 of one or more inserts 1030) and after a predetermined period of time, which may be varied depending on the geometry of the mold, the alloy being used, and other factors, cooling in the mold may be arrested. In some embodiments, during the arrested cooling period, additional heat may be added into the mold cavity 1040, for example, via the introduction of infrared heat and/or superheated gas through tubes 1036 of inserts 1030. During the arrested cooling phase, the alpha liquid is able to fill the porosity formed as described above and reabsorb some of the solutes that fell out of the alpha liquid, thus reducing inverse segregation.

According to some embodiments, the disclosed embodiments are configured to prevent confluent metal flow paths from forming a weld shut during cooling of an alloy part in the mold 1000. For example, when forming a thin-walled alloy part, the thin section being formed can undergo premature solidification. A cold shut can be understood as when the liquid alloy front prematurely freezes before fully filling mold cavity 1040, thereby forming porosity. The liquidus alloy front may slow and stop. The solidification reaction causes an exothermic release of energy, which may cause remelting of a portion of the solid front which may fill the porosity and create a confluent fill. The confluent fill may meet the previously frozen liquid alloy front and produce a confluent weld. A confluent weld may be distinct from a normal weld in that there is no anatomical bond between the solidified portions. In other words, a weld shut is a defect within the structure of the alloy part that cannot be easily detected using conventional methods. However, by iteratively providing cooling and subsequently arresting cooling, the disclosed systems and methods are able to prevent the formation of unwanted confluent welds and weld shuts.

According to some embodiments, cycles of rapid cooling followed by arresting cooling are repeated iteratively during the cooling process to improve material properties of the part being formed by mold 1000. According to some embodiments, a pulse of approximately 1 second of cooling followed by 2.4 seconds of no cooling may be used to form an alloy part with superior mechanical characteristics (e.g., reduced dendritic arm spacing, reduced porosity, limiting confluent metal flow paths forming weld shuts etc.).

In some embodiments, the tubes 1036 allow for a far greater heat permeability in a mold 1000 compared to conventional molds 1400, while also allowing for direct impingement of the molten metal with ablate liquids, cooling liquids, and/or superheated air or gas for heating areas of the molten metal forming the alloy part, as desired. While conventional casting technologies rely upon latent heat removal from the molten metal through the mold itself, the disclosed embodiments allow for rapid cooling through the tubes 1036 of the inserts 1030 using cooling mediums and/or radiant heat loss, which allows for finer microstructure of the resultant alloy part. Additionally, the structure of the tubes 1036 also allow for fine control of which areas of the mold cavity are exposed to heating or cooling media spray. The inserts 1030 can act as a shield for areas that could otherwise be unintentionally ablated away in a conventional mold ablation process, such as shown in FIGS. 9A-9B.

In some embodiments, it is desirable to insulate the mold cavity so that no superheat of the cast liquidus is lost to the surrounding and the alloy is kept as close to the melt furnace casting temperature during the fill. While difficult to accomplish with conventional casting methods, the disclosed embodiments allow for an insulative gas layer to be introduced into the mold cavity (e.g., air, inert gas, etc.) that may additionally be superheated to prevent heat loss while the molten metal distributes throughout the mold cavity. Once the mold cavity is appropriately filled, the same tubes 1036 can then be used to rapidly cool the part through a cooling liquid spray by nozzle 1300. The tubular structure, or network of tubular structures of the insert 1030 can also rapidly heat if enough molten alloy is flowing across the tubes 1036. Accordingly, in some embodiments, the mold 1000 can be first dipped or rather flushed by a molten alloy, which applies heat energy to the mold 1000 and allows the mold cavity 1040 to reach approximately the same temperature of the molten alloy. The mold cavity 1040 can remain at approximately the same temperature of the molten alloy for a short period of time after the mold is flushed or removed from the molten alloy. After such a dipping or flushing procedure, it is possible to then fill the mold cavity with new molten alloy for creating a thin-walled part. The latent heat of the mold cavity present due to the dipping or flushing procedure can thus prevent the premature solidification of the thin-walled part prior to the even distribution of the molten alloy throughout the mold cavity 1040. According to some embodiments, prior to the aforementioned dipping procedure, the mold 1000 may be coated with a coating for insulating the molten in the liquid state from the outer wall of the mold 1000 to prevent potential premature inflow of molten alloy into mold cavity 1040. The coating can be of any desired type, but in at least some embodiments, the coating can comprise a layer of fine hollow spheres that are sprayed or otherwise applied to the outer surface of the mold 1000. In instances in which a coating is used, the coating may be ablated away using a coolant spray, a liquid media, or a cutting jet.

Additionally, when introducing an air gap, or an inert gas, such as nitrogen or argon, through the tubes 1036, the inserts 1030 can retard cooling with the insulating layer formed by the air gap. In some embodiments, the air gap can be approximately 50 to 1000 microns in width and depth within the mold cavity. The air gap acts similarly to a hollow aggregate or cenosphere to insulate the alloy part. The contact surface between the surface of the molten alloy and the inserts 1030 is minimized by the introduction of the air gap. To aid in retarding the cooling the ratio of the insert 1030 to the size diameter of the tubes 1036 can be adjusted so that the radiation energy loss emitted through the inserts 1030 is minimized.

The air gap can be formed by providing a gas at an appropriate pressure through the tubes 1036 of the insert 1030. For example, the pressure supplied into the mold cavity 1040 can range from approximately 0.001 bars to approximately 30 bars, depending on the specific goals and application. The gas used can be hot air or any type of insulating gas known in the art (e.g., argon, nitrogen, etc.). In some embodiments, dry ice can be used and the sublimation of the dry ice could form the gaseous gap so that the molten metal can solidify while levitating above the surface of the mold cavity 1040. There are numerous advantages to this approach. For example, hot tearing of the cooling molten metal can be avoided in areas of the alloy part that are partially solidified (e.g., areas that have a high solid fraction between the liquidus and the solidus). In conventional casting processes, liquid alloy may be prevented from filling in during the contraction caused by the slow overall rate of cooling preventing feeding necessary and thus cause a void, crack, or tear, in the solidifying structure due to the stresses that occur during the contraction.

In addition, adding an air gap into the mold cavity 1040 also can prevent the mold 1000 from expanding. Because of the insulative air gap, the mold 1000 remains at the coolant temperature and then does not heat up or expand. Because of this, at least 50% less stress from hot tearing is avoided because the tool dimensions remain fixed and the natural contraction of the alloy is allowed to take place without touching the inner surfaces of the mold (e.g., inner surfaces 1014 and 1024 of the cope and drag, respectively). Thus, molds constructed according to embodiments of the present disclosure have an advantage over conventional molds in which the mold itself cannot be thermally managed in this way.

In some embodiments, the mold 1000 can be covered in inserts 1030 (e.g., over the whole surface of cope 1010 and drag 1020). In such embodiments, several types of solidification can be enabled. In this regard, a mold 1000 can be filled and supplied with an "air gap" as described above. The molten metal can float on the air gap while being distributed throughout the mold cavity 1040. After the mold cavity 1040 is filled, the pressure within the mold cavity can be increased, thereby enabling an increase in surface area to increase contact cooling through the tubes 1036. The increased surface contact within the hollow tubes 1036 can set off rapid cooling as the air gap is reduced or eliminated. Pressure can be increased in the mold cavity 1040 according to various known methods in the art. In some examples, liquid alloy is pushed under pressure into a mold 1000. An outer surface of the liquid alloy may form an oxide layer as it cools. The oxide layer may have sufficient surface tension to restrict the flow of liquid alloy and allow pressure to rise within the mold cavity 1040. Pressure can also be generated by gravity or through various pump mechanisms for filling mold 1000.

While heating has been described via providing a heated gas into the mold cavity 1040, in some embodiments, heating can be accomplished via infrared radiation. For example, infrared radiation between approximately 0.5 microns to approximately 1000 microns can be passed through the hollow tubes 1036 of the inserts 1030 and into the mold cavity 1040. Infrared heating can produce temperatures up to several thousand degrees above absolute zero centigrade.

In some embodiments, a method for heating a mold can include providing a superheated gas into the mold cavity 1040. The cooling of the alloy during the normal filling process can be retarded if the superheated gas is above the pouring alloy liquidus temperature when the mold cavity 1040 is filled or if the mold 1000 is heated to extend the pour time to retard an incomplete filling of the mold cavity 1040. Additional thermal energy provided into the mold cavity 1040 provides additional benefits of allowing to fill long thin sections of an alloy part without the liquidus prematurely transitioning into solidus retarding the fill of the mold cavity. Thermal energy provided into the mold cavity provides the additional benefits of reduction of alloy segregation, allows for a finer microstructure (e.g., a reduction in the secondary dendritic arm spacing or inverse segregation), improved uniform surface finish of the alloy part, and can limit cold shuts and prevent confluent metal flow paths forming a weld shut.

In certain embodiments, areas of the mold cavity can be simultaneously cooled in one location (e.g., in a thick section that is already fully filled in the mold cavity) while simultaneously heating in another area (e.g., a long thin section that has not completely filled with molten metal). The tubes 1036 of the disclosed inserts 1030 allow for the simultaneous heating in cooling in disparate areas of the mold cavity 1040.

In some embodiments, the insert 1030 can be produced in metal and it can aid the heat extraction from the mold cavity 1040 depending on the specific heat of the material used, the diameter of the hollow tubes 1036, and the spacing of the tubes 1036 within the insert 1030.

Figure 10B:
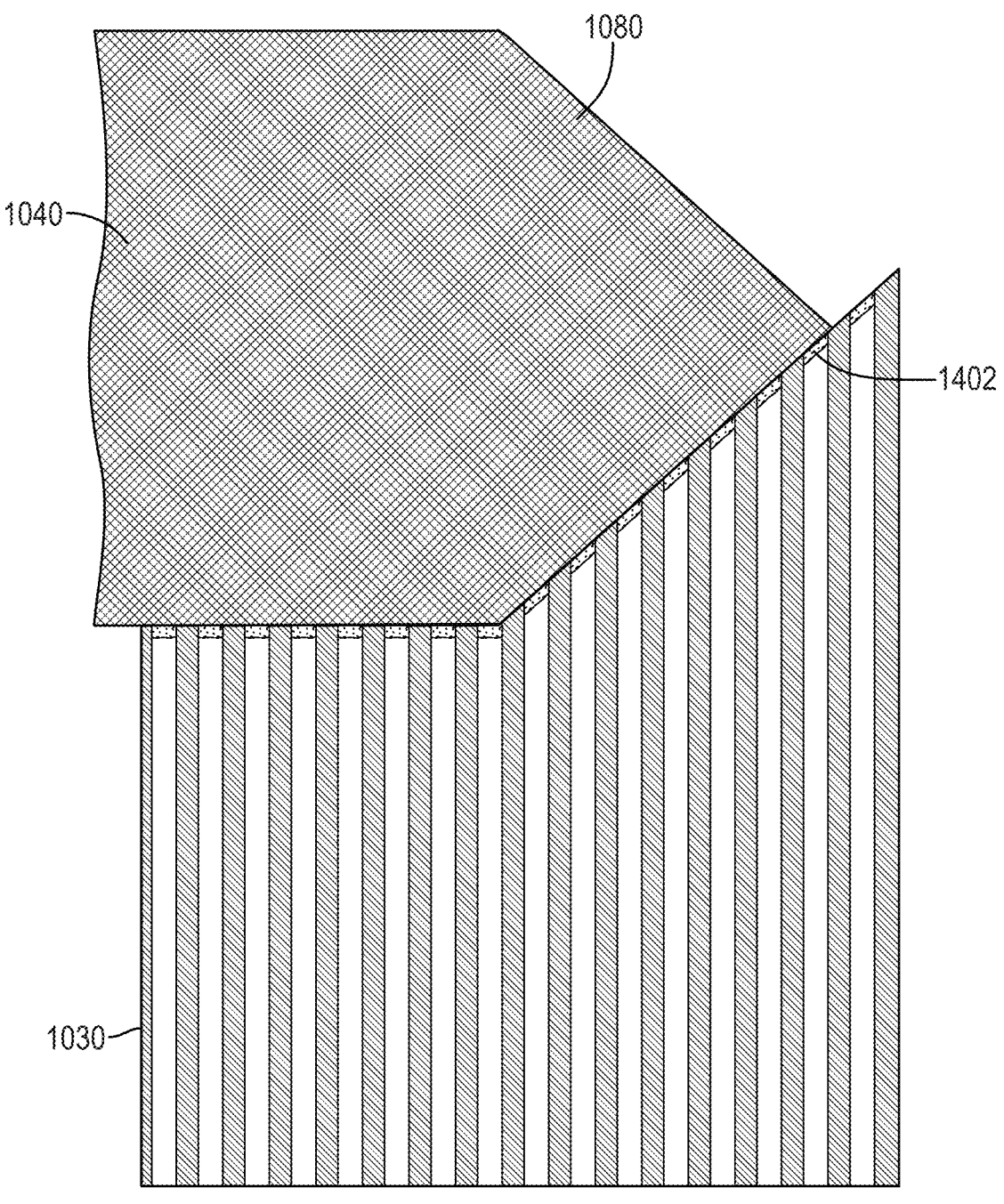
FIG. 10B is a view of an exemplary mold construction and ablation process including one or more inserts filled with an aggregate, according to aspects of the present disclosure.

FIG. 10B is a view of an exemplary mold construction and ablation process including one or more inserts 1030 filled with an aggregate, according to aspects of the present disclosure.

In some embodiments, a fine aggregate can be placed within the tubes 1036 of one or more inserts 1030. In such embodiments, a binder may not be necessary, as the tubes 1036 themselves provide sufficient friction to retain the aggregate material. The addition of an aggregate within the tubes 1036 may serve to alter the heat capacity and thus the cooling rate through the inserts 1030 depending on the heat capacity of the material of the insert 1030 and the heat capacity of the aggregate used to fill the tubes 1036. Additionally, the aggregate within the tubes 1036 can be dispersed by the ablate media or forced air and combinations thereof as desired by introducing an ablate spray, a liquid media, or a cutting jet (e.g., via nozzle 1300) through the tubes 1036 of the inserts 1030. There are numerous advantages to introducing aggregate without having to use a binder. Binders absorb energy and depending on the type of binder may remove $H2O$ content during the ablation process. Because of this, the binder may contribute to cooling which may not be desirable, and limits the ability of the mold to be fully insulative as is desirable in certain embodiments consistent with the present disclosure. In this regard, an insulative mold is advantageous during the mold fill and cooling processes especially for the formation of thin-walled parts, because it avoids issues related to inverse segregation, weld shuts, porosity, etc. A less insulative mold may be preferable for the fill and cool of alloy parts with thicker sections, as the objective swings towards being able to rapidly cool the mold.

In some embodiments, the tubes 1036 of the inserts 1030 can act also as a vacuum bed and can serve many purposes in this regard such as to pull a thin, pliable material (e.g., a plastic thin sheet) to contort fully to the mold geometry which creates a uniform surface finish. When using a plastic hydrocarbon material, the material may be oxidized during the filling of the mold which creates a desirable and smooth surface finish. This process may be utilized to manufacture cast auto wheel faces with a smooth surface finish.

In some embodiments, one or more areas of the mold 1000 (e.g., a riser) may be heated through one or more inserts 1030 to eliminate exothermic reactions that can create undesirable hydrocarbon products that can occur while the alloy part 1100 freezes. In this regard, if a portion of the mold comprises an aggregate material bound with a binder glue, as the alloy part cools the glue may contribute off-gassing that would not be able to escape a mold cavity of a conventional mold, potentially leading to a rapid buildup of pressure and explosion. However, mold 1000 allows the gasses released from the binder glue, as well as steam from ablation or a cooling jet, to exit the mold cavity 1040 via the tubes 1036 of the one or more inserts 1030.

In some embodiments, the mold can include anywhere between one to two hollow tubes 1036 up to millions of hollow tubes 1036 depending on the desired configuration. By providing aggregate within the hollow tubes 1036, the glue or binder in the aggregate can be minimized or eliminated. Thus, the undesirable off gas and added cooling by the binder is eliminated.

Figure 10C:
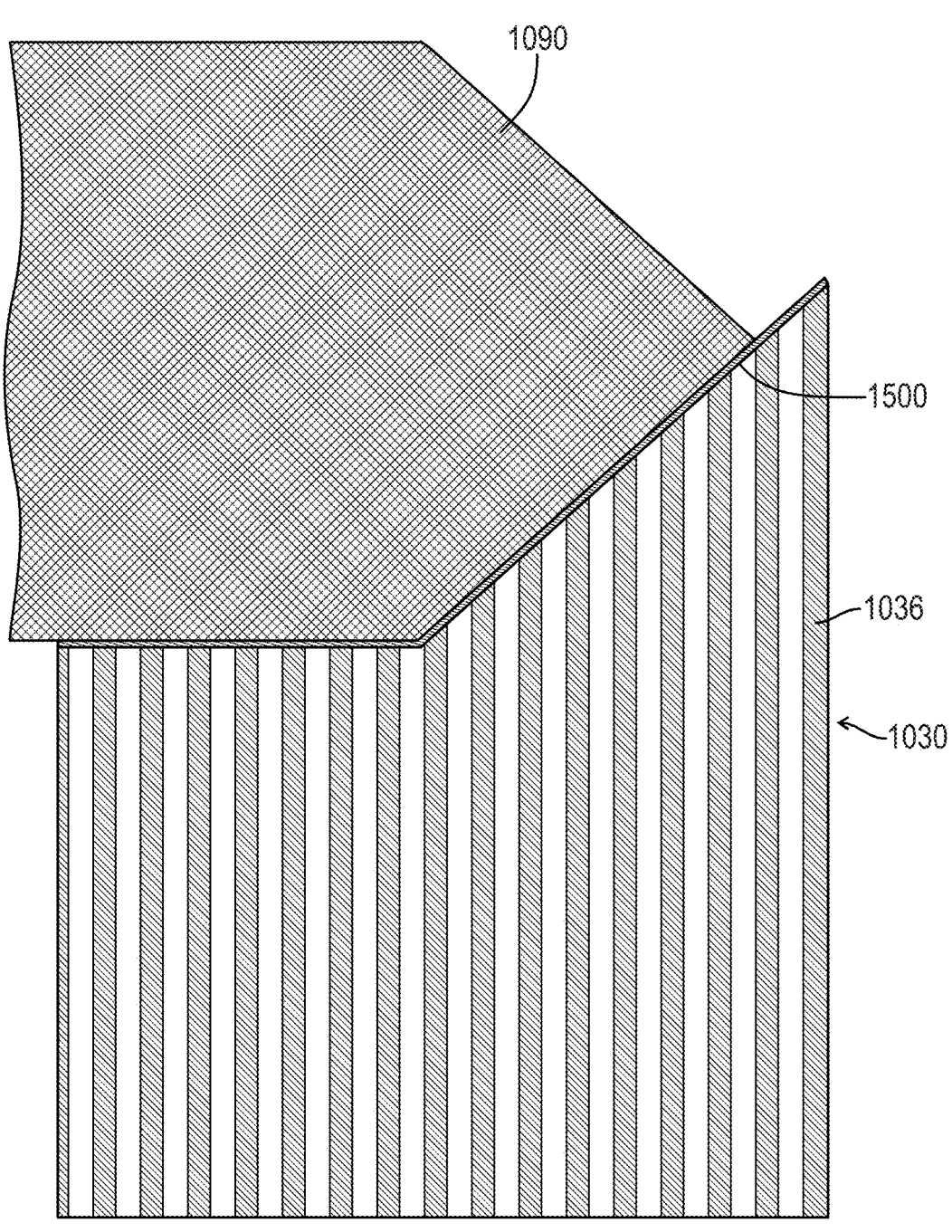
FIG. 10C is a view of an exemplary mold construction and ablation process including one or more inserts and a metal layer disposed between the inserts and the mold cavity, according to aspects of the present disclosure.

FIG. 10C is a view of an exemplary mold construction and ablation process including one or more inserts 1030 and a metal layer disposed between the inserts 1030 and the mold cavity, according to aspects of the present disclosure. As shown in FIG. 10C, in some embodiments, the mold 1000 can be provided with a thin metal layer, or any number of materials, such as plastic etc. 1500 disposed between the interior of the mold cavity 1040 and the tubes 1036 of the inserts 1030. In some embodiments, the thin layer can be constructed out of aluminum and can serve to prevent molten metal 1090 from penetrating the tubes 1036 of the inserts 1030. In embodiments in which the diameter of the tubes 1036 is greater than approximately 400 microns, it may be advantageous to include a thin layer 1500 to prevent molten metal 1090 from penetrating into the tubes 1036 of inserts 1030.

Figures 11A, 11B:
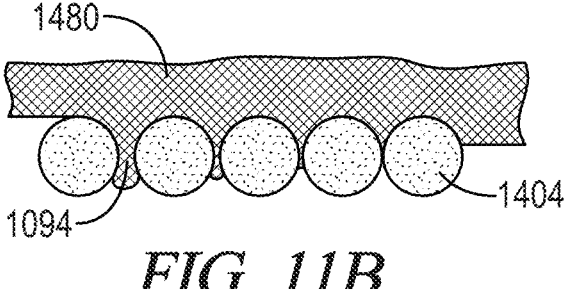
FIG. 11A is a schematic depicting an exemplary casting surface structure resultant of use of the exemplary mold and one or more inserts, according to aspects of the present disclosure.
FIG. 11B is a schematic showing aggregate particle entrapment by the molten metal when using a conventional aggregate mold to form an alloy part, according to aspects of the present disclosure.

FIG. 11A is a schematic depicting an exemplary casting surface structure 1092 resulting from the use of the exemplary mold 1000 and one or more inserts 1030, according to aspects of the present disclosure.

The disclosed mold 1000 including inserts 1030 with tubes 1036 is associated with a unique casting surface finish 1092. The surface finish 1092 appears as a gold ball "dimple" finish associated with a minute "pull in" or impression surrounding each of the tubes 1036 as the surface of the alloy part contracts during solidification. This disclosed embodiments have a casting surface that is not associated with conventional casting methods, such as sand casting, or permanent mold low pressure casting. One having ordinary skill in the art would recognize a part formed using methods disclosed herein due to the dimple-like surface finish 1092 of the part 1090 formed within mold 1000. The dimple-like surface finish is not limited to round dimples. In contrast, the dimples can be square, rectangular, triangular, elliptical, or any other shape based on the cross-sectional shape of the tubes 1036 formed within the inserts 1030.

The disclosed methods also allow for a much finer microstructure than possible with conventional casting methods. A personal of ordinary skill in the art examining the physical characteristics of the formed alloy part would recognize that the internal microstructure is free of porosity and near the maximum density in the cast state for the material being used. In embodiments using an aluminum alloy with approximately 7.0% silicon, the part may exhibit a secondary dendritic structure that is approximately 30 microns in spacing and below for a casting modulus of 6.25 mm.

In contrast, FIG. 11B shows a surface finish 1094 of a conventional mold 1400. Most aggregates have a round morphology and when the mold has too much pressure due to a high head height within a riser during mold fill of the mold 1400, the molten metal 1480 can push into the surface of the aggregate and push through the particles of aggregate causing undesirable pull in of the aggregate into the surface of the molten metal 1480. This can occur because the metal oxide outer layer of the molten metal 1480 can break due to the high positive pressure within the mold cavity 1440 and the metal encapsulates portions of the aggregate mold 1404, which causes the aggregate 1404 to stick to the molten metal 1480, which must then be removed by shot blast or other methods. Thus, using the disclosed mold having inserts 1030 with tubes 1036 avoids the casting issue described herein.

Figure 12A:
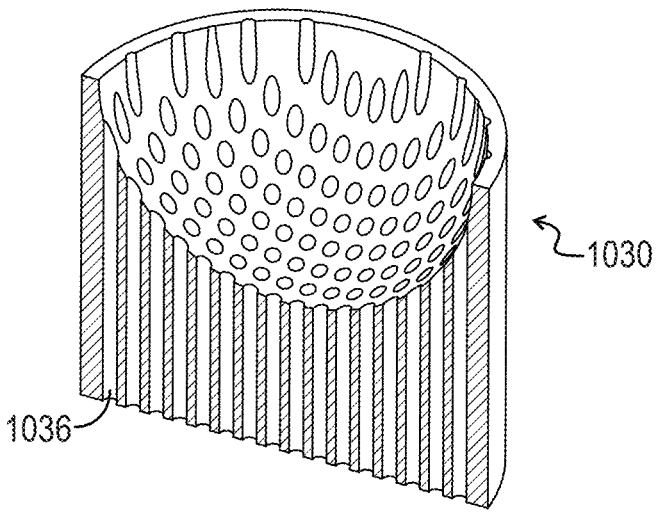
FIG. 12A depicts a plurality of hollow tubes of an exemplary concave insert, according to aspects of the present disclosure.
Figure 12B:
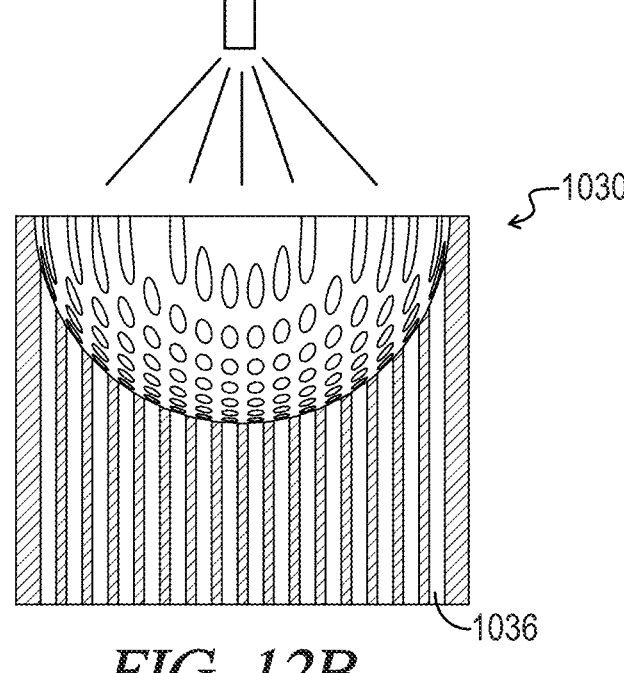
FIG. 12B depicts a method of providing an ablate or cooling spray through a concave insert, according to aspects of the present disclosure.

FIGS. 12A-12B depict a plurality of hollow tubes 1036 of an exemplary concave insert 1030. As shown, the top face of the insert (i.e., the surface of the insert 1030 facing out of the mold 1000) is concave. It should be understood that the morphology of inserts 1030 can be modified in order to provide direct impingement to alloy parts of irregular shape. Thus, an alloy part having a concave portion may lead to an adjustment of one or more inserts 1030 to conform to a concave shape to provide better impingement upon the surface of the alloy part being cooled within mold 1000. Various other insert 1030 morphologies are not precluded. FIG. 12B depicts the concave insert of 1030 being provided with an exemplary spray through nozzle 1300. a concave insert 1030 having a plurality of hollow tubes 1036. Various configurations of tubes 1036 of inserts 1030 are envisioned, including a linear configuration that allow for direct impingement of the surface of the alloy part 1100 as it cools.

Figure 13A:
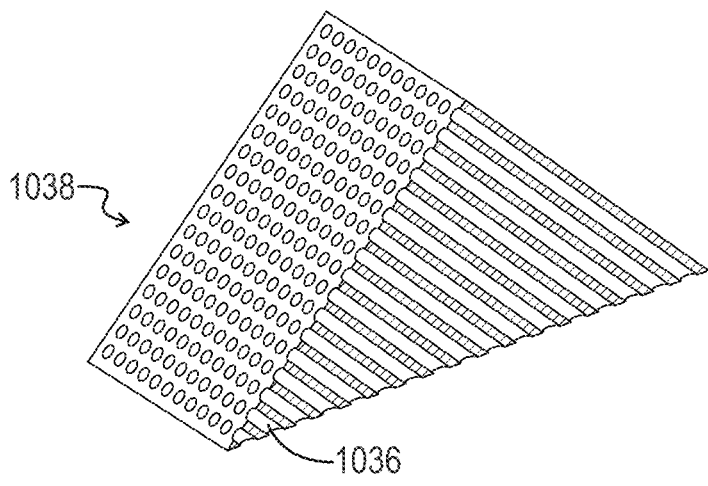
FIG. 13A depicts an exemplary offset insert 1030 having a plurality of tubes 1036, according to aspects of the present disclosure.

FIG. 13A depicts an exemplary offset insert 1030 having a plurality of tubes 1036, according to aspects of the present disclosure.

Figure 13B:
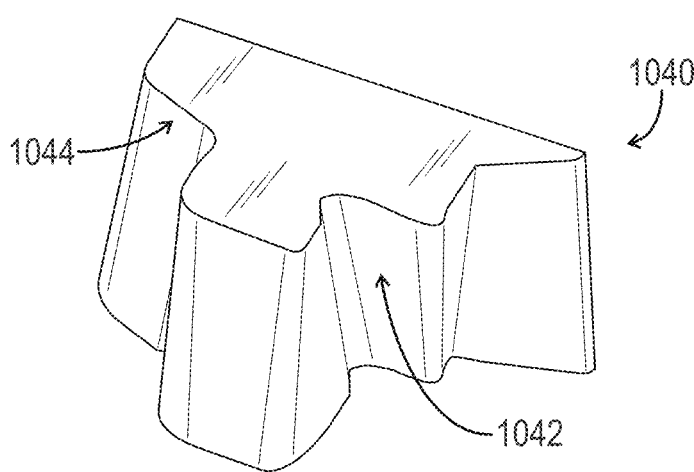
FIG. 13B depicts an exemplary method of using the exemplary offset insert 1030 of FIG. 13A to facilitate direct impingement upon irregular surfaces of an alloy part, according to aspects of the present disclosure.

FIG. 13B depicts an exemplary method of using the exemplary offset insert 1030 of FIG. 13A to facilitate direct impingement upon irregular surfaces of an alloy part, according to aspects of the present disclosure.

According to some embodiments, the alloy part being formed may have an irregular shape. FIGS. 13A-13B show a method for providing effective direct impingement by a ablate, cooling, or heating application on an irregular surface of the alloy part via an offset insert 1038. Insert 1038 of FIG. 13A may be configured such that the tubes 1036 are aligned to directly impinge on the surface of an irregularly shaped alloy part. Referring to FIG. 13B, an irregularly shaped alloy part within a mold cavity 1040 is shown during a solidification process. It should be understood that the alloy part shown in FIG. 13B is representative only, and other irregular shapes are envisioned within the scope of the present disclosure. The irregularly shaped part includes section 1042 and sections 1044. Section 1044 may be directly impinged upon using a non-offset insert 1030 because the section 1044 is not occluded by other portions of the irregular part. However, section 1042 may not be directly impinged through an insert 1030 because section 1042 is occluded by other portions of the irregular part. For these reasons, in certain embodiments, the mold 1000 may be provided with one or more offset inserts 1038 that are not occluded from directly impinging upon section 1042. It should be noted that offset insert 1038 may be provided with various offsets within mold 1000 to provide direct impingement to a variety differently shaped irregular parts.

Figure 14:
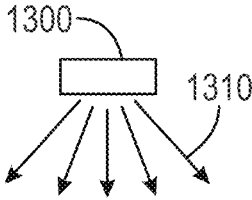
FIG. 14 depicts an exemplary spray pattern of an exemplary spray nozzle used to provide a cooling liquid during a metal solidification process, according to aspects of the present disclosure.

FIG. 14 depicts an exemplary spray pattern of an exemplary spray nozzle used to provide a cooling liquid during a metal solidification process, according to aspects of the present disclosure. Using the tubular inserts 1036 a high-pressure water cutting jet can pass through the tubular structure. Riser area, ingate, runners, and any area of feed metal within the metal cavity 1040 can be cut.

Figure 15A:
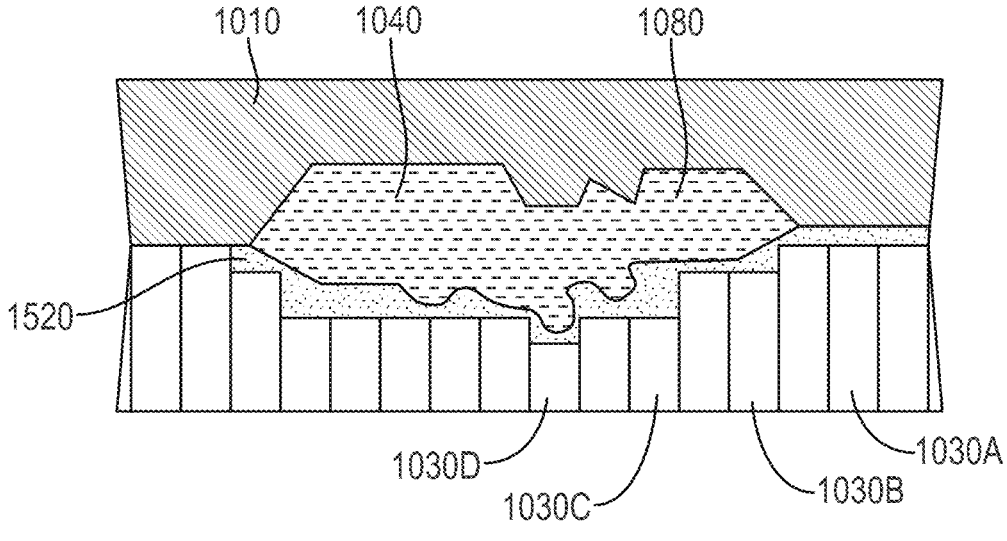
FIG. 15A depicts an exemplary method for forming an alloy part with a complex geometry using one or more standard size inserts and an aggregate shell, according to aspects of the present disclosure.
Figure 15B:
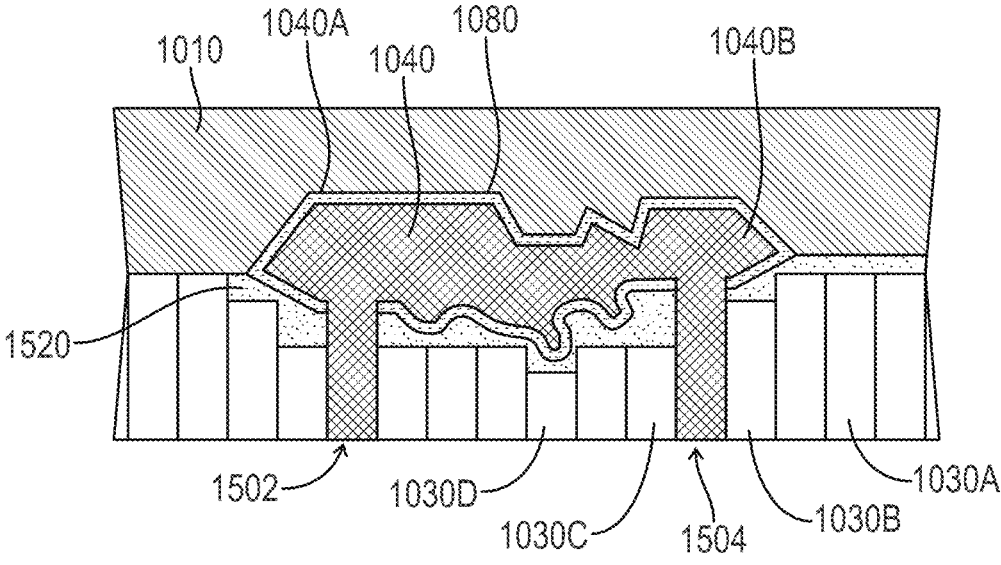
FIG. 15B depicts an exemplary method for forming a hollow alloy part with a complex hollow geometry using one or more standard size inserts with a location for in internal core to be supported that can also include an aggregate shell, according to aspects of the present disclosure.

FIG. 15A depicts an exemplary method for forming an alloy part with a complex geometry using one or more standard size inserts 1030 and an aggregate shell 1420. An aggregate shell 1420 can be disposed between the inserts 1030 and the metal cavity 1040. Several standard inserts 1030A, 1030B, 1030C and 1030D are shown. The aggregate shell 1420 allows for complex geometries of the alloy part 1080 to be formed while using standard shapes of inserts 1030. While the cope 1010 is shown as being constructed of all aggregate, cope 1010 can be constructed of any suitable material. In some embodiments, cope 1010 can be replaced with a plurality of standard inserts 1030, and additionally, if desired, an aggregate shell to enable even more complex geometries of parts to be formed. It could be stated if a mold was made using materials that quickly chill, such as copper or carbon, the thermal capacity, normally limited, would end up being endless in practice, and thus it can facilitate a controlled chilled continuous process. In this regard, an ablation and/or ablate spray delivered via a nozzle 1300 may keep the mold 1000 at a predetermined temperature (e.g., approximately 100 C if $H_2O$ is used as the ablate spray). The heat capacity of the mold 1000 material may remain endless as long as sufficient cooling is being provided to the mold

1000 via nozzle 1300. In other words, the continuous cooling can provide a continuous specific heat capacity at a constant rate of thermal conduction. The spray provided via nozzle 1300 can provide primary and secondary cooling simultaneously a single step as the ablate material is applied to prevent the air gap through the insert 1030 enveloping the cast metal alloy.

Additionally, the tubes 1036 can serve to transfer heat into an alloy part or away from an alloy part such as in hot tool stamping. The tubes 1036 can be used even with plastic casting. The inserts 1030 having tubes 1036 can also be used in sheet forming and forging applications or strain induced metal shaping and forming processes. For example, the tubes 1036 can have lubricant being pushed through the inserts 1030 thereby lubricating the part being formed through any numerous strain operations, shaping, such as by stamping or a forged operation of an alloy part while strain and deformation is occurring thereby keeping strain energy and heat deformation to a minimum. This type of tooling may aid extrusions and anything requiring a lubricant. The disclosed embodiments can be beneficial for bearing support since lubrication can be pushed as a media through the system the bearings ride upon.

In some embodiments, rather than moving nozzle 1300 over the surface of mold 1000 to provide cooling and/or ablation, the mold 1000 itself may be coupled to a movable surface that allows for three-dimensional translation and rotation of the mold while the nozzle 1300 remains stationary.

In some embodiments, movement of the nozzle 1300 may be used to provide pulsed secondary cooling by rapidly moving the nozzle 1300 across the surface of the mold 1000 during an alloy solidification process.

FIG. 15B depicts an embodiment in which a hollow alloy part 1080 may be formed. As shown in FIG. 15B, a core 1040B may be provided within the mold cavity 1040. The core 1040B may be provided within the mold cavity before filling of molten alloy begins. Additionally, according to some embodiments, the core 1040B may be held in place within cavity 1040 by one or more aggregate supports 1502, one or more supports 1504, or a combination of both aggregate supports 1502 and supports 1504. Supports 1504 may be constructed of an appropriate alloy that is capable of dissolving into the forming alloy part during solidification (e.g., akin to a chaplet known to those having pertinent skill in the relevant art), whereas aggregate supports 1502 may be constructed of an aggregate that is ablatable. Accordingly, a hollow or semi-hollow alloy part may be formed 1080 with the shape of the part defined by the area 1040A within the cavity 1040 that is not taken up by the core 1040B. Additionally, while FIG. 15B is shown having an aggregate cope 1010 and a drag constructed of standard-sized inserts, in some embodiments, cope 1010 can be replaced with a plurality of standard inserts 1030, and additionally, if desired, an aggregate shell to enable even more complex geometries of alloy parts to be formed.

According to some embodiments, the core 1040B provides additional functionality to the mold. For example, during the solidification process, the core 1040B may be softened or ablated through, for example, an aggregate support 1502, thus allowing for an ablate and/or cooling spray to be provided into the internal core 1040B space before the solidification of the alloy part is complete. According to some embodiments, the internal core 1040B may be completely ablated away before the solidification of the alloy part is complete, and thus allow for secondary cooling to be applied from the inside of the mold cavity while providing secondary cooling from the outside of the mold package. For example, an ablate spray nozzle (e.g., nozzle 1300) can be positioned inside the mold cavity after core 1040B is removed. Importantly, primary cooling may still be applied throughout this process through the remaining mold package itself.

According to some embodiments, the core 1040B can include an inner gas layer. An appropriate gas or mixture of gases can be provided into an interior of a hollow core 1040B through one or more aggregate support 1502. In other words, aggregate support 1502 may be totally or partially softened or removed via ablation to create space for a gas nozzle 1300 to be applied to the mold hollow core 1040B through the space that the aggregate support 1502 previously occupied. An appropriate sealing mechanism may be used to seal the surface of the mold 1000 against the nozzle 1300 to prevent outflow of the gas mixture from the mold cavity 1040 while the mold cavity 1040 is being filled. Following the mold cavity 1040 being filled with a molten alloy, a water-induced hot air gas and/or an ablate spray may be provided through one or more aggregate support 1502 to collapse and/or soften the internal core 1040B.

Figure 16A:
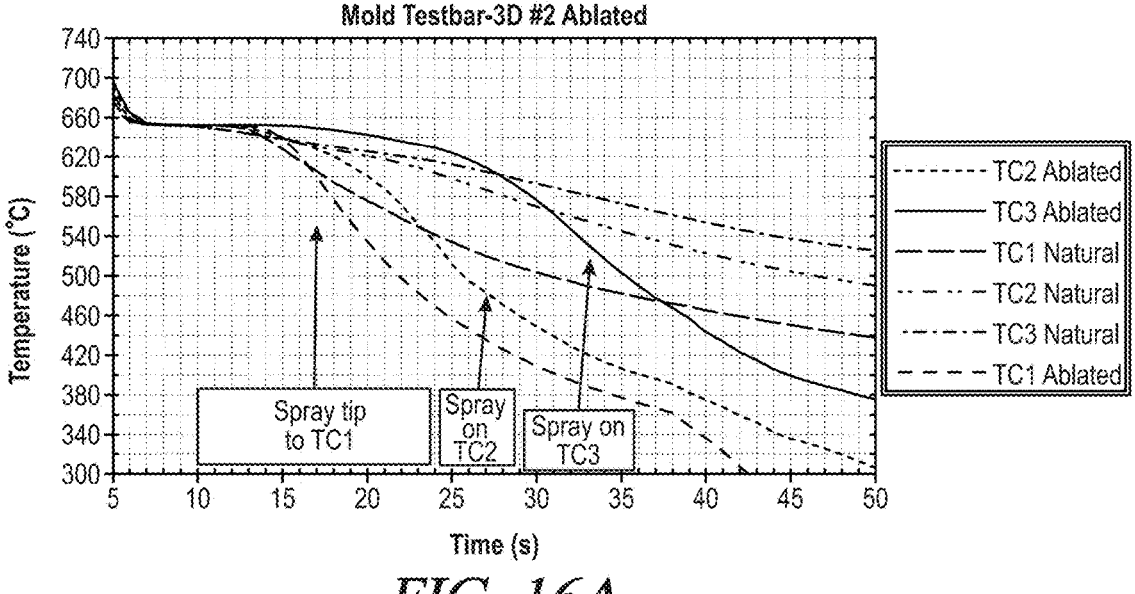
FIG. 16A is a graph of temperature versus time for the solidification of metal test bars as shown in FIG. 6A compared to a natural cooling cycle, according to aspects of the present disclosure.

FIG. 16A is a graph of temperature versus time for the solidification of metal test bars as shown in FIG. 6A compared to a natural cooling cycle. FIG. 16A shows readings from three thermocouples 1120 labeled TC1, TC2, and TC3 in the present figure. It should be noted that the thermocouples are placed such that thermocouple TC3 is placed closest to the fill area of mold 1000, TC2 is placed second closest from the fill area of mold 1000, and TC1 is positioned farthest from the fill area of mold 1000. The time to form alpha solid within the mold for the ablation process is much faster when compared to a natural cooling cycle within mold 1000. For example, ablation lines TC1, TC2, TC3 show cooling rates of approximately 10.0 C/s measured from approximately 500 C to approximately 300 C. As compared to natural cooling, the cooling time is roughly 45% faster solidification. Additionally, FIG. 16A clearly shows the superheat from filling the mold 1000 at the coincidence of peaks at approximately 7 seconds. A plateau at approximately 660 degrees C. can be observed following the superheat peak. The difference in temperature between the peak (e.g., approximately 720 degrees C.) to the temperature at the plateau (e.g., approximately 660 degrees C.) is equivalent to the superheat of mold 1000. As will be described in more detail with respect to FIGS. 18A-18B, the superheat may be measured and observed in order to determine whether the cooling part is undergoing recalescence. As will be described in more detail below with respect to FIGS. 18A-18B, recalescence may be minimized by adding an appropriate amount of grain refiner.

Figure 16B:
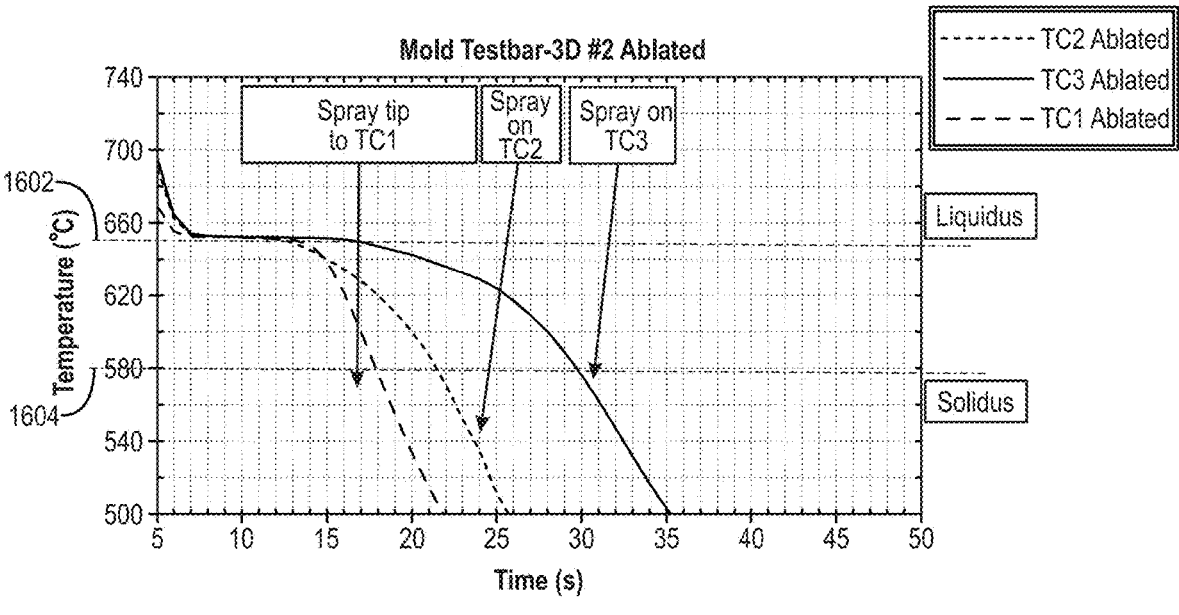
FIG. 16B, is a graph of temperature versus time for the solidification of metal test bars as shown in FIG. 6A, according to aspects of the present disclosure.

It is clear from the cooling curves that a product formed using the disclosed ablation process facilitates superior mechanical properties, including finer microstructure. FIG. 16B shows the ablation cooling curves of FIG. 16A in more detail. As can be seen, cooling from the liquidus temperature 1602 to the solidus temperature 1604 can occur within approximately five seconds for TC1, approximately 7 seconds for TC2, and approximately 15 seconds for TC3.

Notably, FIGS. 16A-16B show that the spray from nozzle 1300 was arriving at the liquidus of the cooling part in TC1 and TC2, and at the solidus in TC3. However, despite cooling spray being moved too quickly along the part (e.g., spraying on TC2 before the area associated with TC1 had solidified), the area of the cooling part associated with TC1 still experienced rapid cooling. This is because, unlike conventional permanent and aggregate molds, it is possible to provide both primary and secondary cooling simultaneously ahead of the solidification front and still achieve rapid cooling at the solidification front. In this regard, the mold 1000 is still extracting energy via primary cooling even when the secondary cooling spray has been moved ahead of the solidification front. Additionally, mold 1000 has energy extracted at the solidification front via "indirect secondary cooling." In other words, the direct secondary cooling of an adjacent area is able to indirectly provide cooling to the solidification front, in addition to the primary cooling offered by the mold 1000 itself. Conventional permanent molds are unable to facilitate providing secondary cooling into the liquidus ahead of the solidification front because applying secondary cooling into the liquidus in a conventional mold would lead to breaking of the metal oxide film of the cooling part as well as a rapid release of pressure potentially causing an explosion. Similarly, a conventional aggregate mold would be unable to facilitate allowing primary and secondary cooling to occur simultaneously, because once the aggregate mold is ablated away, there is no mold material left behind through which to provide primary cooling.

Importantly, the disclosed embodiments facilitate the ability for applying primary cooling, secondary cooling, and/or a combination of both to the mold package and cooling part prior to completely finishing the fill process of the mold 1000 with molten alloy. Accordingly, the disclosed embodiments can be used to immediately begin applying both primary and secondary cooling to remove latent superheat even before the mold cavity 1040 is fully filled with liquid alloy.

Being able to cool ahead of the solidification front, as is enabled by embodiments of the disclosure, allows for several benefits over conventional technology and conventional methods. For example, mold 1000 allows for secondary cooling of the liquidus without breaking the forming metal oxide bi-film. Additionally, because it is possible to eliminate superheat quickly, issues related to recalescence can be mitigated while minimizing the amount of grain refiner needed.

Figure 17A:
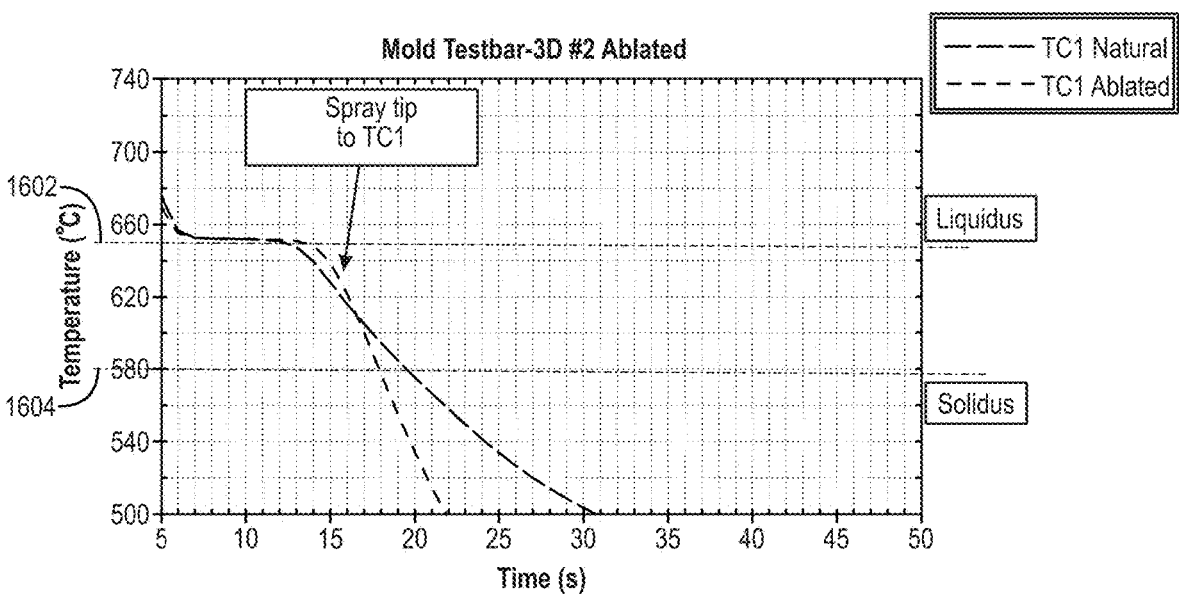
FIG. 17A is a graph of temperature versus time for the solidification of metal test bars as shown in FIG. 6A, according to aspects of the present disclosure.
Figure 17B:
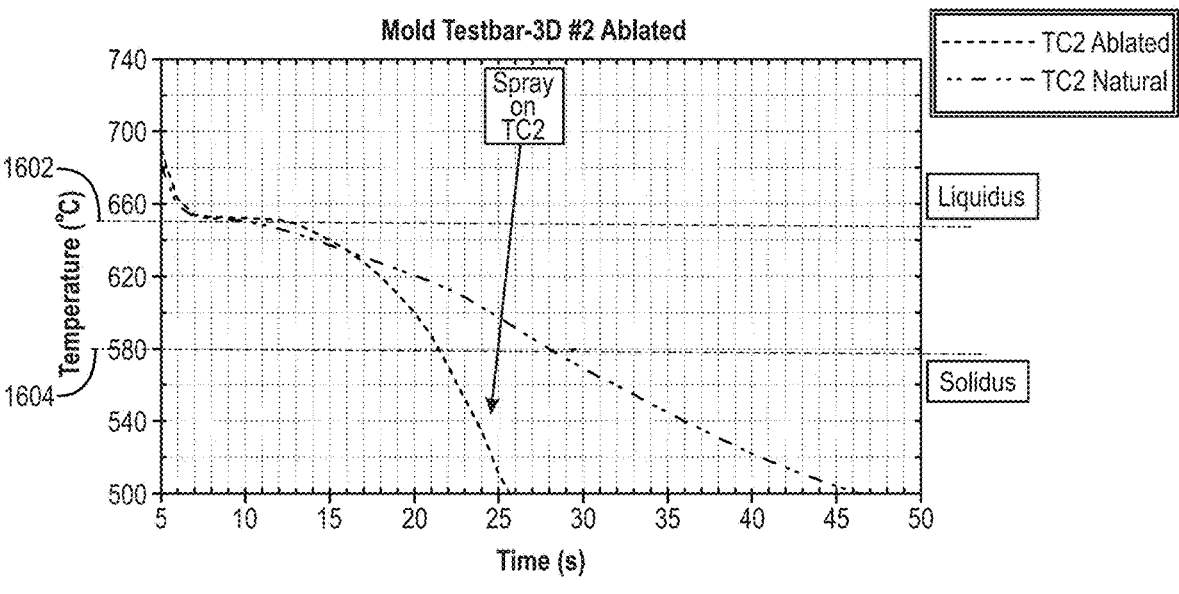
FIG. 17B is a graph of temperature versus time for the solidification of metal test bars as shown in FIG. 6A, according to aspects of the present disclosure.
Figure 17C:
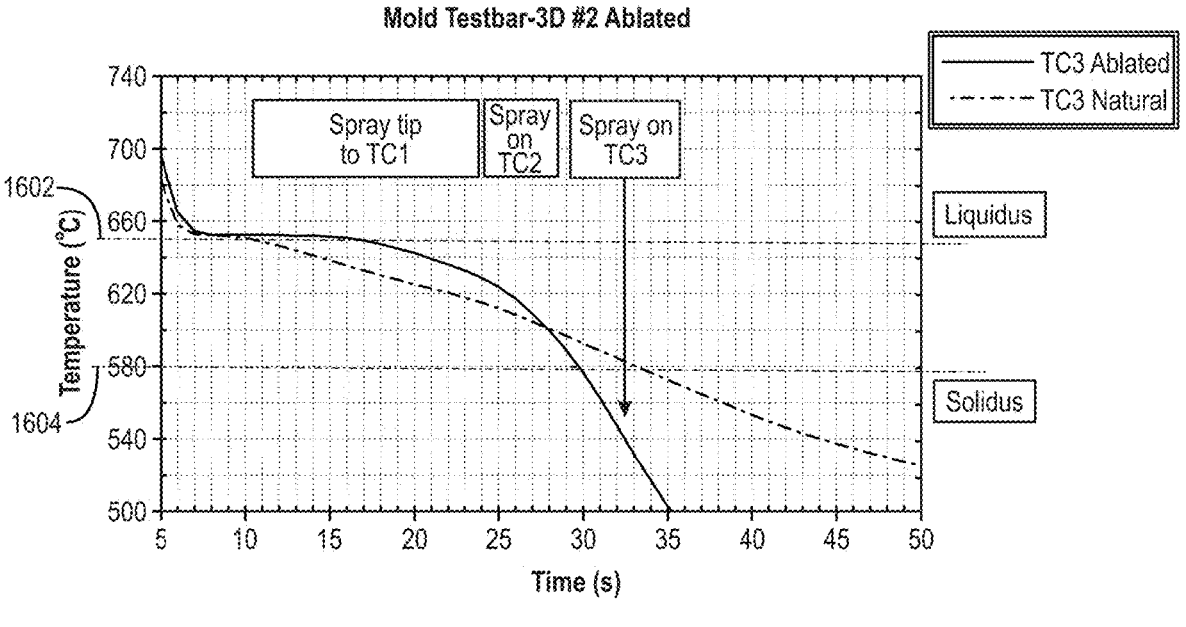
FIG. 17C, is a graph of temperature versus time for the solidification of metal test bars as shown in FIG. 6A, according to aspects of the present disclosure.

FIGS. 17A-17C show comparisons of ablated vs natural cooling curves for TC1, TC2, and TC3, respectively. FIGS. 17A-17C show an important phenomenon that is initially counterintuitive. Notably, it appears that a naturally cooling alloy part begins to cool faster than a part made with mold 1000. In actuality, FIGS. 17A-17C show that mold 1000 allows for such rapid cooling that the inverse segregation in the dendrites being formed in the cooling alloy are pushing through the planar front of the cooling part and provide heat back into the liquidus region of the cooling part. Because the thermal conductivity of a solid is approximately 2.4 times higher than the thermal conductivity of the corresponding liquid, some of the energy being extracted through the mold 1000 travels through the dendrites and back into the liquidus. The transferred heat is capable of remelting the solidified area of the cooling part, and liquidus refills the gaps left behind. Accordingly, mold 1000 allows for reducing porosity caused by inverse segregation. This phenomena is akin to a heat treatment. Thus, mold 1000 provides the additional benefit of a heat treatment step without requiring the cooling part to undergo a separate, time-consuming, heat treatment process.

FIGS. 17A-17C confirm that the disclosed ablation process leads to significantly faster cooling rates when desired, as well as the ability to arrest cooling or even selectively introduce additional heat into the mold 1000 for improving microstructure, inverse segregation, and the like.

Figure 18A:
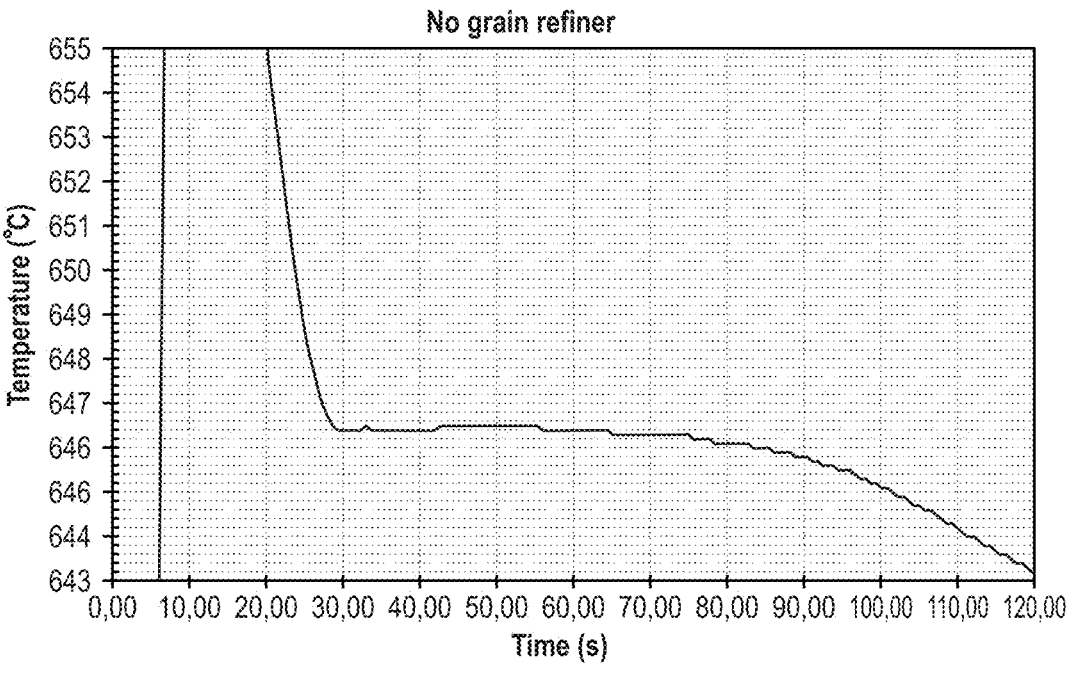
FIG. 18A, is a graph of temperature versus time for a cooling alloy part with no added grain refiner, according to aspects of the present disclosure.
Figure 18B:
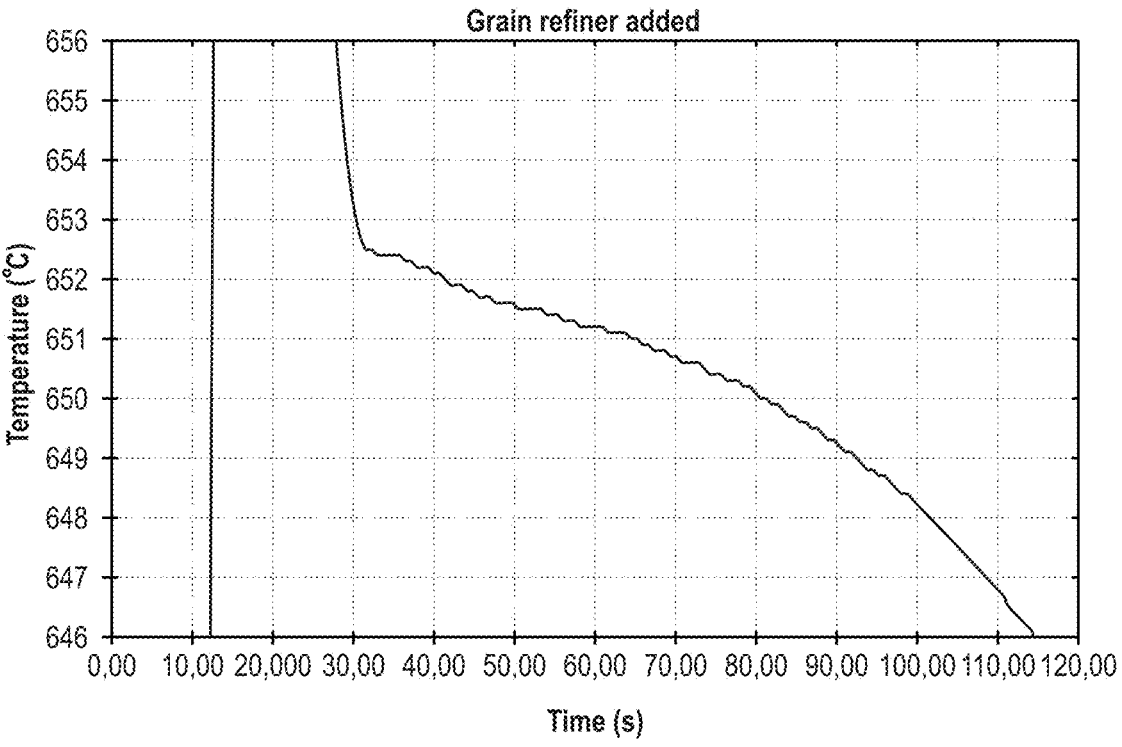
FIG. 18B, is a graph of temperature versus time for a cooling alloy part with grain refiner added, according to aspects of the present disclosure.

FIGS. 18A-18B show graphs of temperature versus time for an exemplary test bar such as shown in FIG. 6A. According to some embodiments, certain grain refiner additives may be added to the molten alloy before cooling. Grain refiner additives may be added to change the cooling properties of the molten alloy, as well as improve the microstructure of the resultant part by facilitating a finer microstructure. Within 30 seconds, a representative alloy part can be cooled to approximately 646 C without the addition of grain refiner as shown in FIG. 18A. In contrast, the cooling rate is somewhat suppressed after the addition of grain refiner as shown in FIG. 18B-within the same 30 seconds, the temperature drops to approximately 652 C with the addition of grain refiner. It should be understood that various types and amounts may be used as desired. In one example, the grain refiner may be AlTi5B1. In some embodiments, approximately 1 gram, 10 gram, 100 grams, 500 grams and/or 1000 grams of grain refiner may be added to the molten alloy to achieve desired material properties.

Figure 19A:
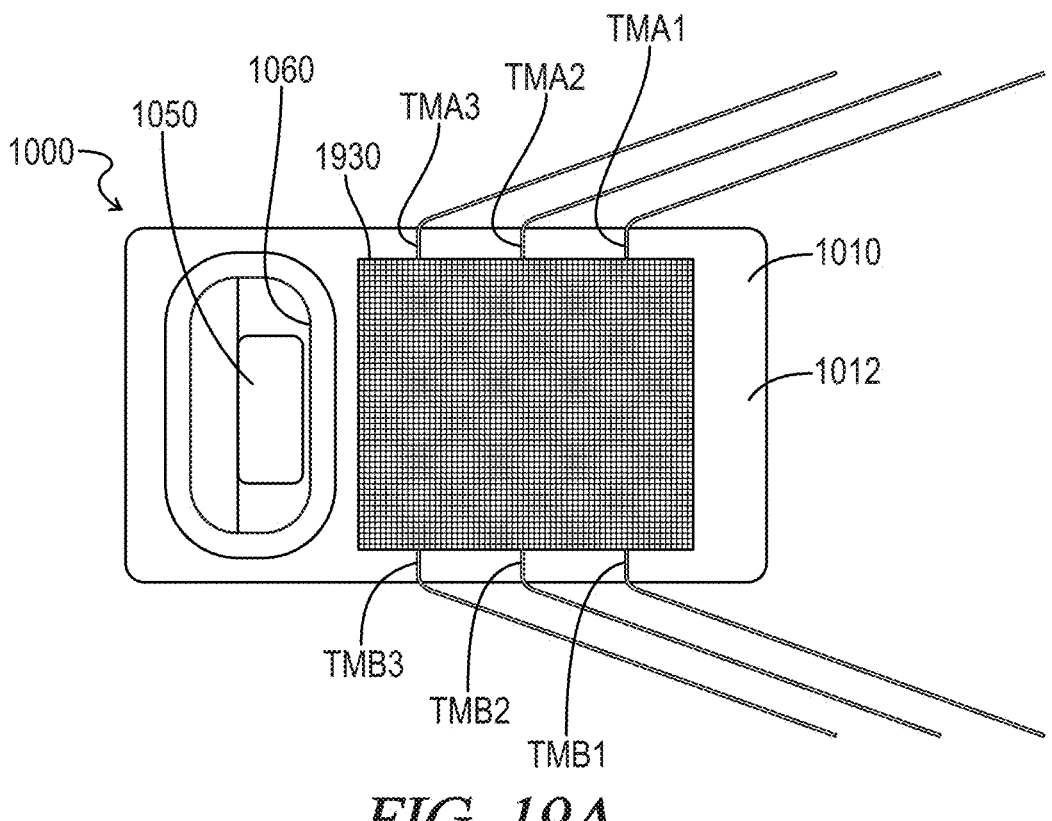
FIG. 19A shows relative positions of thermocouples in a test alloy bar created using an exemplary mold package, according to aspects of the present disclosure.

FIG. 19A shows relative locations of thermocouples TMA3, TMA2, TMA1 (related to a test bar formed using mold 1000) and TMB3, TMB2, and TMB1 (related to a test bar naturally cooled). Table 1 below shows various mechanical properties measured for the alloy part formed using mold 1000 at points TMA1-TMA3 and mechanical properties for the alloy part formed using conventional methods at TMB1-TMB3. Notably, Table 1 shows that the iron phases have a thickness between 2× and 4× smaller for the part formed using mold 1000 vs the naturally cooling part. Accordingly, mold 1000 facilitates the pre-homogenization of the alloy part, which reduces the need for costly and time-consuming heat treatment steps.

It should also be noted that in place of one or more inserts 1030, the embodiment shown in FIG. 19A includes a unitary insert 1930. A person of pertinent skill in the relevant would understand that the one or more inserts 1030 described with respect to other embodiments may be replaced with a unitary insert 1930 that is sized and shaped to act as either or both of cope 1010 and drag 1020.

Figure 19B:
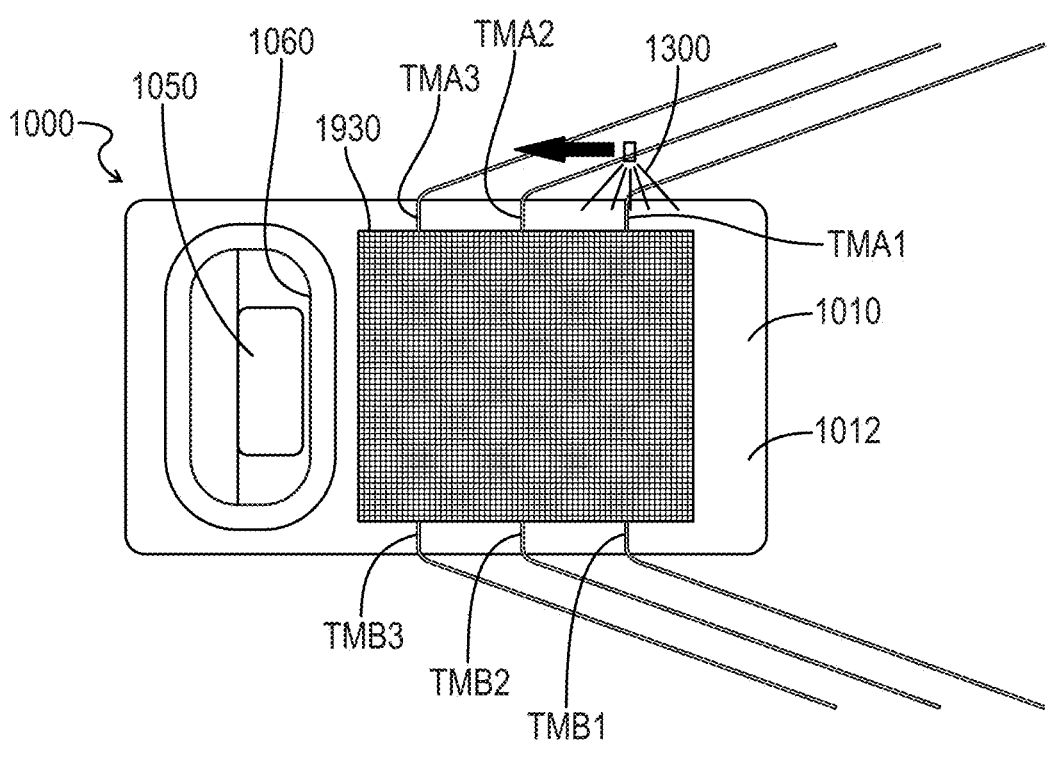
FIG. 19B shows an exemplary spray head applying an ablate material to an exemplary mold package, according to aspects of the present disclosure.

FIG. 19B shows the positioning of a spray nozzle 1300 which applied an ablate mixture for cooling purposes through the insert 1930. The nozzle 1300 was initially placed proximate to the position of TMA1 and was moved towards the direction of TMA3 while applying an ablate mixture to the test bar for cooling purposes. The mechanical properties of the test bar were compared to a naturally cooled part associated with thermocouples TMB1-TMB3.

TABLE 1

| | | TMA1 | TMA2 | TMA3 | TMB1 | TMB2 | TMB3 |
|---|---|---|---|---|---|---|---|
| Average cell size (μm) | | 80 | 100 | 100 | 80 | 100 | 80 |
| Mg₂Si phases (μm) | | 25 | 20 | 30 | 35 | 30 | 40 |
| Iron phases | Length | 15 | 10 | 10 | 10 | 15 | 10 |
| (μm) | Thickness | 0.5 | 0.5 | 0.5 | 2.0 | 1.5 | 1.0 |

Table 2 shows the results of an elongation test for a testbar formed using mold 1000 (ref. 1) vs a testbar formed using conventional methods (ref. 2).

TABLE 2

| Ref. | $d_0$ (mm) | $R_{p0.2}$ (MPa) | $R_m$ (MPa) | $A_{50mm}$ (%) | Z (%) |
|------|------------|------------------|-------------|----------------|-------|
| 1 | 10 | 321 | 357 | 12.0 | 24 |
| 2 | 10 | 320 | 353 | 10 | 17 |

Table 2 shows diameter of the testbar do, offset yield Rp0.2, elongation A50 mm, and reduction of cross sectional area Z. Notably, the testbar formed using mold 1000 experienced a 12% elongation and a 24% reduction in cross sectional area before breaking, showing superior mechanical qualities as compared to the naturally cooled part, which only experienced a 10% elongation and only a 17% reduction in cross sectional area before breaking.

Figure 20:
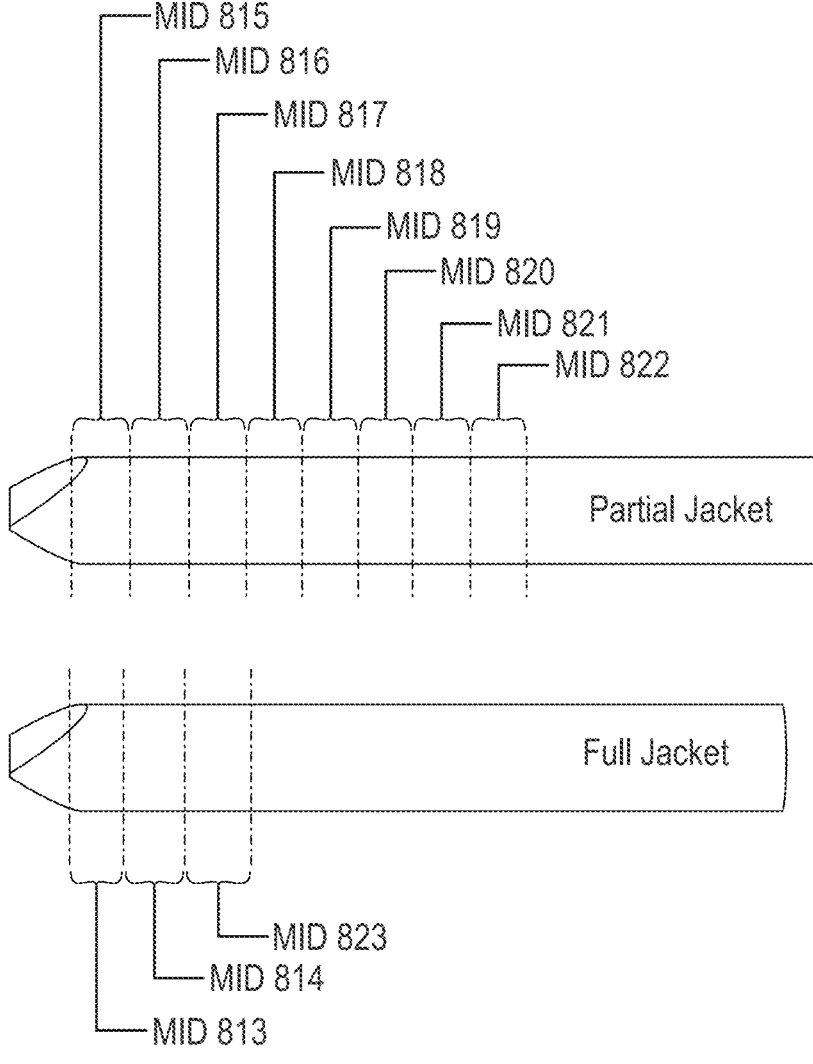
FIG. 20 show samples created using a mold, according to aspects of the present disclosure.

FIGS. 22A-22B, 23, 24A-24J, and 25A-25J show the microstructures from solidified bars using mold 1000 and facilitated the creation of the cast and heat-treated product. In comparison, microstructures associated with a wrought (forged) sample are provided in FIGS. 26A-26J. Heat treated samples created from a partial section of the mold 1000 (e.g., using just one of a cope 1010 or drag 1020) on (FIG. 20, top) were compared against samples created using the mold 1000 with both cope 1010 and drag 1020 in place surrounding the alloy part entirely (FIG. 20, bottom). The resultant samples were sliced as represented by sections MID 813-MID 823 so that resultant material properties could be tested.

Figure 24A:
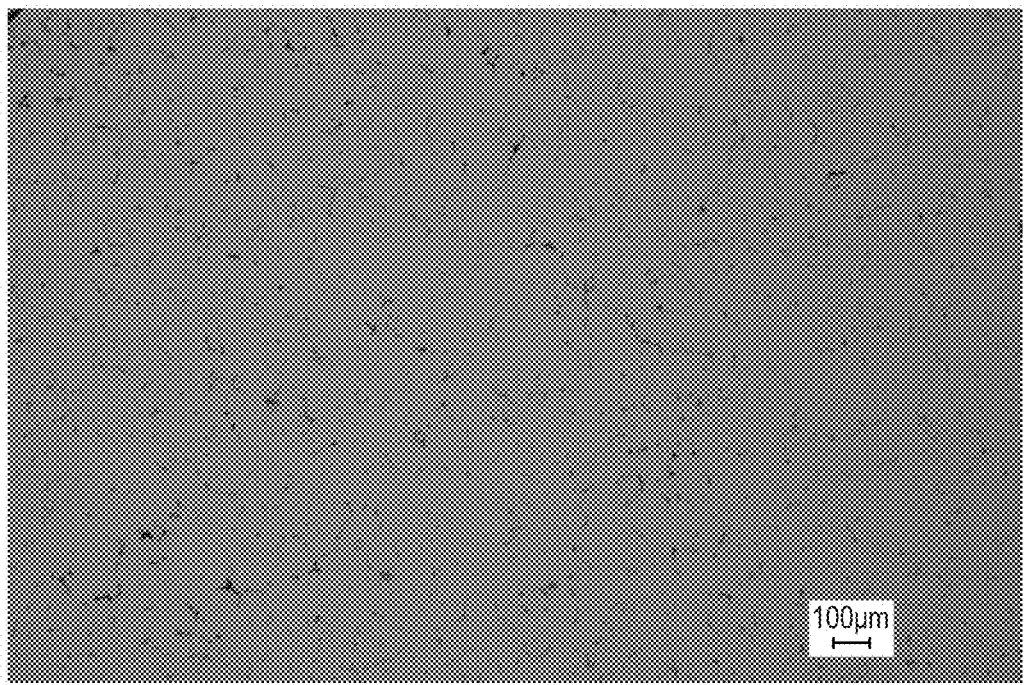
FIG. 24A represents a microstructure of an exemplary sample part created using a mold, according to aspects of the present disclosure.
Figure 24B:
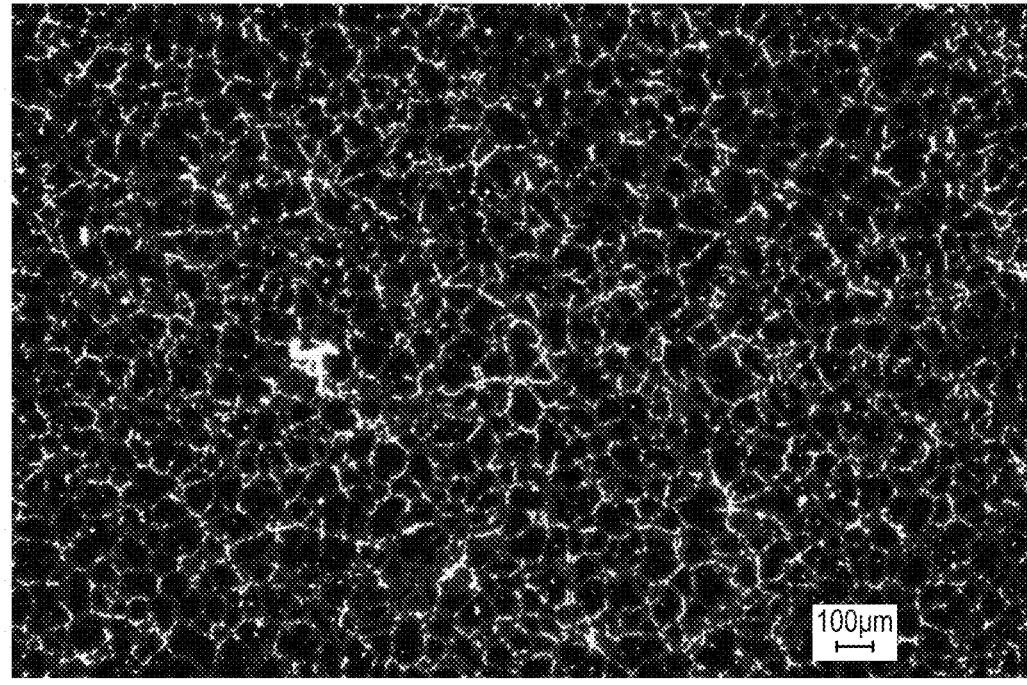
FIG. 24B represents a microstructure of an exemplary sample part created using a mold, according to aspects of the present disclosure.
Figure 24C:
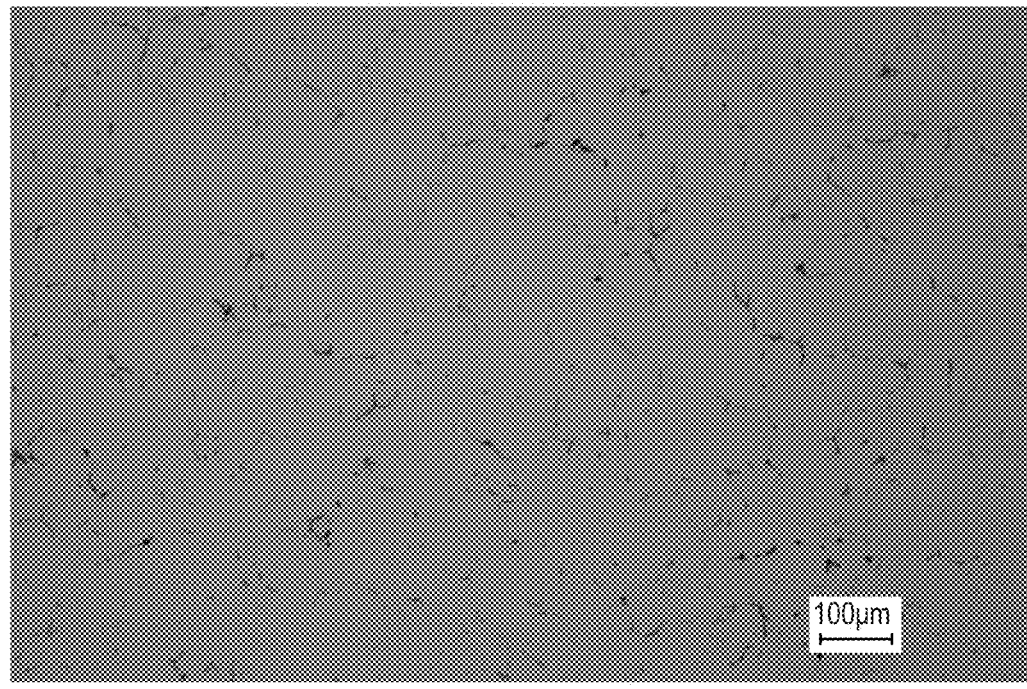
FIG. 24C represents a microstructure of an exemplary sample part created using a mold, according to aspects of the present disclosure.
Figure 24D:
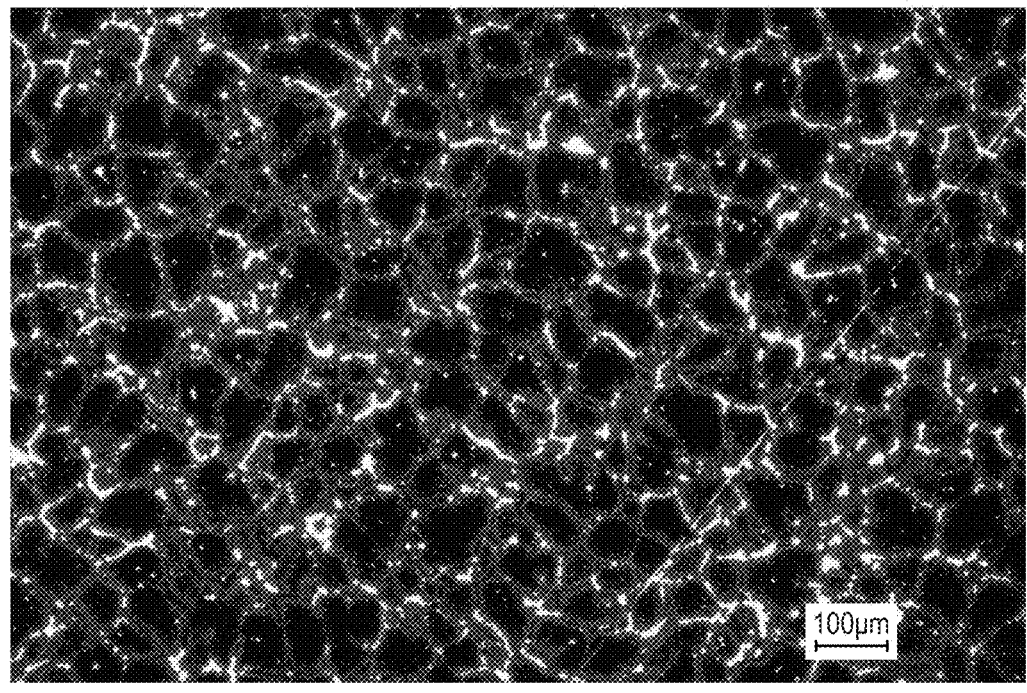
FIG. 24D represents a microstructure of an exemplary sample part created using a mold, according to aspects of the present disclosure.
Figure 24E:
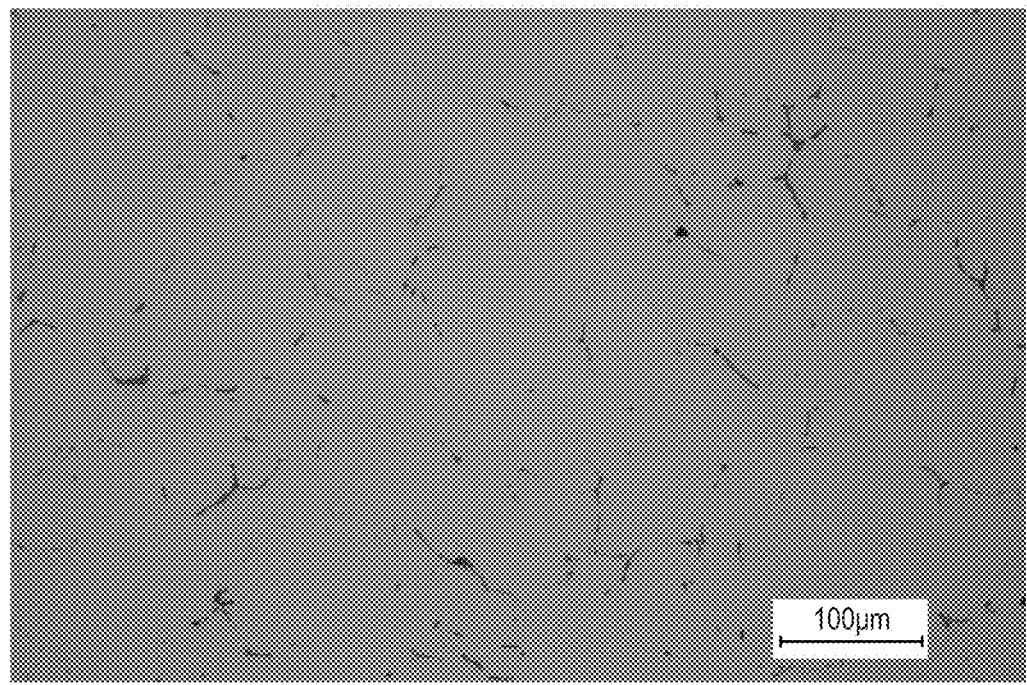
FIG. 24E represents a microstructure of an exemplary sample part created using a mold, according to aspects of the present disclosure.
Figure 24F:
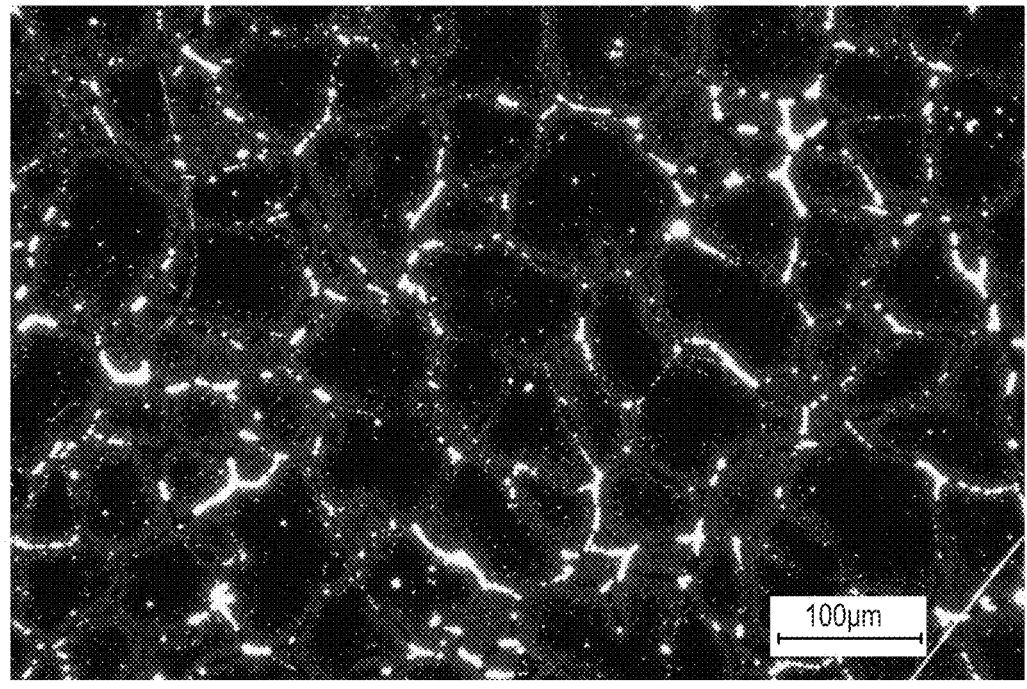
FIG. 24F represents a microstructure of an exemplary sample part created using a mold, according to aspects of the present disclosure.
Figure 24G:
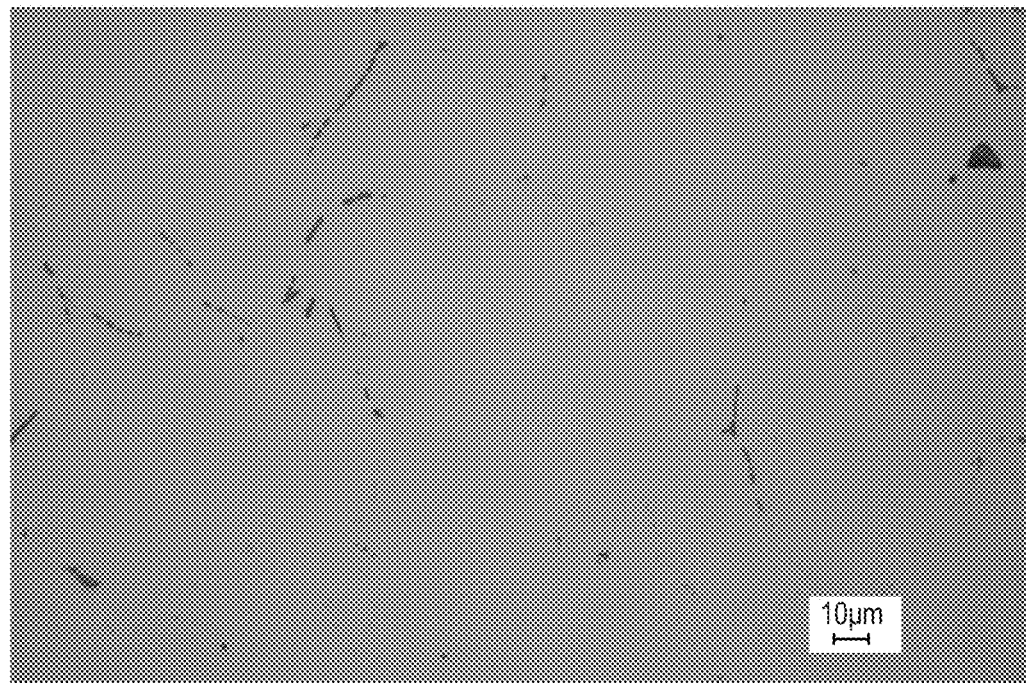
FIG. 24G represents a microstructure of an exemplary sample part created using a mold, according to aspects of the present disclosure.
Figure 24H:
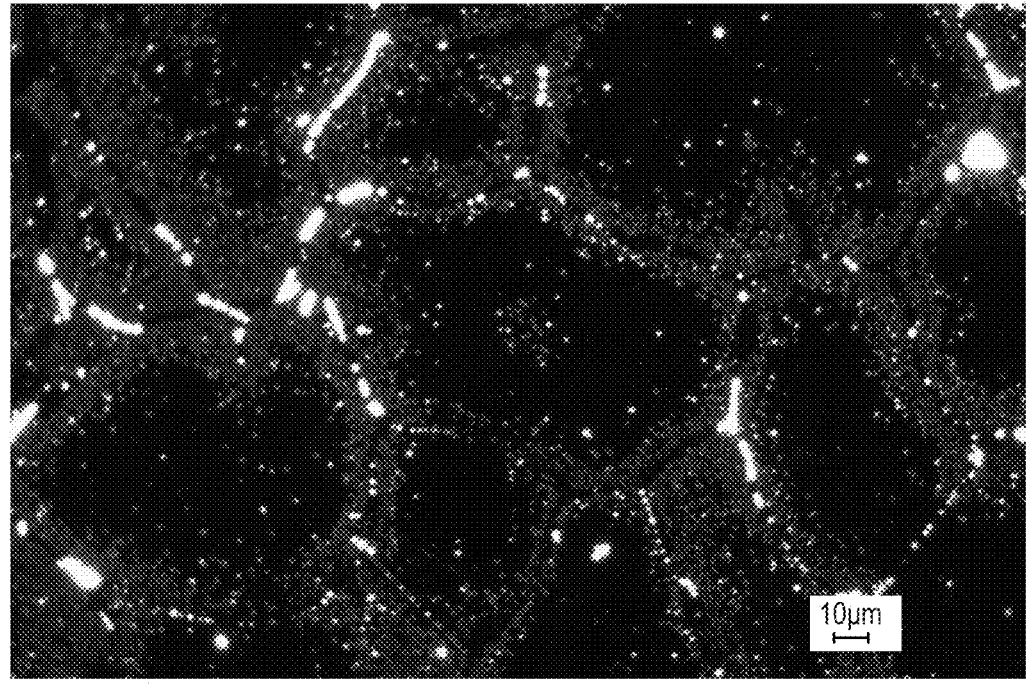
FIG. 24H represents a microstructure of an exemplary sample part created using a mold, according to aspects of the present disclosure.
Figure 24I:
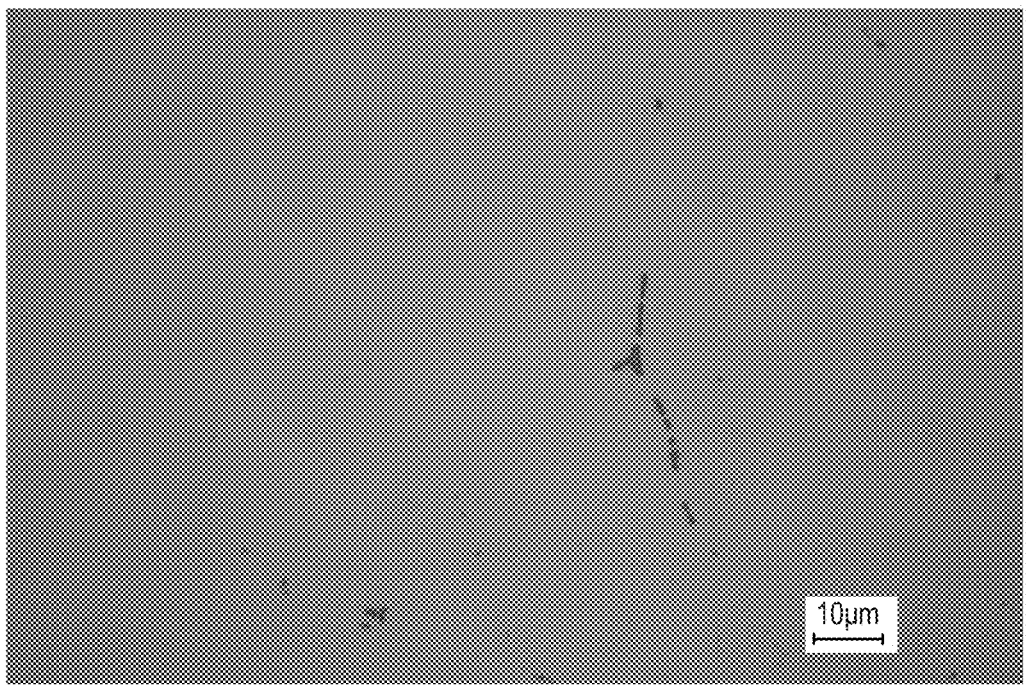
FIG. 24I represents a microstructure of an exemplary sample part created using a mold, according to aspects of the present disclosure.
Figure 24J:
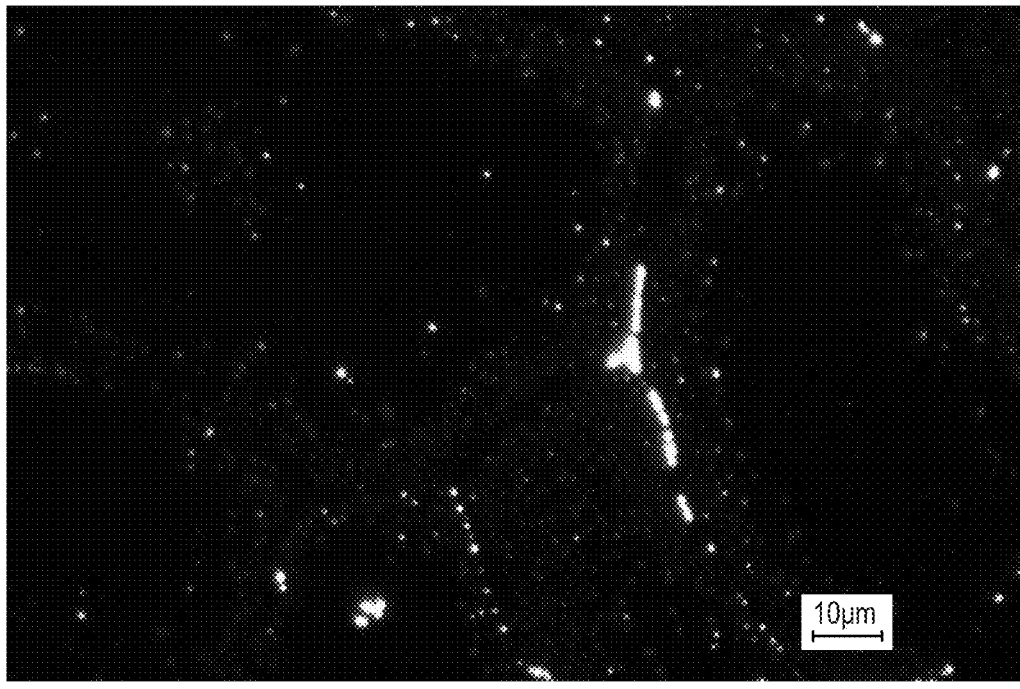
FIG. 24J represents a microstructure of an exemplary sample part created using a mold, according to aspects of the present disclosure.
Figure 25A:
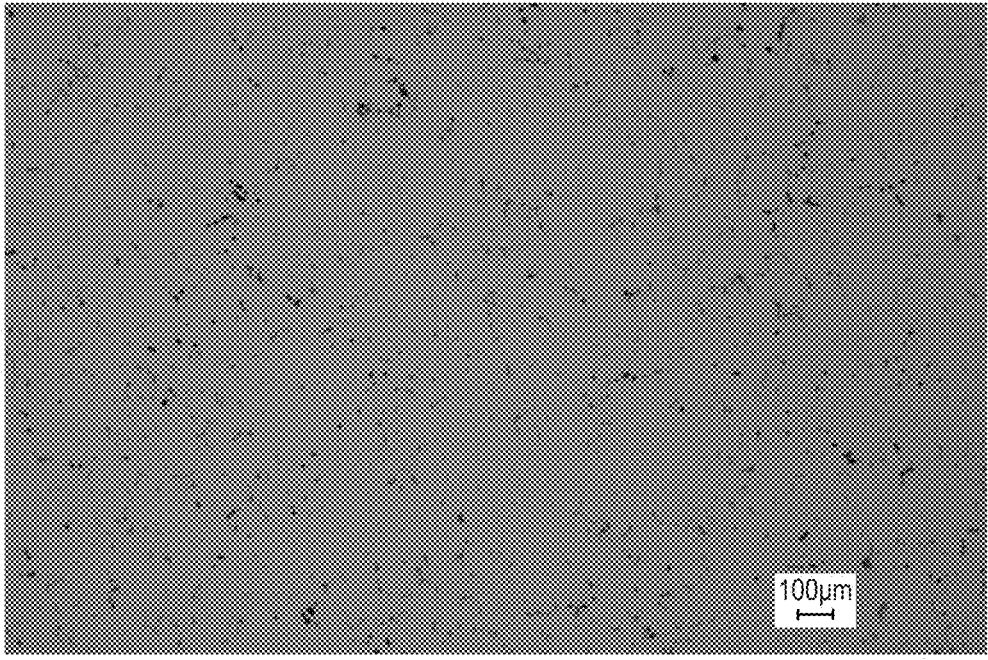
FIG. 25A represents a microstructure of an exemplary sample part created using a mold, according to aspects of the present disclosure.
Figure 25B:
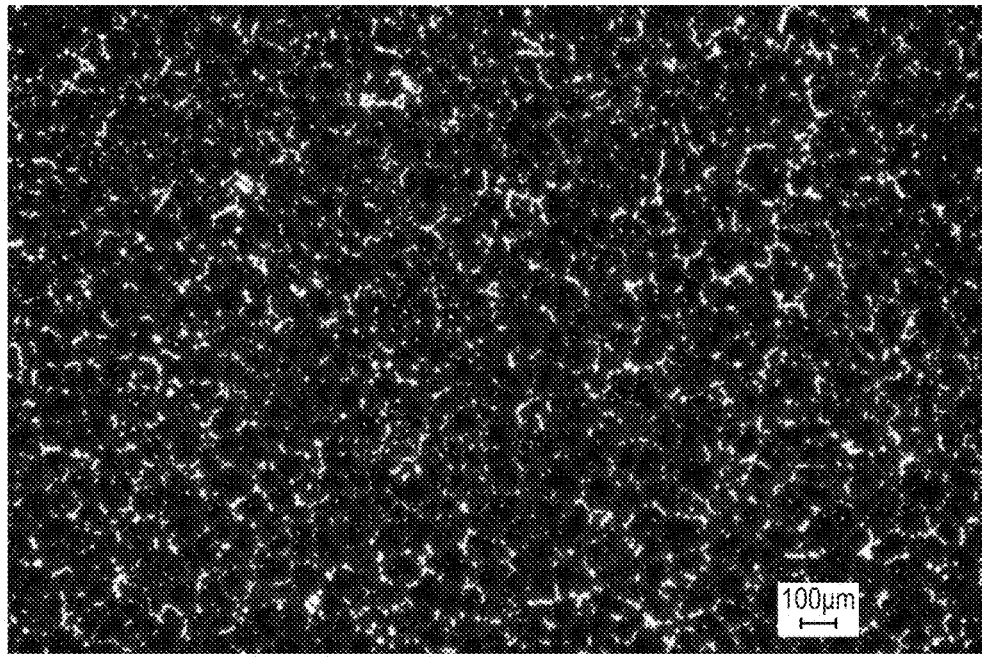
FIG. 25B represents a microstructure of an exemplary sample part created using a mold, according to aspects of the present disclosure.
Figure 25C:
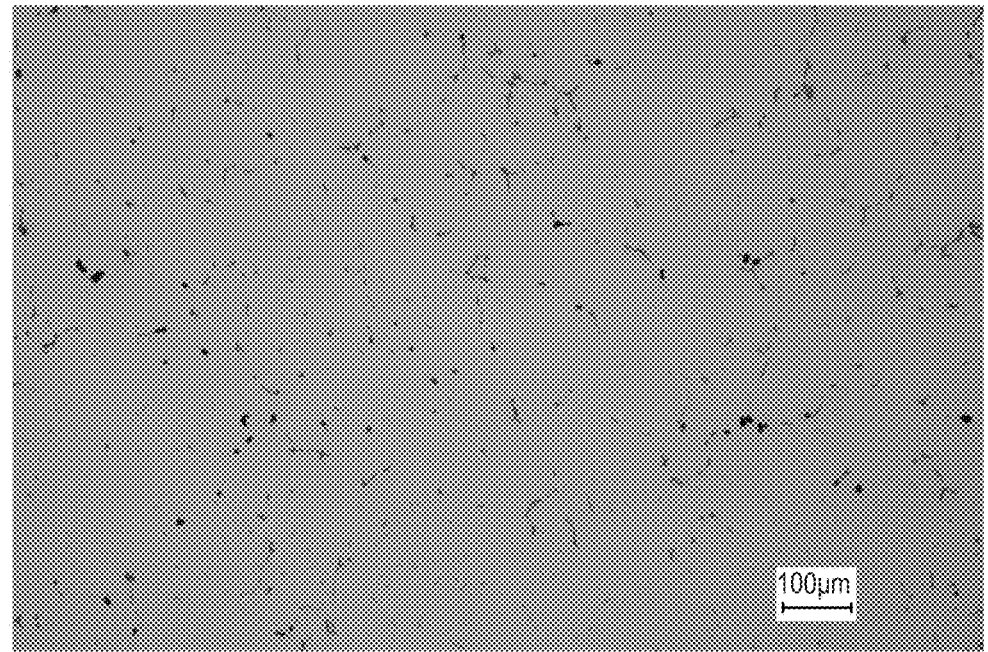
FIG. 25C represents a microstructure of an exemplary sample part created using a mold, according to aspects of the present disclosure.
Figure 25D:
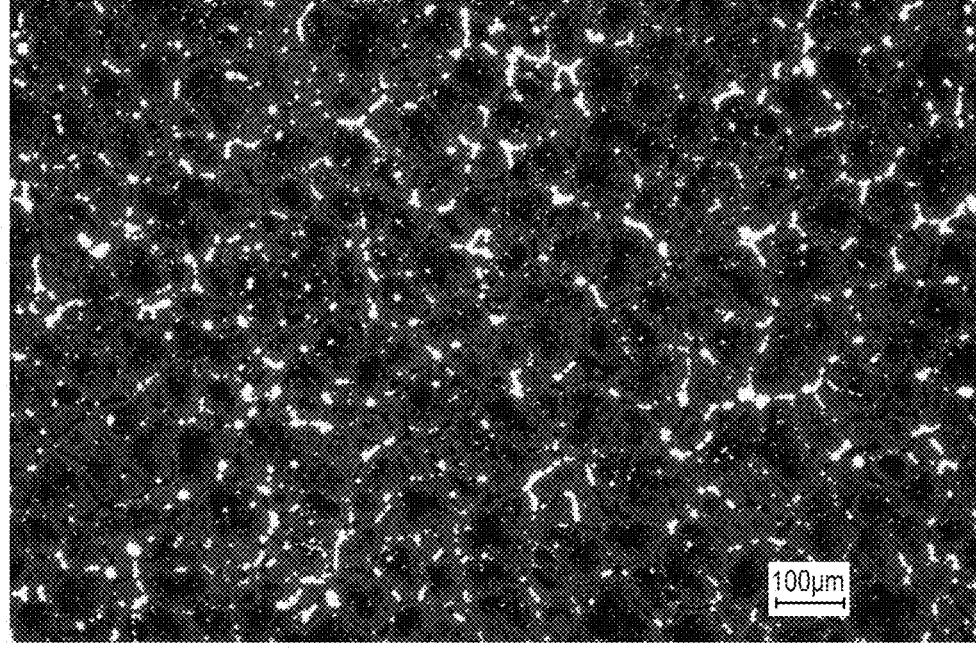
FIG. 25D represents a microstructure of an exemplary sample part created using a mold, according to aspects of the present disclosure.
Figure 25E:
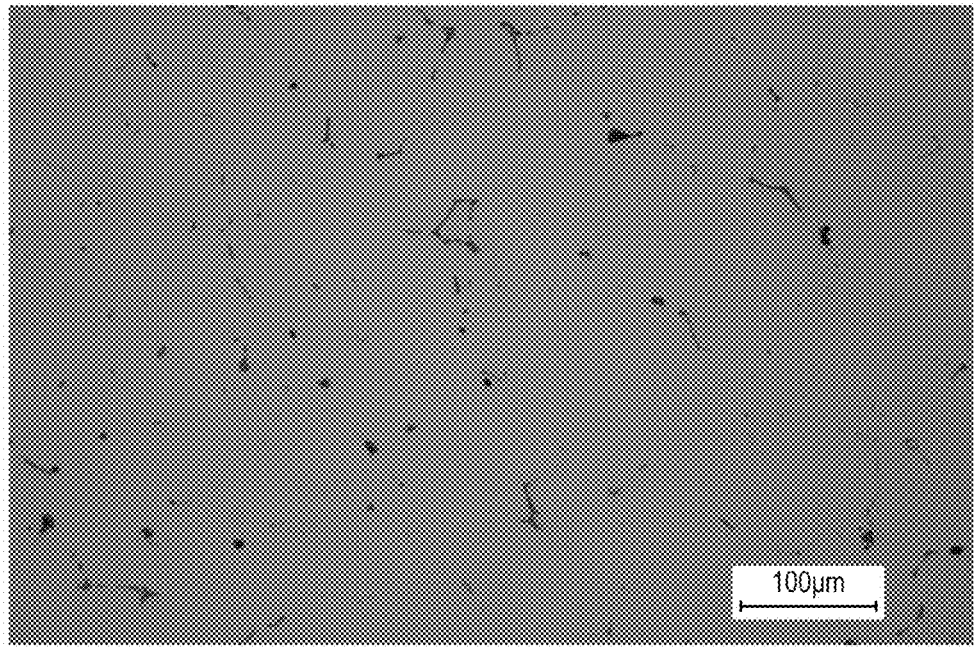
FIG. 25E represents a microstructure of an exemplary sample part created using a mold, according to aspects of the present disclosure.
Figure 25F:
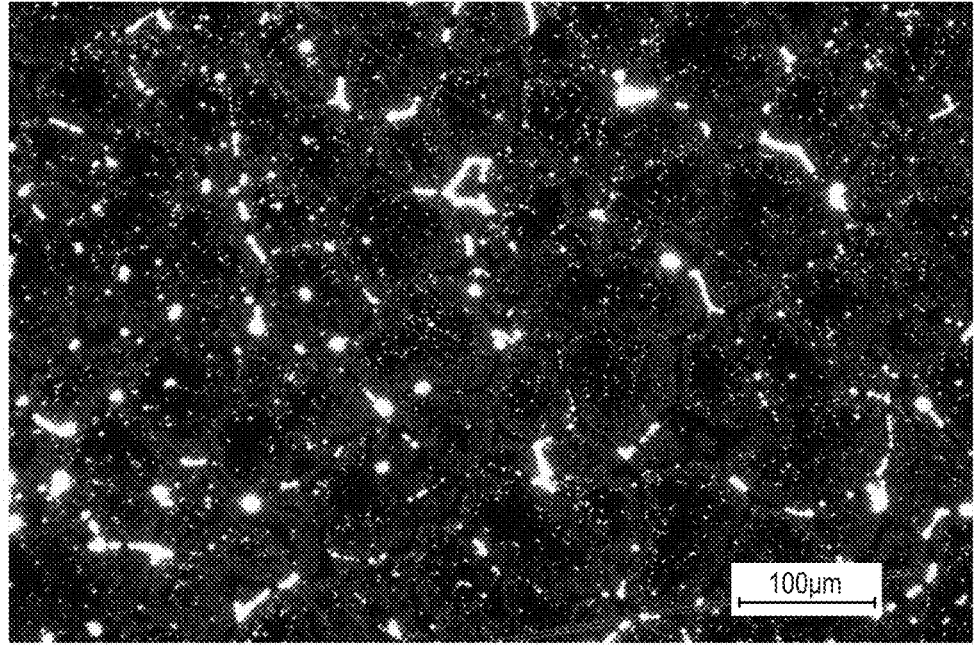
FIG. 25F represents a microstructure of an exemplary sample part created using a mold, according to aspects of the present disclosure.
Figure 25G:
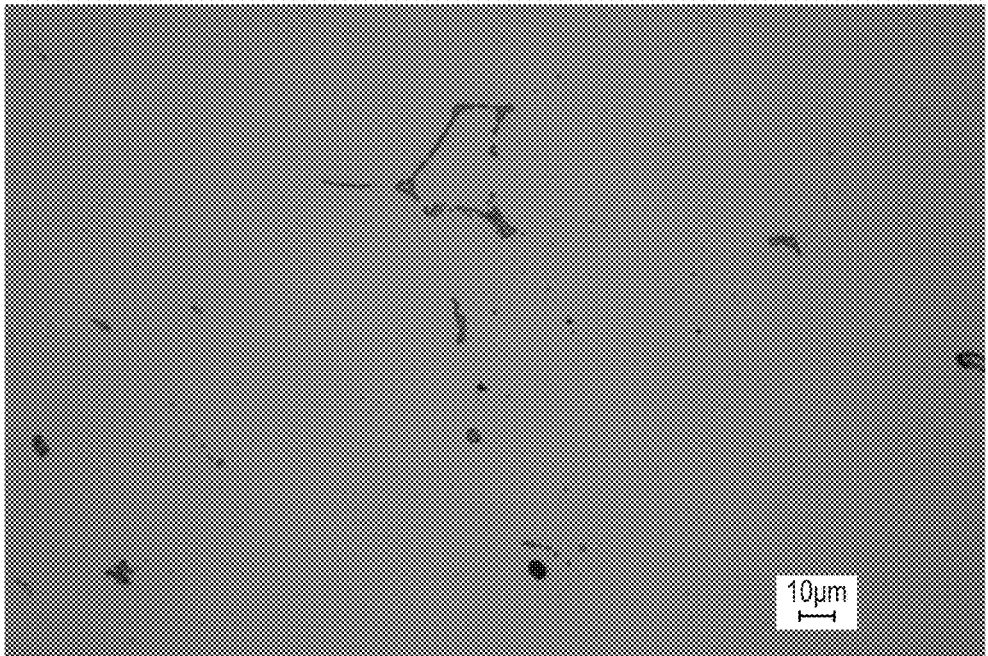
FIG. 25G represents a microstructure of an exemplary sample part created using a mold, according to aspects of the present disclosure.
Figure 25H:
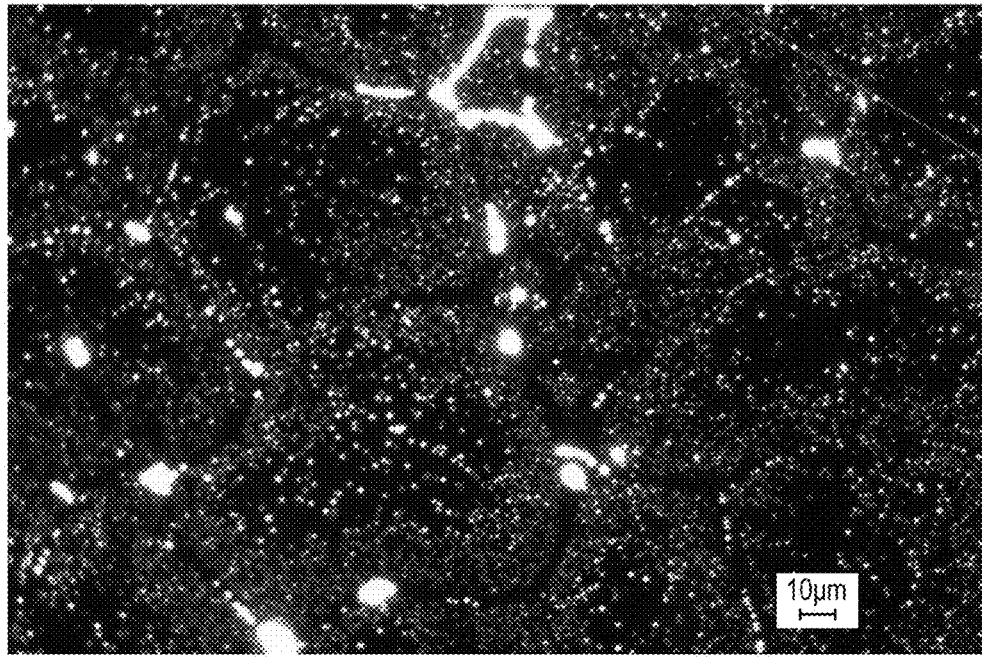
FIG. 25H represents a microstructure of an exemplary sample part created using a mold, according to aspects of the present disclosure.
Figure 25I:
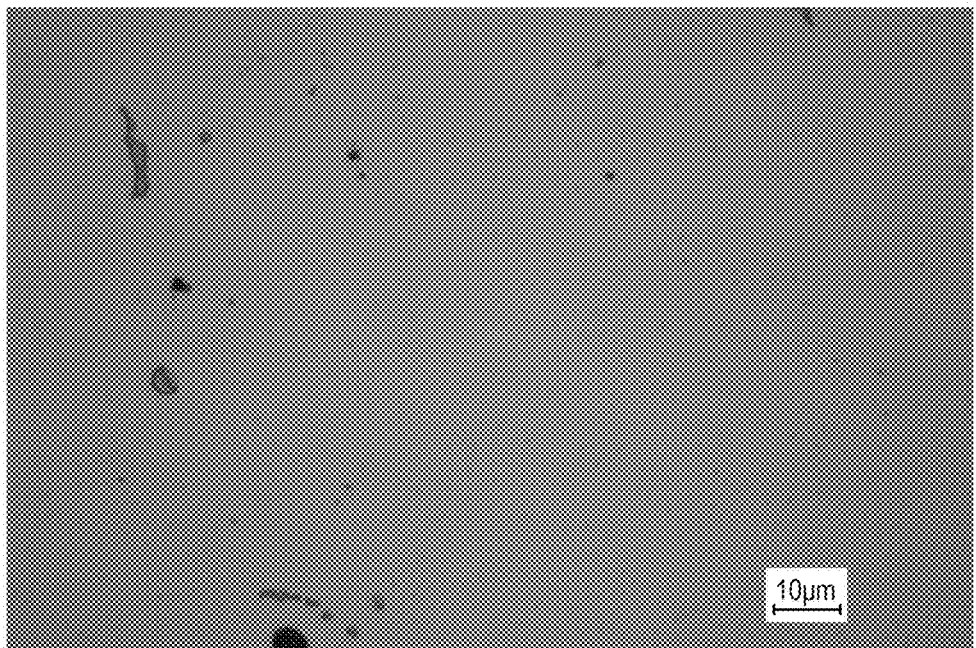
FIG. 25I represents a microstructure of an exemplary sample part created using a mold, according to aspects of the present disclosure.
Figure 25J:
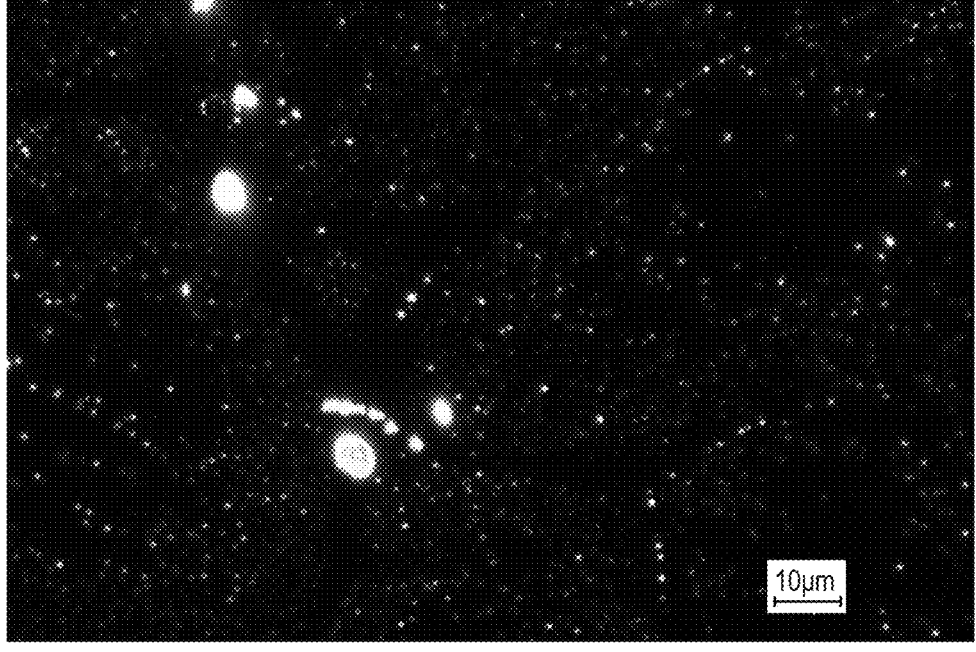
FIG. 25J represents a microstructure of an exemplary sample part created using a mold, according to aspects of the present disclosure.
Figure 26A:
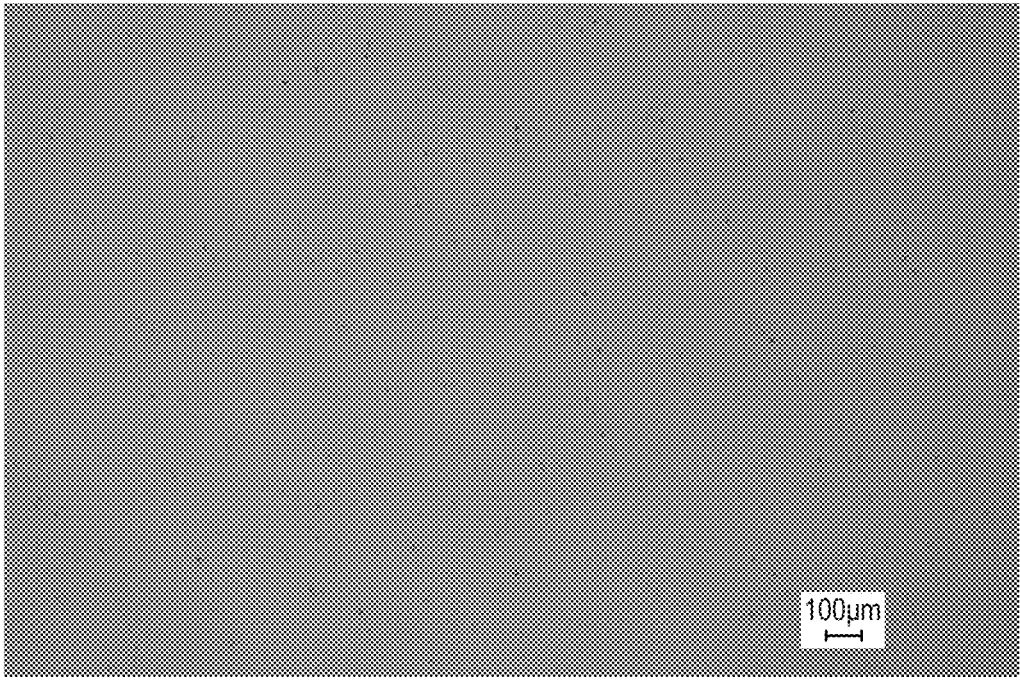
FIG. 26A represents a microstructure of a sample forged product, according to aspects of the present disclosure.
Figure 26B:
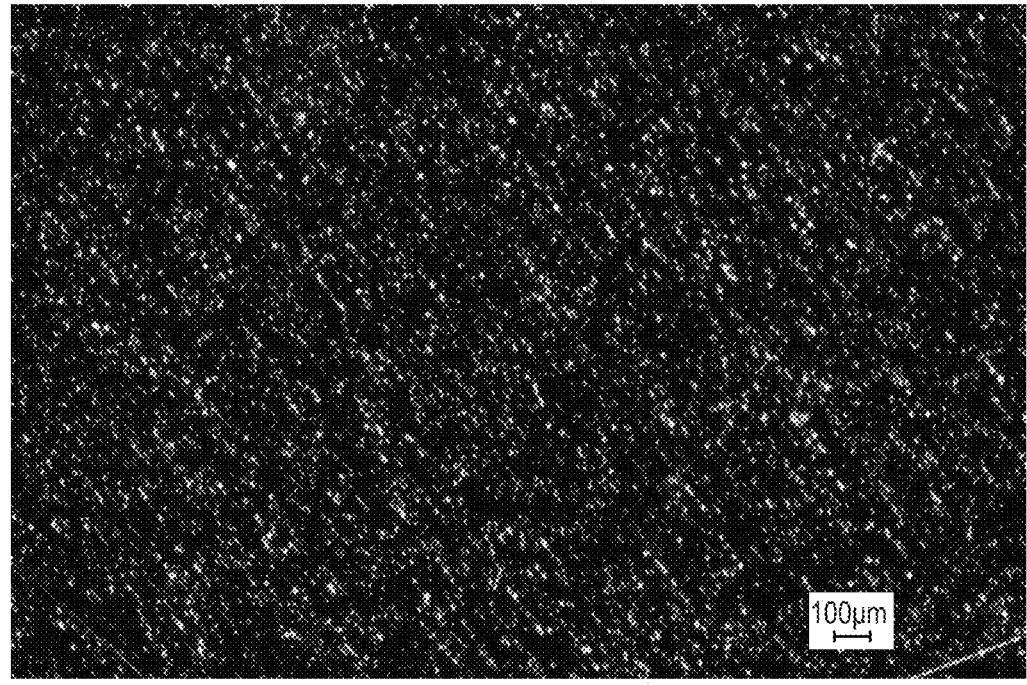
FIG. 26B represents a microstructure of a sample forged product, according to aspects of the present disclosure.
Figure 26C:
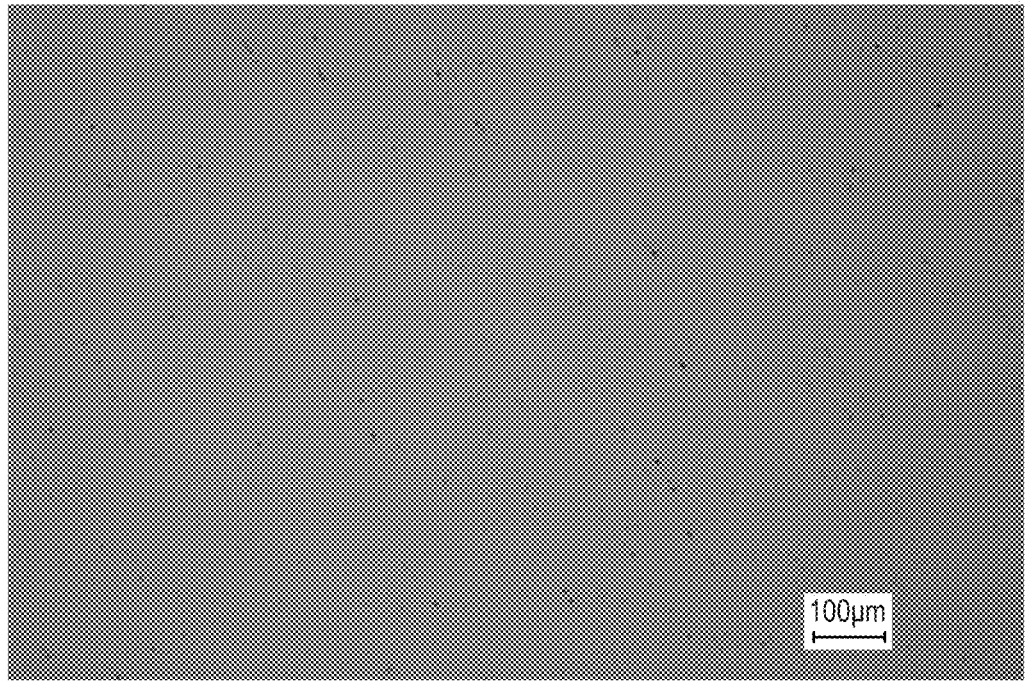
FIG. 26C represents a microstructure of a sample forged product, according to aspects of the present disclosure.
Figure 26D:
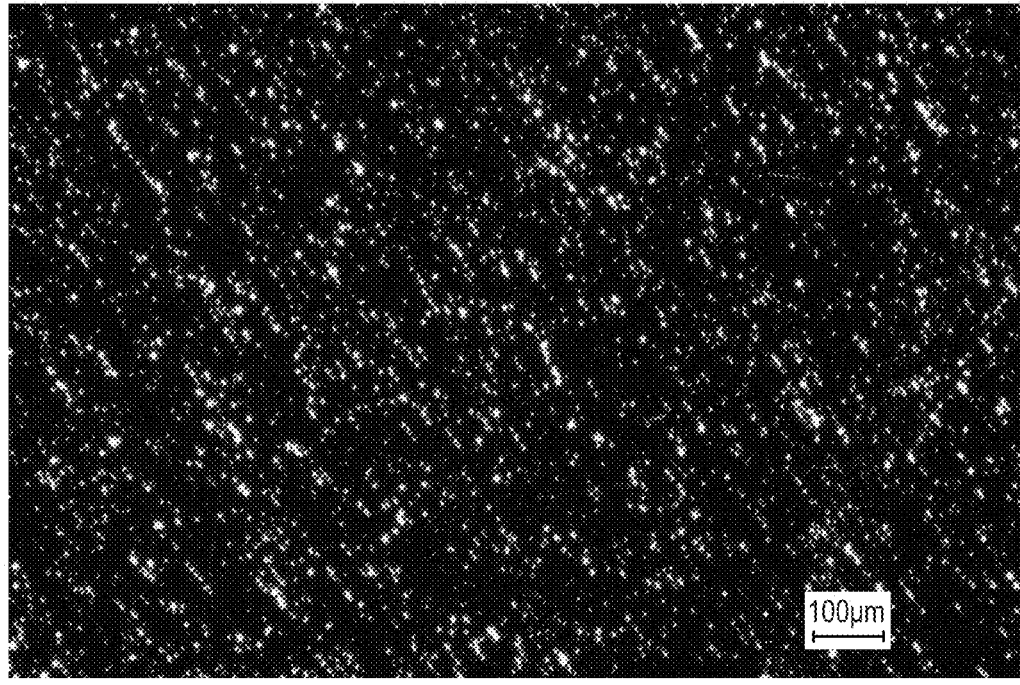
FIG. 26D represents a microstructure of a sample forged product, according to aspects of the present disclosure.
Figure 26E:
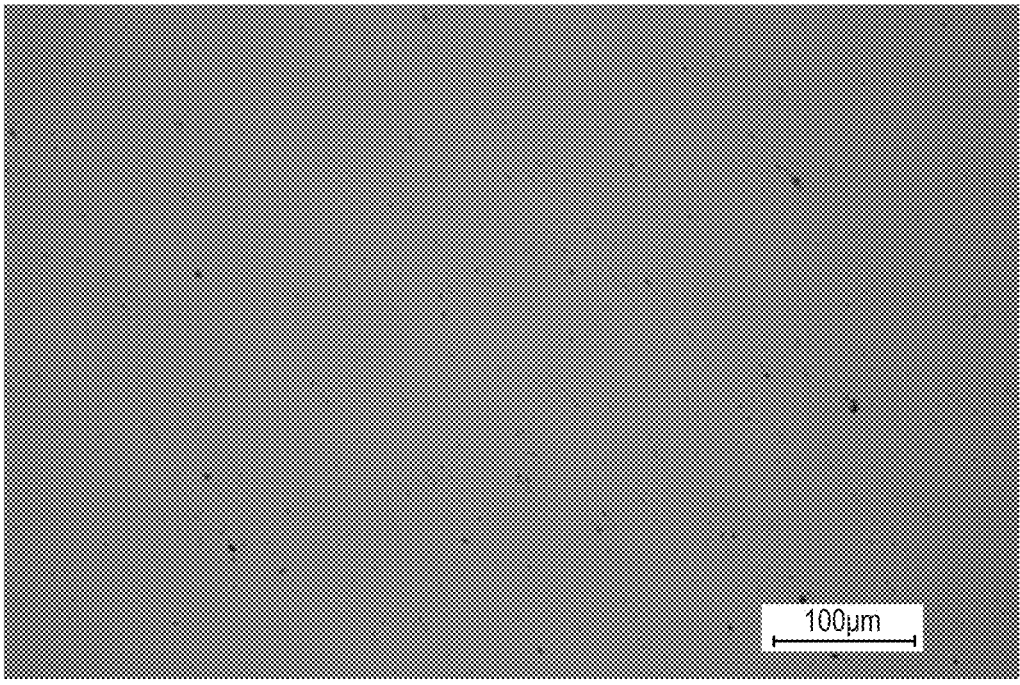
FIG. 26E represents a microstructure of a sample forged product, according to aspects of the present disclosure.
Figure 26F:
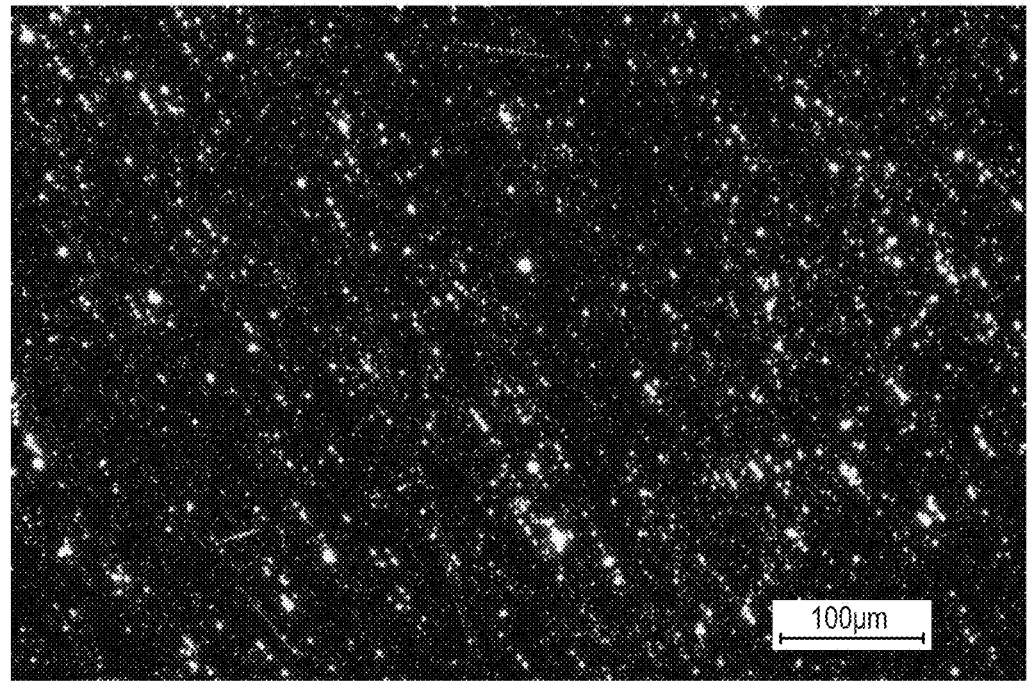
FIG. 26F represents a microstructure of a sample forged product, according to aspects of the present disclosure.
Figure 26G:
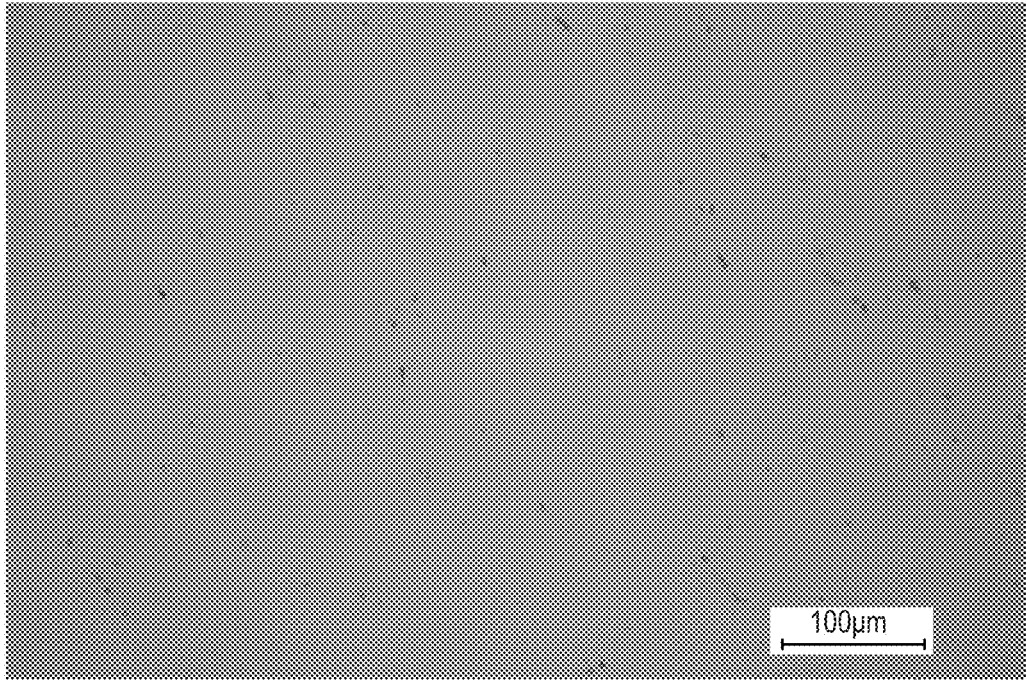
FIG. 26G represents a microstructure of a sample forged product, according to aspects of the present disclosure.
Figure 26H:
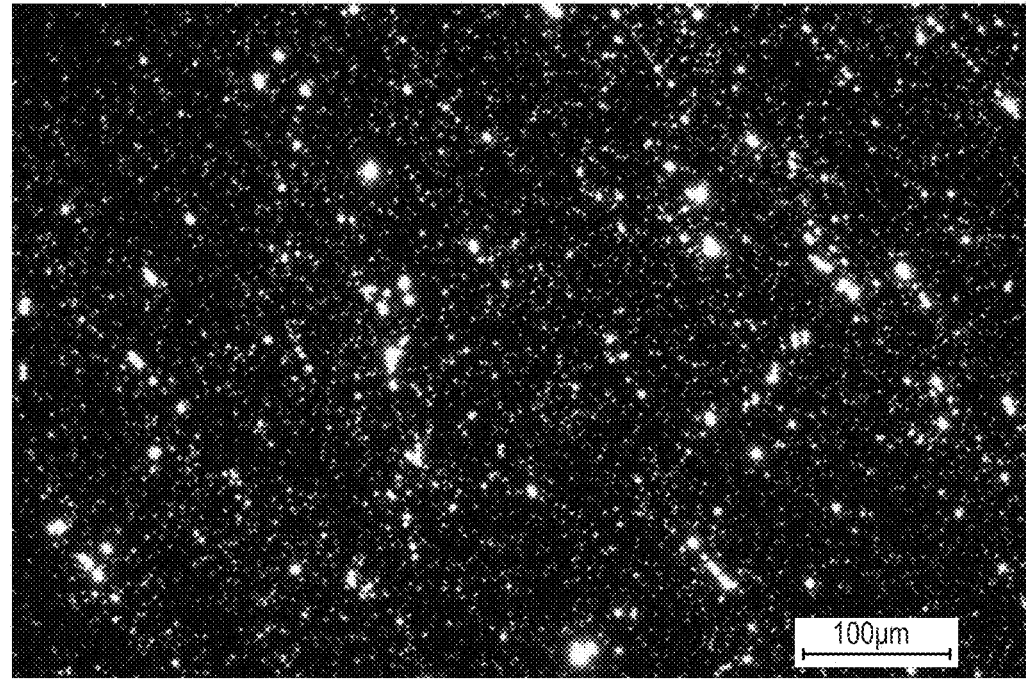
FIG. 26H represents a microstructure of a sample forged product, according to aspects of the present disclosure.
Figure 26I:
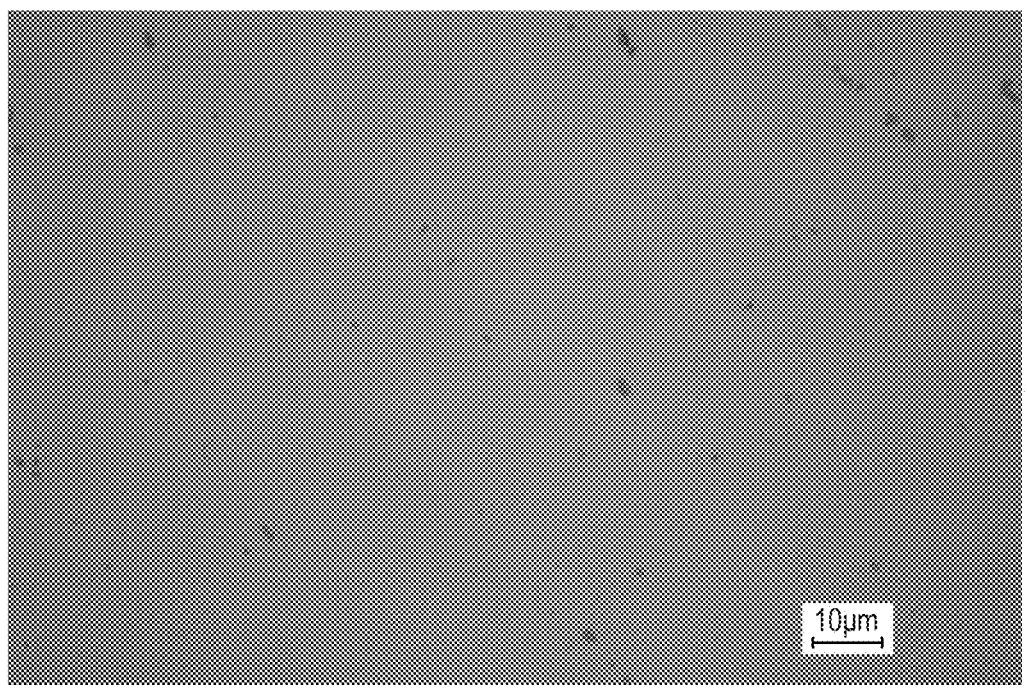
FIG. 26I represents a microstructure of a sample forged product, according to aspects of the present disclosure.
Figure 26J:
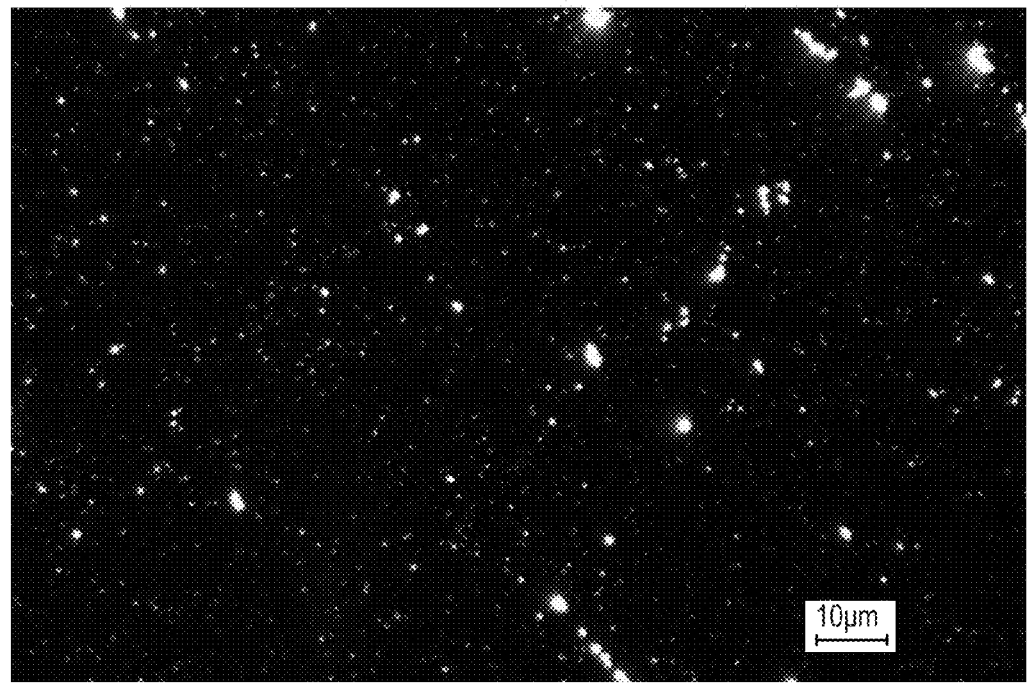
FIG. 26J represents a microstructure of a sample forged product, according to aspects of the present disclosure.

FIGS. 24A-24J associated with section MID 817 and FIGS. 25A-25J associated with section MID 821 represent microstructures after thermal heat treatment shown in various magnifications and in both bright field and dark field views, and FIGS. 26A-26J represent microstructures of a 6061-aluminum forged product in various magnifications and in both bright field and dark field views. More specifically, FIGS. 24A-24B are at 5× magnification with a 100 micron scale bar, FIGS. 24C-24D are at 10 magnification with a 100 micron scale bar, FIGS. 24E-24F are at 20× magnification with a 100 micron scale bar, FIGS. 24G-24H are at 50× magnification with a 10 micron scale bar, and FIGS. 24I-24J are at 100× magnification with a 10 micron scale bar, in bright field and dark field respectively. FIGS. 25A and 26A are at a 5× magnification scale with 100 micron scale bars in bright field, FIGS. 25B and 26B are at 5× magnification scale with 100 micron scale bars in dark field, FIGS. 25C and 26C are at 10× magnification scale with 100 micron scale bars in bright field, FIGS. 25D and 26D are at 10× magnification with 100 micron scale bars in dark field, FIGS. 25E and 26E are at 20× magnification with a 100 micron scale bar in bright field, FIGS. 25F and 26F are at 20× magnification with 100 micron scale bars in dark field, FIGS. 25G and 26G are at 50× magnification with 10 micron scale bars in bright field, FIGS. 25H and 26H are at 50× magnification with 10 micron scale bars in dark field, FIGS. 25I and 26I are at 100× magnification with 10 micron scale bars in bright field, and FIGS. 25J and 26J are at 100× magnification with 10 micron scale bars in dark field.

Figure 21:
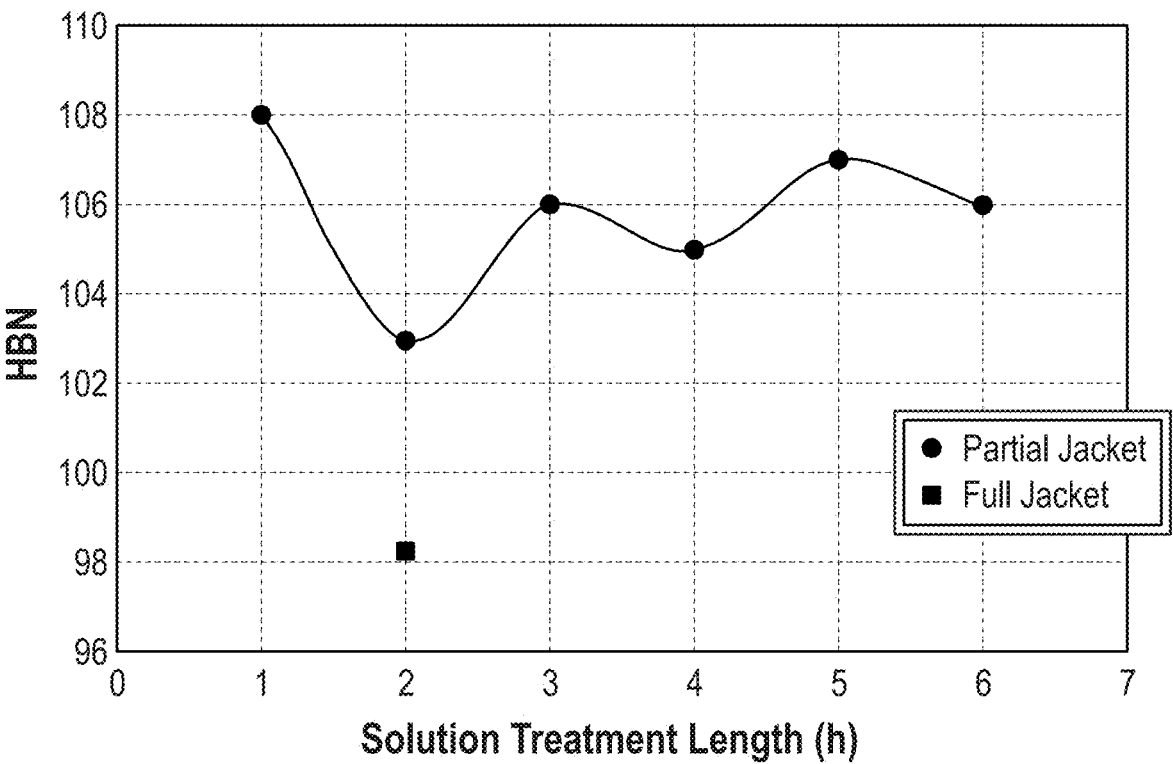
FIG. 21 is a graph showing heat treatment of samples created using a mold, according to aspects of the present disclosure.

As can be seen in comparison of corresponding ones of FIG. 25 and FIG. 26 (e.g., comparing FIG. 25A to FIG. 26A, and so on), parts cast using mold 1000 show comparable microstructures to a wrought 6061 aluminum product. A standard 6061 heat treatment was deployed using a temperature range in the furnace selected from 538 C to 573 C to solution, varied from one (1) to six (6) hours as shown in FIG. 21 of the attached appendix. Solution was followed by a water quenchant in the temperature range followed by a 21 C to 60 C water quench followed then by artificial aging between 160-193 C and a time interval lasting up to two (2) hours at the chosen aging temperature. It is understood that aging time and temperature occur simultaneously and can be verified for aging by hardness measurements that correlate to yield strengthening mechanisms. All microstructures for solution, quench, and artificial age treatment remain alike in FIGS. 24A-24J, FIGS. 25A-25J, and FIGS. 26A-26J including the samples taken through the length of the bar as shown in FIG. 20 showing the MID locations. Brinell hardness was measured for all sections and ranged, depending upon time the samples spent in solution, and aging time from 98.3 HB to 108 HB. Hardness was taken at a 1500 Kg load, 10 mm ball diameter and a 10 second dwell. Microstructures associated with MID 817 (FIGS. 24A-24J) and MID 821 (FIGS. 25A-25J) are compared against a wrought product produced in same 6061 alloy (FIGS. 26A-26J), showing little difference in microstructures between the products cast using mold 1000 and wrought products. It is noted that dark particles of undissolved $Mg_2Si$ remain with additional particles of $Al_8Fe_2Si$ and $Al_5FeSi$ in bright field. The forged product is absent associated to its longer thermal treatment. Forging shows similar $Mg_2Si$ precipitation, white distribution, within alpha solid aluminum. Dotted $Mg_2Si$ shows grain boundary as cast despite being a wrought structure and unbroken cell boundary regions undetectable in bright field.

Figure 22A:
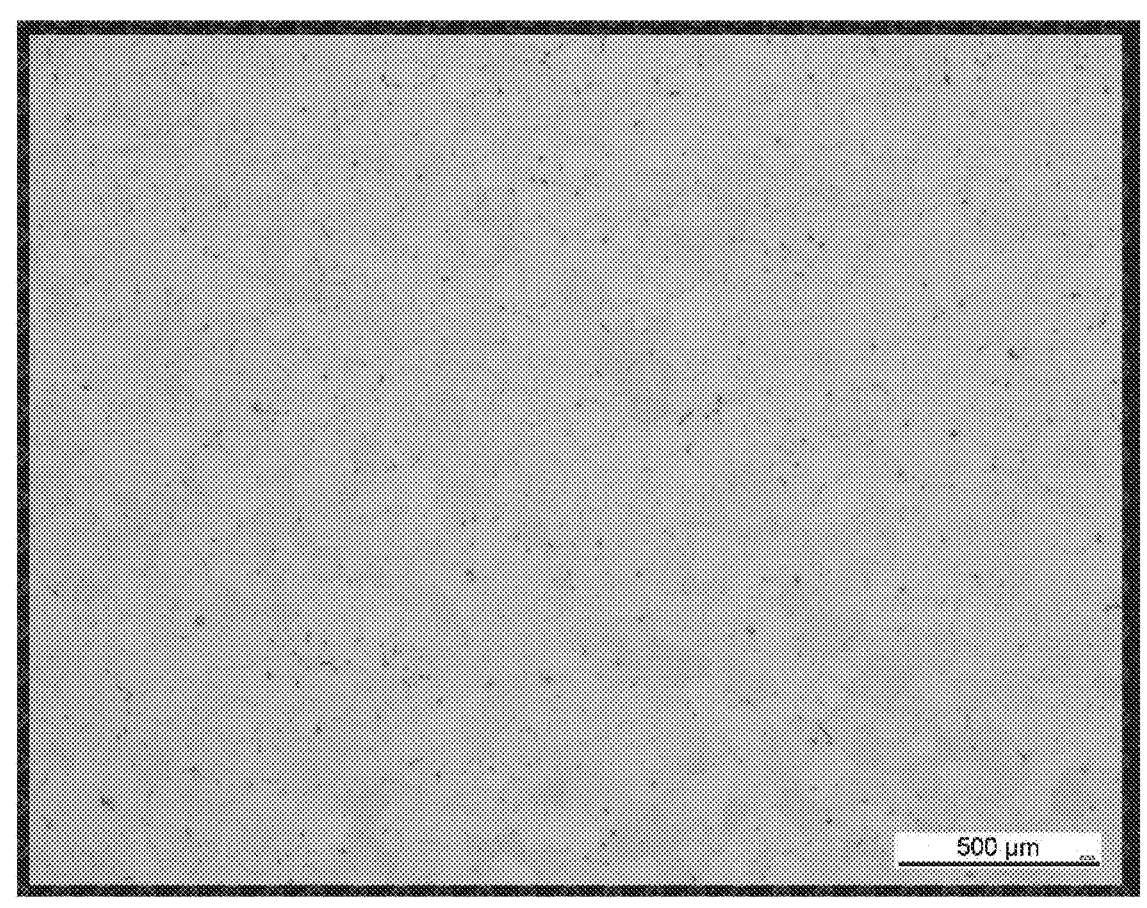
FIG. 22A shows grain size for an exemplary sample created using a mold, according to aspects of the present disclosure.
Figure 22B:
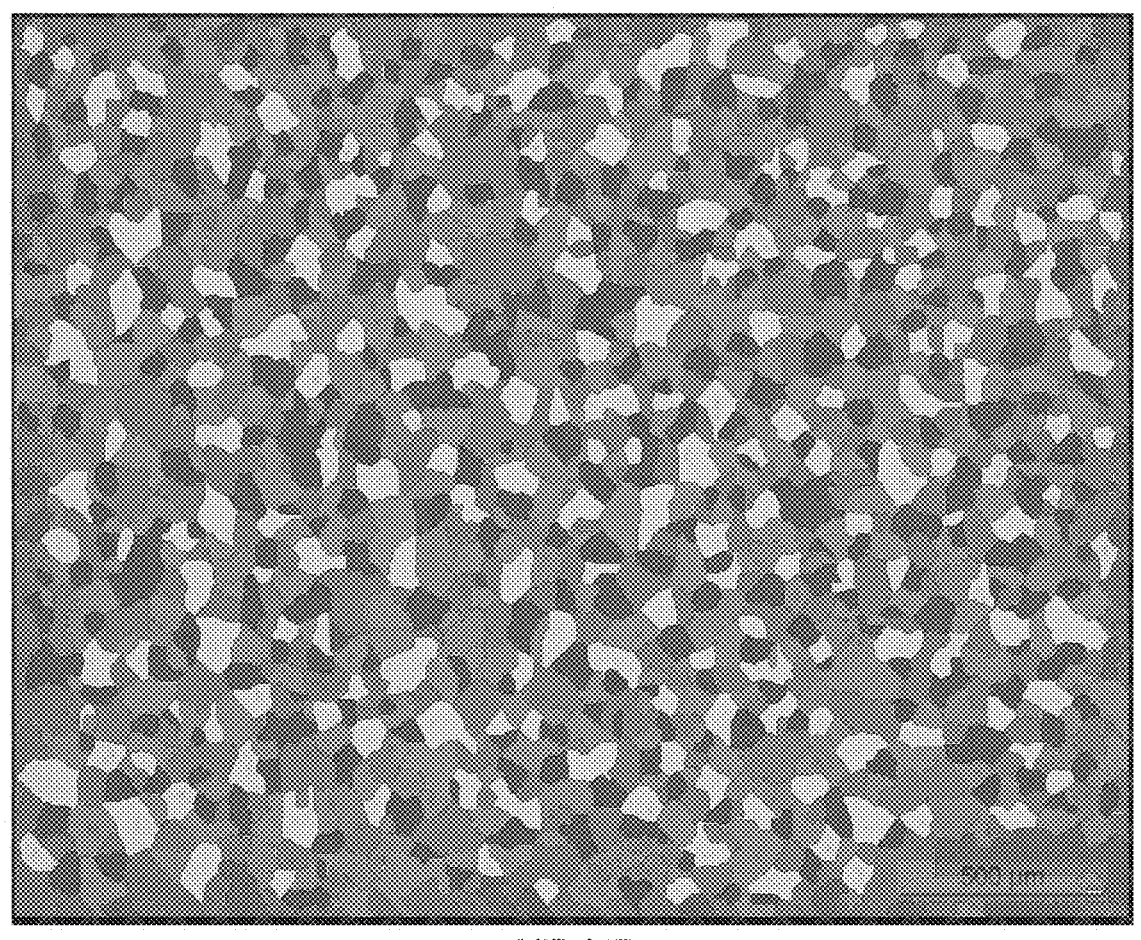
FIG. 22B shows grain size for an exemplary sample created using a mold, according to aspects of the present disclosure.
Figure 23:
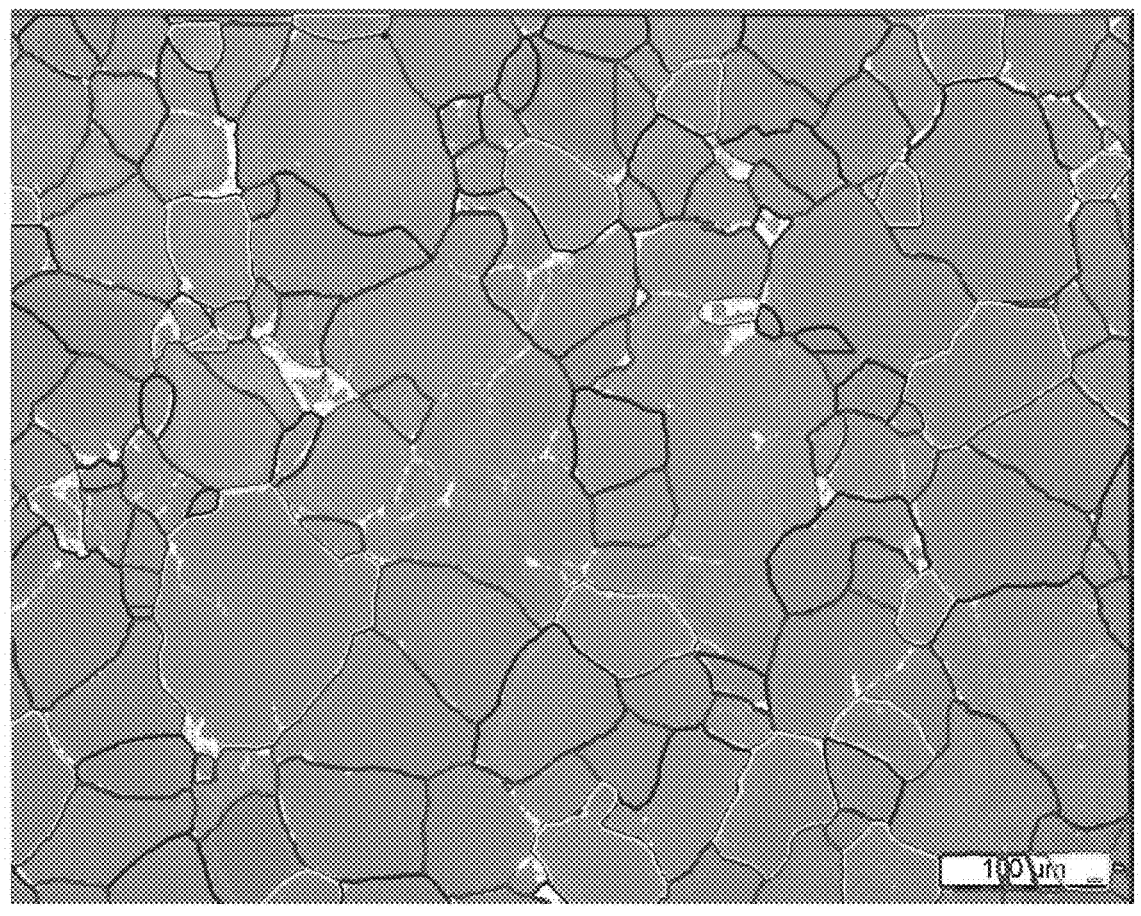
FIG. 23 shows grain size for an exemplary sample part created using a mold, according to aspects of the present disclosure.

Table 3 shows grain size of sample MID 817, and corresponding FIGS. 22A-22B show the microstructure of sample MID 817. The calculations from these standard measurements indicate the average grain cell size is 70 um on average compared to an ablated product, Table 4 showing a 50 um on average grain size. In comparison, Table 4 shows grain size of sample MID 0484, made with a conventional aggregate mold, and corresponding FIG. 23 shows the microstructure of sample MID 0484 As seen in FIGS. 22A-22B and Table 3, grain distribution is uniform in a product made from mold 1000 whereas the grain distribution of sample MID 0484 is less homogenous, or uniform, although MID 0484 represents the tip of an ablated mold aggregate showing the best to be achieved using a conventional aggregate mold to form an alloy part.

TABLE 3

| Grain Size Measurement Statistics Statistics | MID 0817 Aluminum Units |
|---|---|
| Grain Size G: | 5 |
| Method: | Planimetric Method |
| Standard: | ASTM E1382-97(2023) |
| Field ID: | 2 |
| Num. of grains: | 1168 |
| Grain Area | |
| Mean: | 4062.6 μm² |
| Minimum: | 698.7 μm² |
| Maximum: | 28478.4 μm² |
| Std. deviation: | 3063.4 μm² |
| 95% Conf. inter.: | 163.3 μm² |
| Rel. accuracy: | 4 % |

TABLE 4

| Grain Size Measurement Statistics | MID 0484 |
| Statistics | Aluminum Units |
| --- | --- |
| Grain Size G: | 6 |
| Method: | Planimetric Method |
| Standard: | ASTM E1382-97(2023) |
| Field ID: | 2 |
| Num. of grains: | 145 |
| Grain Area | |
| Mean: | 1838.2 μm² |
| Minimum: | 0.6 μm² |
| Maximum: | 32196.4 μm² |
| Std. deviation: | 3493.7 μm² |
| 95% Conf. inter.: | 574.3 μm² |
| Rel. accuracy: | 31 % |

With respect to FIG. 26E, it can be seen that the wrought product shows small $Mg_2Si$ undissolved at cell boundary regions. In comparison, FIG. 25E shows dark particles corresponding to $Mg_2Si$, $Al_8Fe_2Si$, and $Al_5FeSi$ in the bright field.

FIG. 26G shows a relatively completely homogenized microstructure of a wrought sample, typical of a 12 to 24 hour homogenization heat treatment in bright field, and FIG. 26H shows the same microstructure in dark field. In comparison, FIG. 25G, corresponding to a cast product formed consistent with the present disclosure in bright field, and FIG. 25H shows the same microstructure in dark field. FIG. 25G shows minimal residuals, with several undissolved particles corresponding to $Mg_2Si$, and a ring of undissolved $Al_8Fe_2Si$, and $Al_5FeSi$. In the corresponding dark field views, FIG. 26H shows the microstructure of a wrought sample. In the dark field view, the wrought product of FIG. 26H shows similar $Mg_2Si$ precipitation as the product formed using mold 1000, as shown in FIG. 25H. Further, the grain boundary of the wrought product appears similar to the product formed consistent with the present disclosure, showing an unbroken cell boundary that is undetectable in the bright field view of FIG. 26G. In comparison, FIG. 25G shows small distributions of $Mg_2Si$ in white and a similar cell boundary region that was not detectable in bright field of FIG. 25H and similar to the wrought microstructure shown in FIG. 26H.

FIGS. 26I and 26J show the wrought product microstructure at 100× magnification and in bright and dark field, respectively. Correspondingly, FIGS. 25I and 25J show the microstructure of a product formed consistent with the present disclosure at 100× magnification and in bright and dark field, respectively. FIG. 26J shows a wrought cell boundary in dark view that is undetectable in the bright field of FIG. 26I. Similarly, FIG. 25J indicates a dotted $Mg_2Si$ boundary region that is undetectable in the bright field of FIG. 25I and is similar in structure to the wrought microstructure of FIG. 26I.

The disclosure herein has been described with reference to several embodiments. Obviously, modifications and alterations will occur to others upon a reading and understanding of the preceding detailed description. It is intended that the disclosure be construed as including all such modifications and alterations in so far as they come within the scope of the appended claims or the equivalents thereof.

Embodiments consistent with the present disclosure can be implemented according to at least the following clauses:

Clause 1: A method for manufacturing an alloy component, may include: forming a mold may include a first mold portion and a second mold portion, the first mold portion and the second mold portion defining a mold cavity therebetween, where at least one of the first mold portion and the second mold portion may include one or more inserts disposed through an outside surface of a respective mold portion and extending through the respective mold portion proximate to the mold cavity; delivering a molten alloy into the mold cavity; and treating, through the one or more inserts, the molten alloy as the molten alloy cools to form an alloy part.

Clause 2: The method as clause 1 describes, where each of the one or more inserts may include a plurality of hollow tubes extending through a respective insert.

Clause 3: The method as either of clause 1 or 2 describe, where the treating may include cooling the molten alloy by spraying an ablate mixture through the plurality of hollow tubes of at least one insert of the one or more inserts.

Clause 4: The method as any of clauses 1-3 describe, where the treating may include heat treating the alloy part through the plurality of hollow tubes of at least one insert of the one or more inserts.

Clause 5: The method as any of clauses 1-4 describe, where heat treating the alloy part further may include providing radiation through the plurality of hollow tubes of at least one insert of the one or more inserts.

Clause 6: The method as any of clauses 1-5 describe, further may include insulating the molten alloy by introducing a gas through the plurality of hollow tubes of at least one insert of the one or more inserts.

Clause 7: The method as any of clauses 1-6 describe, where in response to introducing the gas through the plurality of hollow tubes of at least one insert of the one or more inserts, a gas layer separating the molten alloy from the mold is formed, thereby insulated the molten alloy from the mold.

Clause 8: The method as any of clauses 1-7 describe, further may include filling the plurality of hollow tubes of at least one insert of the one or more inserts with an aggregate, thereby modifying a heat capacity of the at least one insert and the cooling rate of a portion of the molten alloy proximate the at least one insert.

Clause 9: The method as any of clauses 1-8 describe, further may include: interposing a metal layer between the mold cavity and at least one mold portion of the first mold portion and the second mold portion; and preventing the flow of molten alloy through the plurality of hollow tubes of at least one insert by the metal layer.

Clause 10: The method as any of clauses 1-9 describe, where at least a portion of the mold may include an aggregate.

Clause 11: The method as any of clauses 1-10 describe, further may include ablating the portion of the mold that may include the aggregate, where the one or more inserts provide support to the alloy part in absence of the portion of the mold that may include the aggregate.

Clause 12: The method as any of clauses 1-11 describe, further may include: providing an aggregate layer between the mold cavity and a cavity end of the one or more inserts; and allowing the aggregate layer to shape the alloy part as the molten metal cools.

Clause 13: The method as any of clauses 1-12 describe, further may include: providing an aggregate core within an inner portion of the mold cavity; supporting the aggregate core within the inner portion of the mold cavity with one or more supports; filling an outer portion of the mold cavity with the molten alloy; and forming a hollow alloy part defined by the outer portion of the mold cavity.

Clause 14: The method as any of clauses 1-13 describe, where the molten alloy may include a first molten alloy portion proximate a first insert of the one or more inserts and a second alloy portion proximate a second insert of the one or more inserts, the method further may include: cooling the first molten alloy portion by spraying an ablate mixture through the plurality of hollow tubes of the first insert; and simultaneously heating the second molten alloy portion through the plurality of hollow tubes of the second insert.

Clause 15: The method as any of clauses 1-14 describe, further may include supporting, by the one or more inserts, the molten alloy as the molten alloy cools to thereby form the alloy part.

Clause 16: A mold construction may include: a cope; a drag; a mold cavity between the cope and the drag; and at least one of the cope, the drag, or both comprise: an outside surface; an inside surface proximate the mold cavity; and a plurality of hollow tubes extending through and between the outside surface and the inside surface.

Clause 17: The mold construction as clause 16 describes, where at least a portion of the cope or the drag may include an aggregate.

Clause 18: The mold construction as either of clauses 16 or 17 describe, further may include an aggregate layer disposed between the mold cavity and at least a portion of the inside surface of at least the cope or the drag.

Clause 19: The mold construction as any of clauses 16-18 describe, further may include a metal layer disposed between the mold cavity and at least a portion of the inside surface.

Clause 20: The mold construction as any of clauses 16-19 describe, including a tube density between approximately 1600 to approximately 6000 hollow tubes per square centimeter.

Clause 21: The mold construction as any of clauses 16-20 describe, where each of the plurality of hollow tubes may include a diameter between approximately 50 microns to approximately 1000 microns.

Clause 22: The mold construction as any of clauses 16-21 describe, where the one or more inserts may include a material selected from ceramic, glass, plastic, and metal.

Clause 23: The mold construction as any of clauses 16-22 describe, further may include: an aggregate core within an inner portion of the mold cavity; and one or more supports supporting the aggregate core within the inner portion of the mold cavity.

Clause 24: A method for manufacturing an alloy component, may include: forming a mold may include a first mold portion and a second mold portion, the first mold portion and the second mold portion defining a mold cavity therebetween, where at least one of the first mold portion and the second mold portion may include a plurality of hollow tubes extending through a respective mold portion into the mold cavity; delivering a molten alloy into the mold cavity; and simultaneously applying, to the molten alloy, primary cooling via contact with the mold and secondary cooling via an ablate mixture applied through at least one of the plurality of hollow tubes to form an alloy part.

The invention claimed is:

1. A method for manufacturing an alloy component, comprising:
forming a mold comprising a first mold portion and a second mold portion, the first mold portion and the second mold portion defining a mold cavity therebetween, wherein at least one of the first mold portion and the second mold portion comprises one or more inserts disposed through an outside surface of a respective mold portion and extending through the respective mold portion proximate to the mold cavity;

delivering a molten alloy into the mold cavity; and treating, through the one or more inserts, the molten alloy as the molten alloy cools to form an alloy part, wherein at least one of the one or more inserts comprises a plurality of hollow tubes extending through a respective insert.

2. The method of claim 1, wherein the treating comprises cooling the molten alloy by spraying an ablate mixture through the plurality of hollow tubes of at least one insert of the one or more inserts.

3. The method of claim 1, wherein the treating comprises heat treating the alloy part through the plurality of hollow tubes of at least one insert of the one or more inserts.

4. The method of claim 2, wherein heat treating the alloy part further comprises providing radiation through the plurality of hollow tubes of at least one insert of the one or more inserts.

5. The method of claim 1, further comprising insulating the molten alloy by introducing a gas through the plurality of hollow tubes of at least one insert of the one or more inserts.

6. The method of claim 5, wherein in response to introducing the gas through the plurality of hollow tubes of at least one insert of the one or more inserts, a gas layer separating the molten alloy from the mold is formed, thereby insulated the molten alloy from the mold.

7. The method of claim 1, wherein at least a portion of the mold comprises an aggregate.

8. The method of claim 7, further comprising ablating the portion of the mold that comprises the aggregate, wherein the one or more inserts provide support to the alloy part in absence of the portion of the mold that comprises the aggregate.

9. The method of claim 1, further comprising:
providing an aggregate layer between the mold cavity and a cavity end of the one or more inserts; and
allowing the aggregate layer to shape the alloy part as the molten metal cools.

10. The method of claim 1, further comprising:
providing an aggregate core within an inner portion of the mold cavity;
supporting the aggregate core within the inner portion of the mold cavity with one or more supports;
filling an outer portion of the mold cavity with the molten alloy; and
forming a hollow alloy part defined by the outer portion of the mold cavity.

11. The method of claim 1, wherein the molten alloy comprises a first molten alloy portion proximate a first insert of the one or more inserts and a second alloy portion proximate a second insert of the one or more inserts, the method further comprising:
cooling the first molten alloy portion by spraying an ablate mixture through the plurality of hollow tubes of the first insert; and
simultaneously heating the second molten alloy portion through the plurality of hollow tubes of the second insert.

12. The method of claim 1, further comprising filling the plurality of hollow tubes of at least one insert of the one or more inserts with an aggregate, thereby modifying a heat capacity of the at least one insert and the cooling rate of a portion of the molten alloy proximate the at least one insert.

13. The method of claim 1, further comprising:
interposing a metal layer between the mold cavity and at least one mold portion of the first mold portion and the second mold portion; and preventing the flow of molten alloy through the plurality of hollow tubes of at least one insert by the metal layer.

14. The method of claim 1, further comprising supporting, by the one or more inserts, the molten alloy as the molten alloy cools to thereby form the alloy part.

* * * * *